(12) United States Patent
Koga et al.

(10) Patent No.: US 12,057,744 B2
(45) Date of Patent: *Aug. 6, 2024

(54) METHOD OF MANUFACTURING ARMATURE

(71) Applicant: AISIN CORPORATION, Aichi (JP)

(72) Inventors: Kiyotaka Koga, Nishio (JP); Tomotsugu Sugihara, Okazaki (JP)

(73) Assignee: AISIN CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,149

(22) Filed: Apr. 1, 2022

(65) Prior Publication Data
US 2022/0294320 A1 Sep. 15, 2022

Related U.S. Application Data

(62) Division of application No. 16/762,055, filed as application No. PCT/JP2018/044082 on Nov. 29, 2018, now Pat. No. 11,451,120.

(30) Foreign Application Priority Data

Nov. 30, 2017 (JP) ................. 2017-231114
Feb. 2, 2018 (JP) ................. 2018-017603

(51) Int. Cl.
*H02K 15/00* (2006.01)
*H02K 3/28* (2006.01)
(Continued)

(52) U.S. Cl.
CPC ........... *H02K 15/0062* (2013.01); *H02K 3/28* (2013.01); *H02K 3/34* (2013.01); *H02K 3/50* (2013.01);
(Continued)

(58) Field of Classification Search
CPC ...... H02K 3/12; H02K 15/12; H02K 15/0068; H02K 15/085; H02K 15/0414; H02K 3/48;
(Continued)

(56) References Cited

U.S. PATENT DOCUMENTS

| 10,250,093 | B2 | 4/2019 | Hattori |
| 11,451,120 | B2 * | 9/2022 | Koga ................. H02K 3/34 |

(Continued)

FOREIGN PATENT DOCUMENTS

| CN | 105322683 A | 2/2016 |
| DE | 102015225585 A1 | 6/2017 |

(Continued)

OTHER PUBLICATIONS

May 2, 2022 Notice of Allowance Issued in U.S. Appl. No. 16/762,055.

(Continued)

*Primary Examiner* — Thiem D Phan
(74) *Attorney, Agent, or Firm* — Oliff PLC

(57) ABSTRACT

A method of manufacturing an armature includes: a step of preparing first segment conductors in which a plurality of end portions, or an end portion and a power terminal member, are electrically connected to each other; a step of disposing leg portions of the first segment conductors and leg portions of second segment conductors in an armature core; and a step of joining the leg portions of the first segment conductors and the leg portions of the second segment conductors to each other.

2 Claims, 23 Drawing Sheets

(51) Int. Cl.
*H02K 3/34* (2006.01)
*H02K 3/50* (2006.01)
*H02K 15/10* (2006.01)

(52) U.S. Cl.
CPC ....... *H02K 15/0081* (2013.01); *H02K 15/105* (2013.01); *Y10T 29/49009* (2015.01)

(58) Field of Classification Search
CPC ......... Y10T 29/49012; Y10T 29/49073; Y10T 29/49009; Y10T 29/53143
USPC .... 29/596, 597, 598, 603.03, 606, 732, 843, 29/850, 871
See application file for complete search history.

(56) References Cited

U.S. PATENT DOCUMENTS

| | | |
|---|---|---|
| 2016/0006314 A1 | 1/2016 | Kaneshige et al. |
| 2016/0172919 A1 | 6/2016 | Hattori |
| 2016/0190884 A1 | 6/2016 | Nakamura et al. |
| 2017/0040859 A1 | 2/2017 | Langlard |

FOREIGN PATENT DOCUMENTS

| | | |
|---|---|---|
| EP | 2 963 786 A2 | 1/2016 |
| JP | 2013-121183 A | 6/2013 |
| JP | 2015-023771 A | 2/2015 |
| WO | 2015/052773 A1 | 4/2015 |

OTHER PUBLICATIONS

Feb. 19, 2019 International Search Report issued in International Patent Application No. PCT/JP2018/044082.

Nov. 4, 2020 Extended Search Report issued in European Patent Application No. 18883288.5.

* cited by examiner

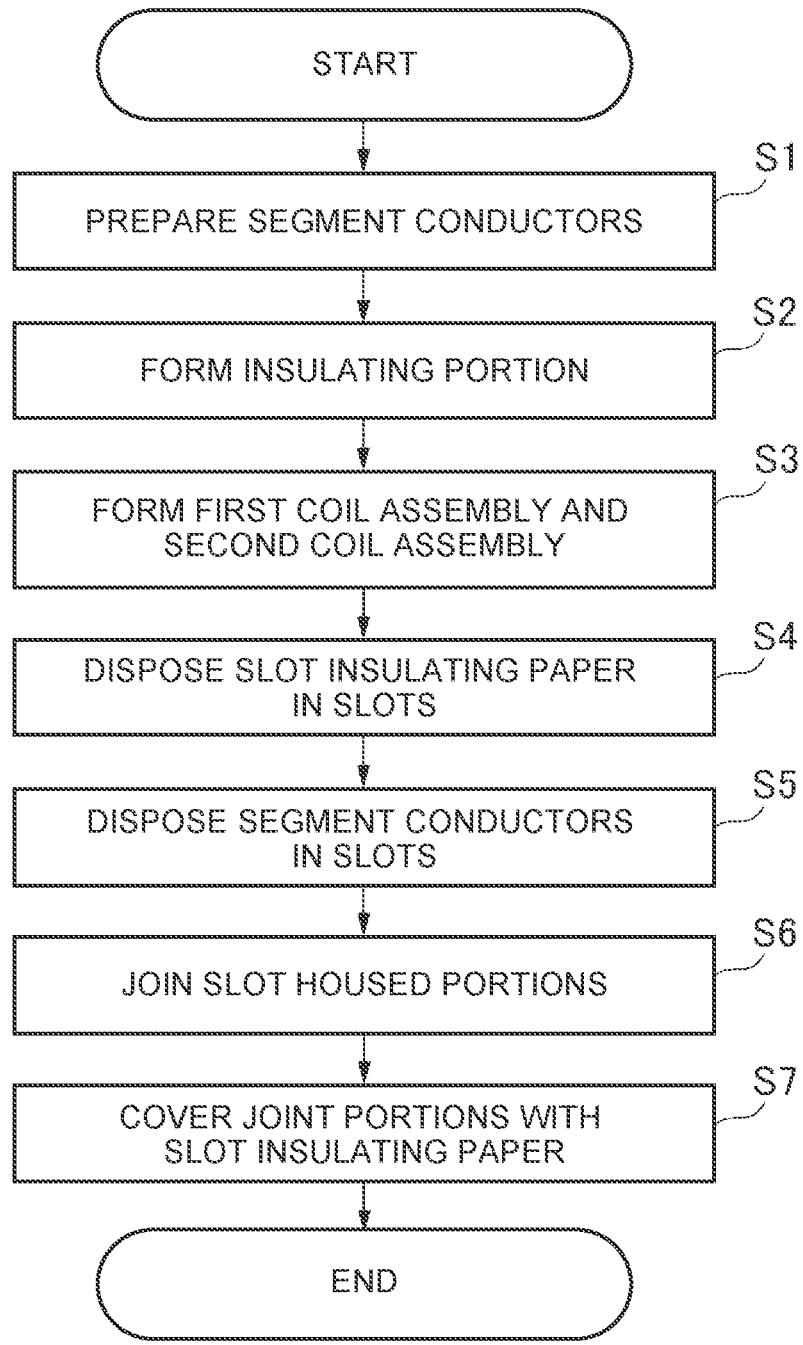

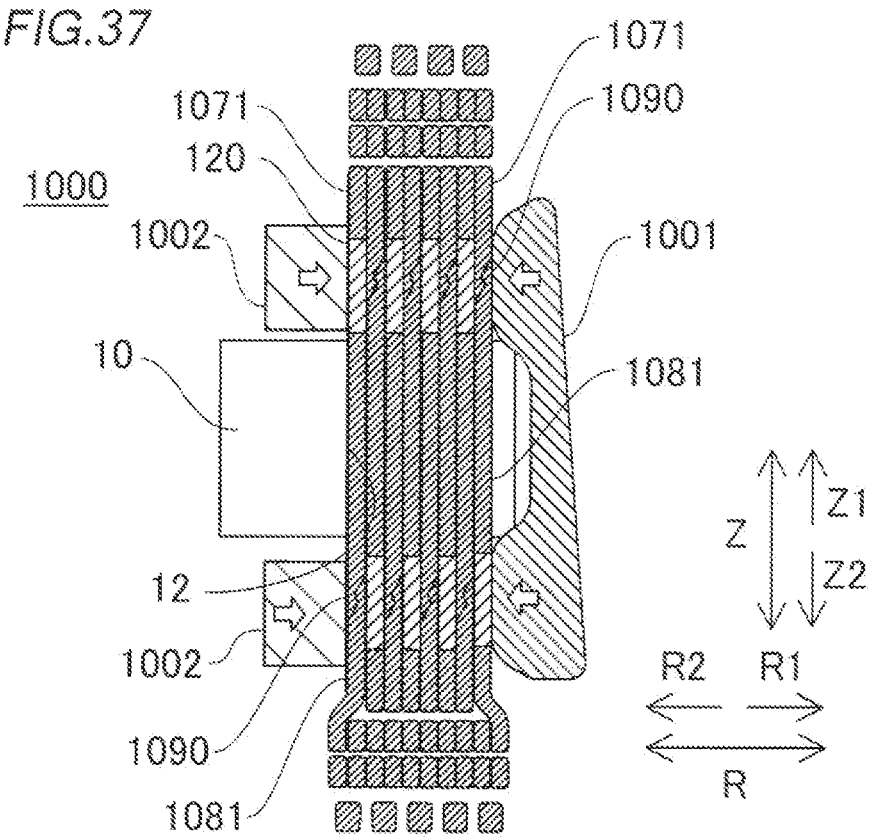

METHOD OF MANUFACTURING ARMATURE

This application is a Division of U.S. application Ser. No. 16/762,055 filed May 6, 2020, which is a National Stage Application of PCT/JP2018/044082 filed Nov. 29, 2018, which in turn claims priority to Japanese Application No. 2018-017603 filed Feb. 2, 2018, and Japanese Application No. 2017-231114 filed Nov. 30, 2017. The entire disclosures of the prior applications are hereby incorporated by reference herein their entirety.

TECHNICAL FIELD

The preferred embodiment relates to a method of manufacturing of an armature.

BACKGROUND ART

There has hitherto been known a method of manufacturing an armature that includes an armature core provided with a plurality of slots that extend in the center axis direction. Such a method of manufacturing an armature is disclosed in Japanese Unexamined Patent Application Publication No. 2015-23771 (JP 2015-23771 A), for example.

JP 2015-23771 A discloses a method of manufacturing a rotary electric machine stator (hereinafter referred to as a "stator") that includes a stator core provided with a plurality of slots that extend in the axial direction. In the stator manufacturing method, a first-side conductor segment is inserted into the slots of the stator core from one axial side, and a second-side conductor segment is inserted into the slots from the other axial side. A conductive bonding material in a paste form is disposed between the distal end portion of the first-side conductor segment and the distal end portion of the second-side conductor segment. In this state, the distal end portion of the first-side conductor segment and the distal end portion of the second-side conductor segment are joined to each other by heating the first-side conductor segment and the second-side conductor segment while being pressed against each other from both sides in the axial direction, so that a coil is formed. After that, connection end portions of the coil and power lines are connected to each other.

RELATED ART-ART DOCUMENTS

Patent Documents

Patent Document 1: Japanese Unexamined Patent Application Publication No. 2015-23771 (JP 2015-23771 A)

SUMMARY

Problem to be Solved

In the method of manufacturing a stator described in JP 2015-23771 A, however, the connection end portions of the coil and the power lines are connected (joined) to each other after the first-side conductor segment and the second-side conductor segment are disposed in the stator core, and therefore a tool space for performing joining work (e.g. welding work) is required around the connection end portions of the coil. Therefore, in the method of manufacturing a stator, it is necessary to dispose members around the connection end portions of the coil away from the connection end portions of the coil in consideration of the tool space, in order to connect the connection end portions (end portions of the coil portion) of the coil to the power lines (a different member: an end portion of a different coil or a power terminal member). As a result, the stator (armature) is increased in size in the method of manufacturing a stator described in JP 2015-23771 A.

The preferred embodiment has been made in view of addressing the foregoing issue, and therefore has an object to provide a method of manufacturing an armature that can prevent an increase in the size of the armature also in the case where end portions of a coil portion, or an end portion and a power terminal member, are connected to each other.

Means for Solving the Problem

In order to achieve the foregoing object, a first aspect of the preferred embodiment provides a method of manufacturing an armature that includes an armature core provided with a plurality of slots that extend in a center axis direction and a coil portion formed by joining a plurality of segment conductors including leg portions to each other and supplied with multi-phase AC power, the method including: a step of preparing first segment conductors, of the segment conductors, which constitute at least one end portion of the coil portion for each phase and in which a plurality of the end portions, or an end portion and a power terminal member, are electrically connected to each other; a step of disposing the leg portions of the first segment conductors and the leg portions of second segment conductors, which are the segment conductors which constitute a part of the coil portion other than the first segment conductors, in the armature core so as to face each other in the center axis direction after the step of preparing the first segment conductors; and a step of joining the leg portions of the first segment conductors and the leg portions of the second segment conductors to each other after the step of disposing the leg portions. The phrase "electrically connected" as used herein means a broad concept including not only a plurality of separate members joined to each other so as to be electrically conductive, but also a single member formed integrally so as to be electrically conductive.

In the method of manufacturing an armature according to the first aspect of the preferred embodiment, as described above, the first segment conductors in which a plurality of end portions, or an end portion and a power terminal member, are electrically connected to each other are formed, and thereafter the first segment conductors are disposed in the armature core. Consequently, since the first segment conductors are disposed in the armature core with the plurality of end portions, or the end portion and the power terminal member, electrically connected to each other in advance, it is not necessary to secure a tool space (e.g. a space for insertion of the distal end portion of a tool for welding) for connecting between the plurality of end portions, or between the end portion and the power terminal member, around the end portion of the coil portion which is disposed in the armature core. As a result, an increase in the size of the armature can be prevented since a different member (such as a different portion of the coil portion) can be disposed in proximity to the end portion of the coil portion. As a result, an increase in the size of the armature can be prevented also in the case where the end portion of the coil portion is connected to the different member.

Effects of the Invention

According to the preferred embodiment, as described above, an increase in the size of the armature can be prevented also in the case where the end portions of the coil portion, or the end portion and the power terminal member, are connected to each other.

BRIEF DESCRIPTION OF THE DRAWINGS

FIGS. 8A and 8B are cross-sectional views illustrating the configuration of a segment conductor according to the first embodiment, in which FIG. 8A illustrates an insulating coating and FIG. 8B illustrates an insulating portion.

FIG. 19 is a flowchart illustrating steps of manufacturing the stator according to the first embodiment.

FIG. 32 illustrates the configuration of a stator according to a third modification of the first and second embodiments, in which

FIG. 35 illustrates the configuration of a power conductor and a general conductor according to the second embodiment, in which

FIG. 37 illustrates the configuration of a stator according to a ninth modification of the first and second embodiments.

DESCRIPTION

An embodiment of the preferred embodiment will be described below with reference to the drawings.

First Embodiment

[Structure of Stator]

The structure of a stator 100 according to a first embodiment will be described with reference to FIGS. 1 to 16. The stator 100 has a circular ring shape centered on a center axis C1. The stator 100 is an example of the "armature" in the claims.

Figure 1:
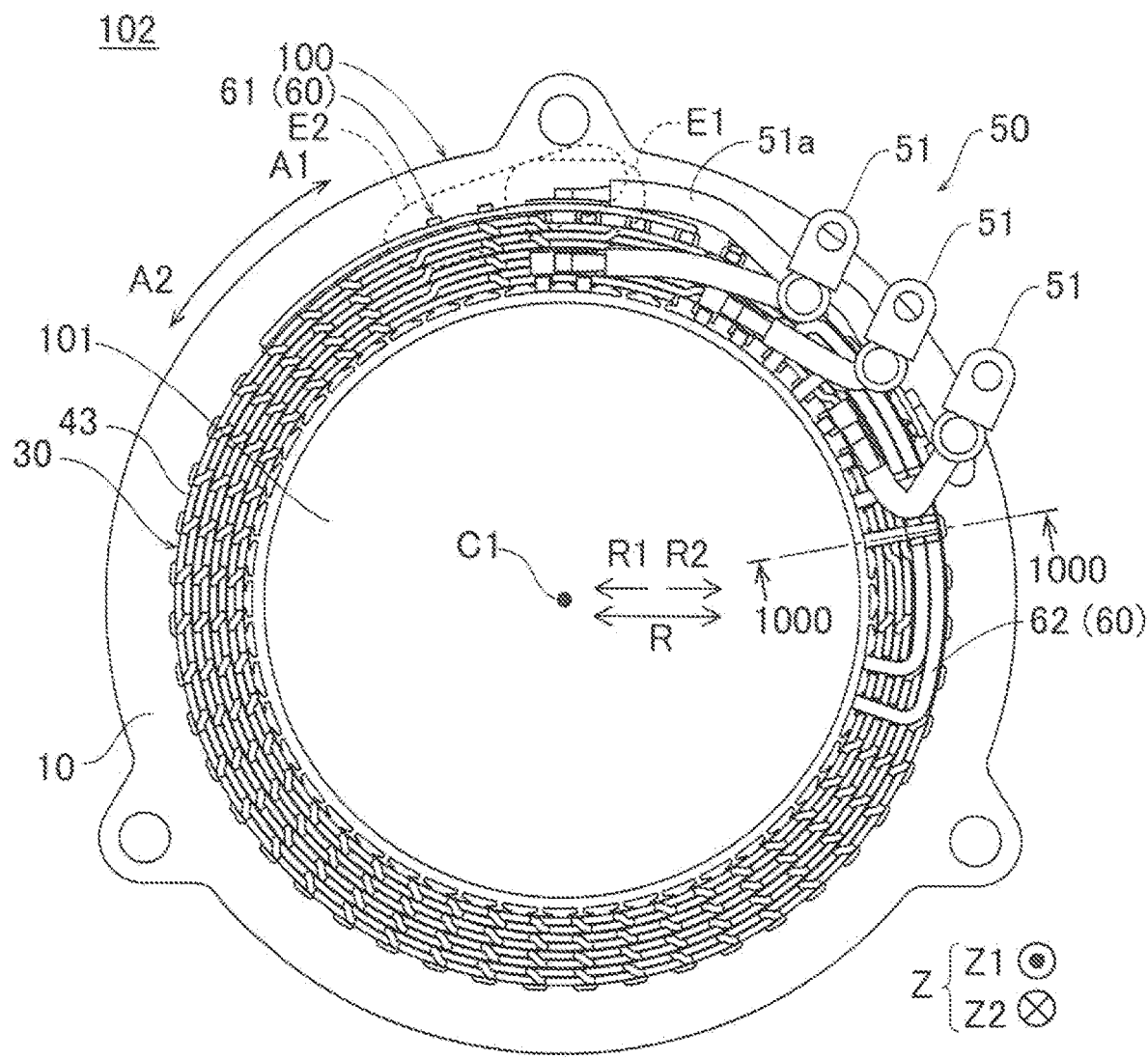
FIG. 1 is a plan view illustrating the configuration of a stator (rotary electric machine) according to a first embodiment.

The term "axial direction (center axis direction)" as used herein means the direction (Z direction) along the center axis C1 (rotational axis of a rotor 101) of the stator 100 as illustrated in FIG. 1. The term "circumferential direction" means the circumferential direction (A direction) of the stator 100. The term "radial direction" means the radial direction (R direction) of the stator 100. The term "radially inner side" means the direction (R1 direction) toward the center axis C1 of the stator 100. The term "radially outer side" means the direction (R2 direction) toward the outside of the stator 100.

The stator 100 constitutes a part of a rotary electric machine together with the rotor 101. The rotary electric machine is constituted as a motor, a generator, and a motor/generator, for example. As illustrated in FIG. 1, the stator 100 is disposed on the radially outer side of the rotor 101 which is provided with a permanent magnet (not illustrated). That is, in the first embodiment, the stator 100 constitutes a part of a rotary electric machine 102 of an inner rotor type.

Figure 2:
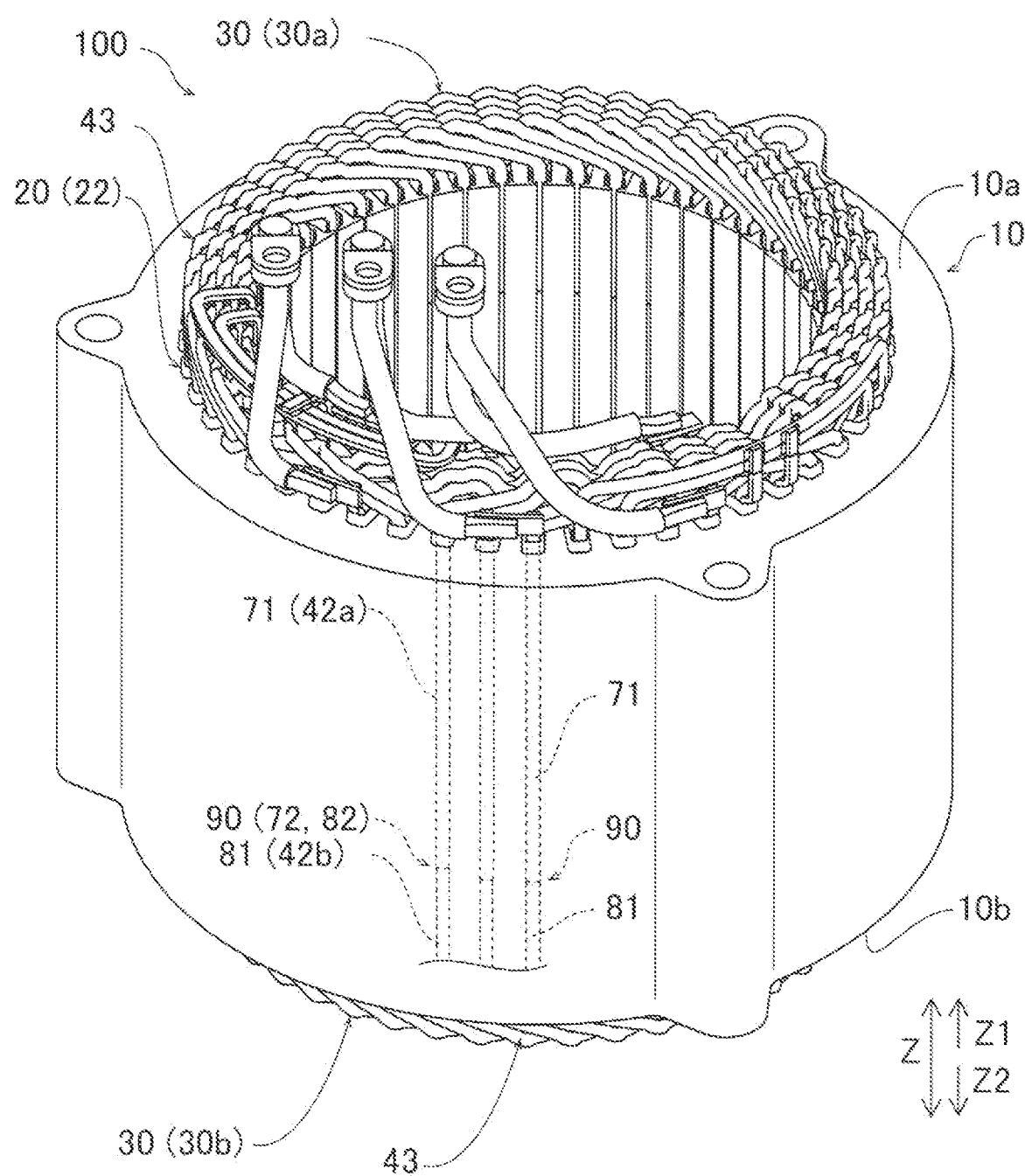
FIG. 2 is a perspective view illustrating the configuration of the stator according to the first embodiment.
Figure 3:
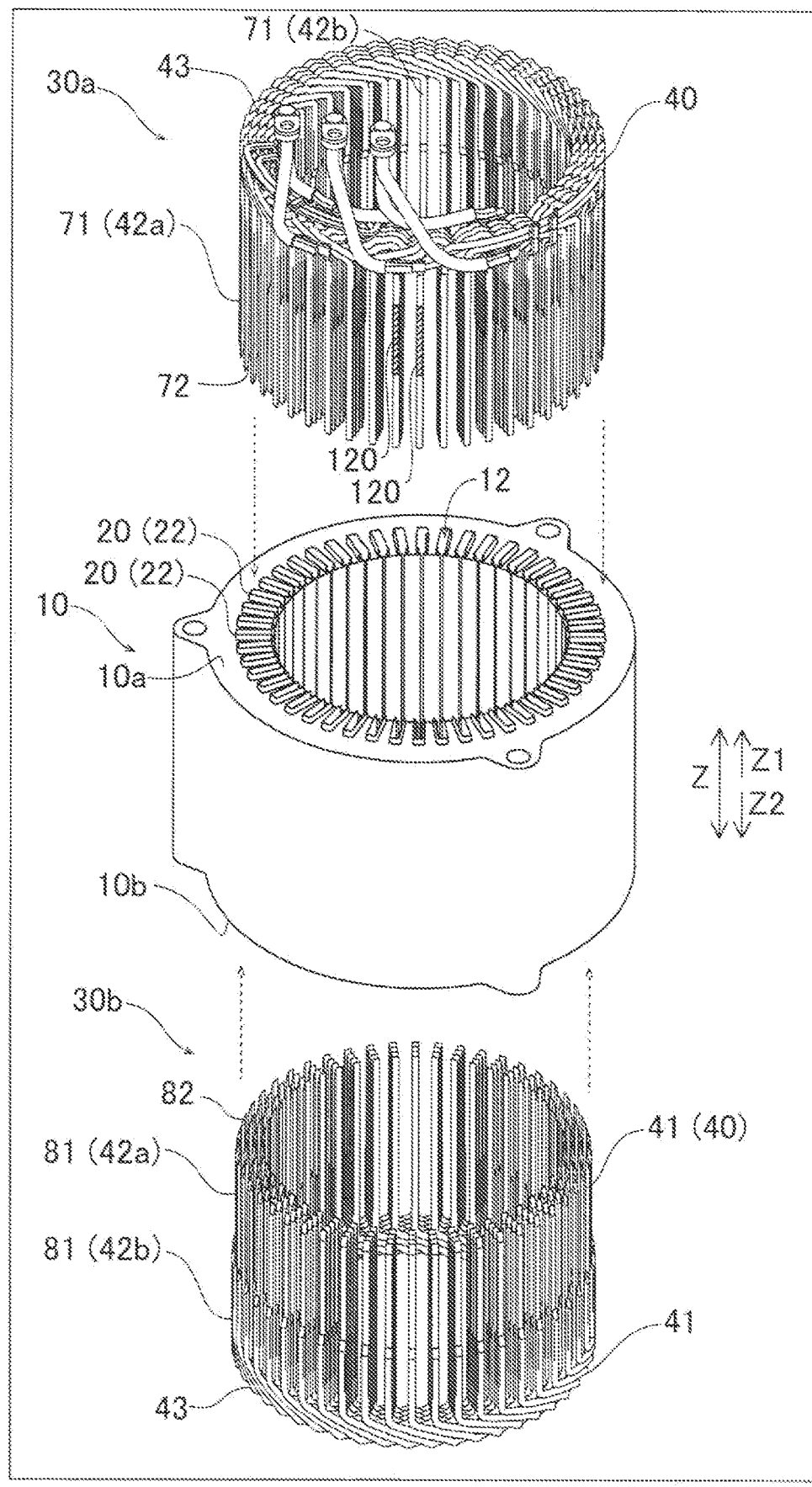
FIG. 3 is an exploded perspective view of the stator according to the first embodiment.

As illustrated in FIG. 2, the stator 100 includes a stator core 10, slot insulating paper 20, and a coil portion 30. As illustrated in FIG. 3, in addition, the coil portion 30 includes a first coil assembly 30a and a second coil assembly 30b. In addition, the coil portion 30 is composed of a plurality of segment conductors 40. The stator core 10 is an example of the "armature core" in the claims.

(Structure of Stator Core)

Figure 4:
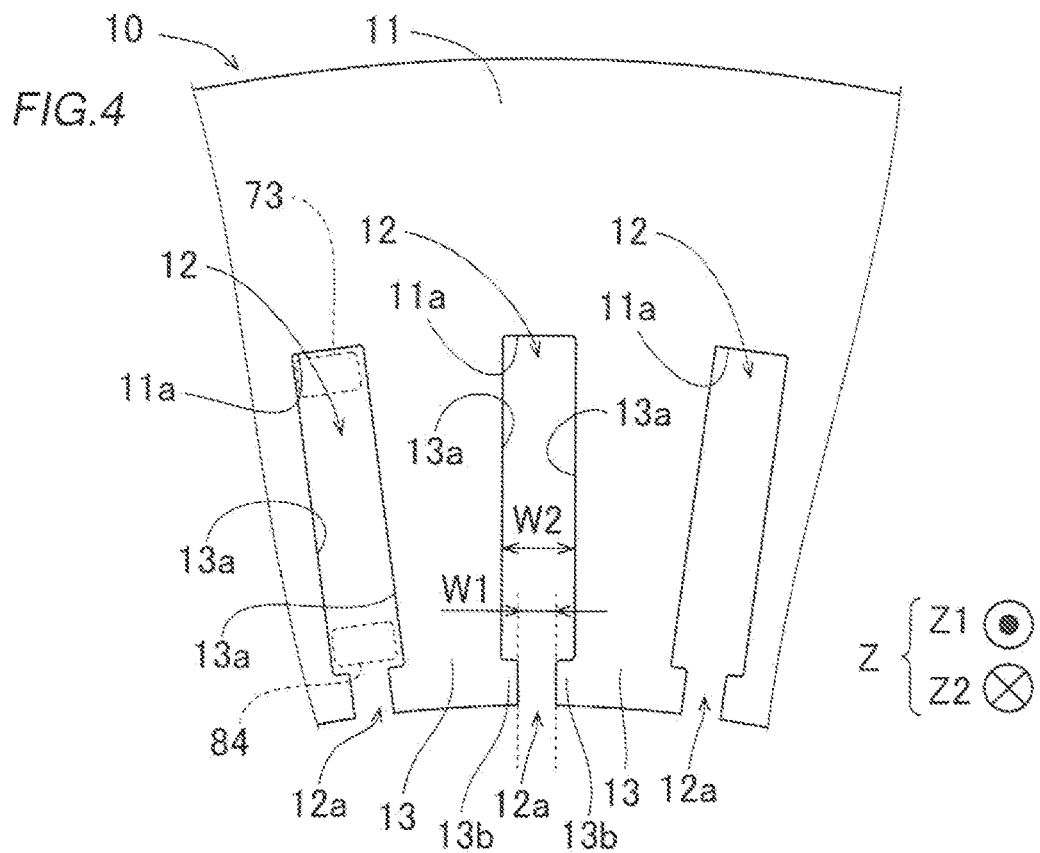
FIG. 4 is a plan view illustrating the configuration of a stator core according to the first embodiment.

The stator core 10 has a cylindrical shape centered on the center axis C1 (see FIG. 1). In addition, the stator core 10 is formed by stacking a plurality of electromagnetic steel sheets (e.g. silicon steel sheets) in the axial direction, for example. As illustrated in FIG. 4, the stator core 10 is provided with a back yoke 11 in a circular ring shape as seen in the axial direction and a plurality of slots 12 provided on the radially inner side of the back yoke 11 to extend in the axial direction. The stator core 10 includes a plurality of teeth 13 provided on both sides of the slots 12 in the circumferential direction.

The slots 12 are each a portion surrounded by a wall portion 11a of the back yoke 11 provided on the radially outer side with respect to a first other end surface 73, to be discussed later, and respective circumferential side surfaces 13a of two teeth 13. The slots 12 are each provided with an opening portion 12a provided on the radially inner side with respect to a second one end surface 84, to be discussed later, to open on the radially inner side. In addition, the slots 12 open on both sides in the axial direction. The teeth 13 are formed so as to project toward the radially inner side from the back yoke 11, and each have a projecting portion 13b formed at the distal end portion thereof on the radially inner side to constitute the opening portions 12a of the slots 12.

The opening portion 12a has an opening width W1 in the circumferential direction. Here, the opening width W1 corresponds to the distance between the respective distal end portions of the projecting portions of the projecting portions 13b of the teeth 13. Meanwhile, a width W2 of a portion of the slot 12 in which the coil portion 30 and the slot insulating paper 20 are disposed is larger than the opening width W1. That is, the slots 12 are constituted as semi-open slots. Here, the width W2 corresponds to the distance between the respective circumferential side surfaces 13a of the teeth 13 which are disposed on both sides of the slot 12. In addition, the width W2 of the slots 12 is generally constant over the radial direction.

(Structure of Slot Insulating Paper)

Figure 5:
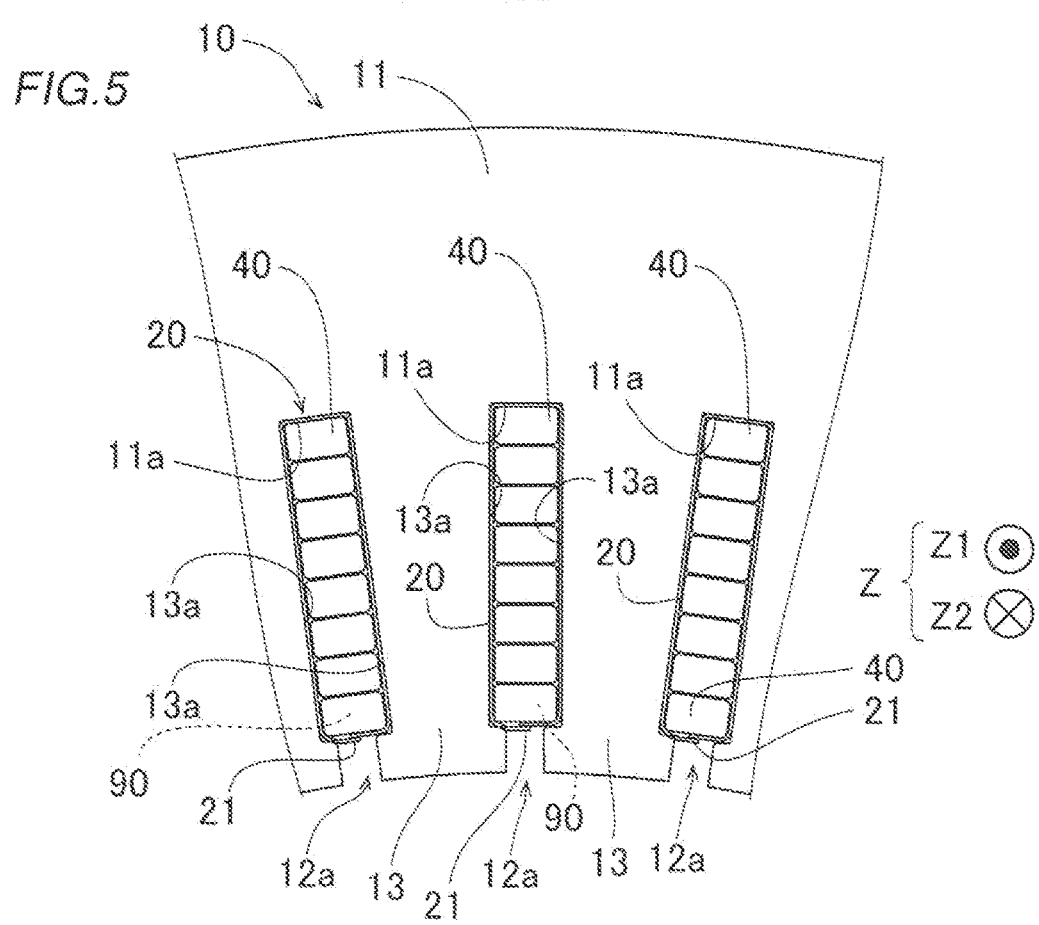
FIG. 5 is a sectional view illustrating the configuration of slot insulating paper according to the first embodiment.

As illustrated in FIG. 5, the slot insulating paper 20 is disposed between the teeth 13 and the segment conductors 40. Here, the slot insulating paper 20 includes a joint portion cover portion 21. The joint portion cover portion 21 is configured to cover at least the radially inner side of a joint portion 90, to be discussed later, of the segment conductor 40 disposed closest to the opening portion 12a of the slot 12, among the plurality of segment conductors 40 which are disposed in parallel in the radial direction.

Particularly, the slot insulating paper 20 is constituted of an insulating member in a sheet shape such as aramid paper and a polymer film, for example, and has a function of securing the insulation between the segment conductors 40 (coil portion 30) and the stator core 10. The slot insulating paper 20 is disposed between the segment conductors 40 and the circumferential side surfaces 13a of the teeth 13 and between the segment conductor 40 disposed on the radially outermost side, among the plurality of segment conductors 40, and the wall portion 11a. In addition, as illustrated in FIG. 3, the slot insulating paper 20 includes collar portions 22 (cuff portions) that project axially outward from the slot 12 on both sides in the axial direction and that are folded back to be formed.

The slot insulating paper 20 is disposed so as to integrally cover the periphery of the plurality of segment conductors 40 which are disposed in parallel in the radial direction as seen in the direction of the arrow Z2. In other words, the slot insulating paper 20 covers both sides, in the circumferential direction, and both sides, in the radial direction, of slot housed portions 42a and 42b, to be discussed later, of the plurality of segment conductors 40 which are disposed in parallel in the radial direction. Consequently, the slot insulating paper 20 can secure the insulation between the joint portion 90 and the stator core 10. The slot housed portions 42a and 42b are an example of the "leg portions" in the claims.

(Structure of Coil Portion)

As illustrated in FIGS. 2 and 3, the coil portion 30 is formed by combining, in the axial direction, and joining the first coil assembly 30a, which is provided on one axial side (side in the direction of the arrow Z1), and the second coil assembly 30b, which is provided on the other axial side (side in the direction of the arrow Z2). The first coil assembly 30a and the second coil assembly 30b are each formed in a circular ring shape about the center axis C1 (see FIG. 1) as with the stator core 10.

The coil portion 30 is constituted as a wave-wound coil, for example. In addition, the coil portion 30 is constituted as an eight-turn coil, for example. That is, as illustrated in FIG. 5, the coil portion 30 is constituted with eight segment conductors 40 disposed in parallel in the radial direction in each slot 12. The coil portion 30 is supplied with three-phase AC power from a power source portion (not illustrated) so as to generate magnetic flux with a current flowing one way and the other in the axial direction and with a current flowing in the circumferential direction.

<Configuration of Connection of Coil Portion>

Figure 6:
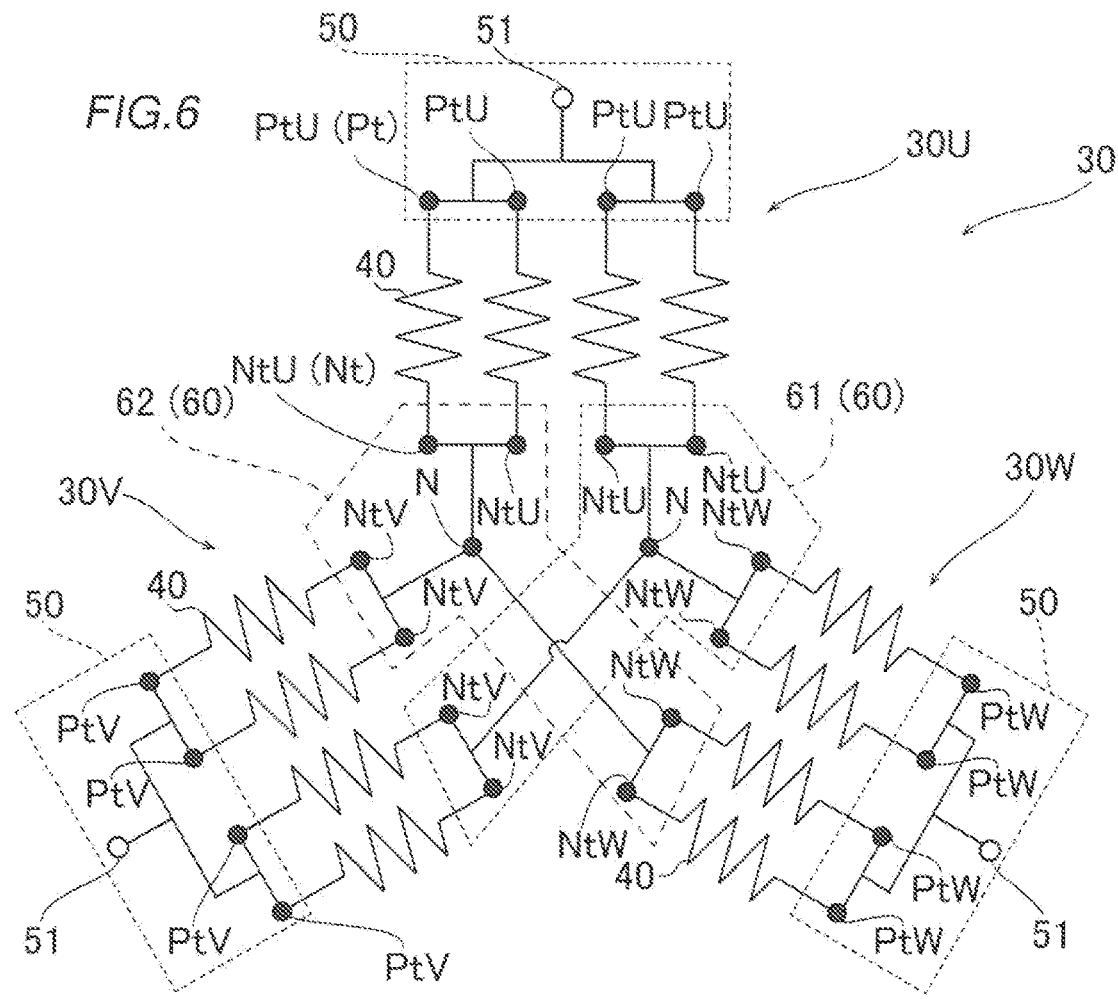
FIG. 6 is a circuit diagram illustrating the connection configuration of a coil portion according to the first embodiment.

As illustrated in FIG. 6, the coil portion 30 is connected through a Y connection of three phases. That is, the coil portion 30 includes a U-phase coil portion 30U, a V-phase coil portion 30V, and a W-phase coil portion 30W. For example, the coil portion 30 is provided with a plurality of neutral points N. Particularly, the coil portion 30 is connected through a four-parallel connection (star connection). That is, the U-phase coil portion 30U is provided with four neutral point connection end portions NtU and four power-side end portions PtU. The V-phase coil portion 30V is provided with four neutral point connection end portions NtV and four power-side end portions PtV. The W-phase coil portion 30W is provided with four neutral point connection end portions NtW and four power-side end portions PtW. In the following description, the neutral point connection end portions and the power-side end portions will be referred to simply as "neutral point connection end portions Nt" and "power-side end portions Pt" in the case where U-phase, V-phase, and W-phase are not specifically differentiated from each other. The neutral point connection end portions Nt and the power-side end portions Pt are examples of the "coil end portion" in the claims.

<Structure of Coil Assembly>

Figure 7:
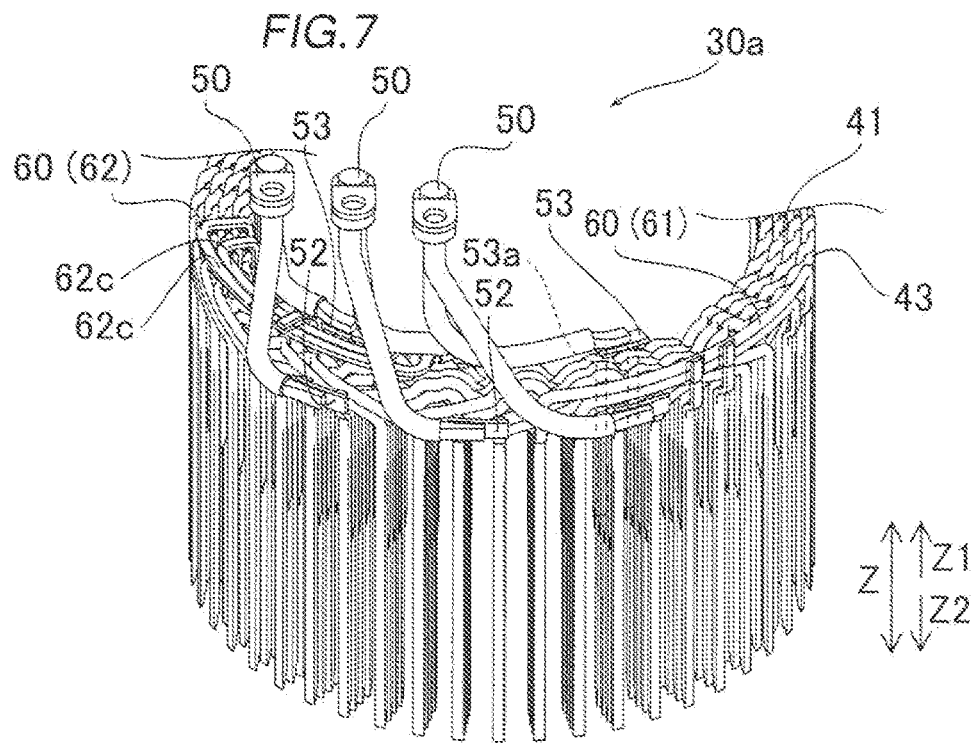
FIG. 7 is a perspective view illustrating a part of a first coil assembly according to the first embodiment.

As illustrated in FIG. 7, the first coil assembly 30a includes: a plurality of (e.g. three) power line connection segment conductors 50 (hereinafter referred to as "power conductors 50") that serve as the segment conductors 40; a plurality of (e.g. two) neutral point connection segment conductors 60 (hereinafter referred to as "neutral point conductors 60") that serve as the segment conductors 40; and a plurality of general conductors 41 that are conductors (general segment conductors 40) that are different from the power conductors 50 and the neutral point conductors 60, among the plurality of segment conductors 40, and that constitute the coil portion 30. The power conductors 50 and the neutral point conductors 60 are examples of the "first segment conductor" in the claims. In addition, the general conductors 41 are examples of the "second segment conductor" and the "third segment conductor" in the claims.

As illustrated in FIG. 3, the second coil assembly 30b is constituted from a plurality of general conductors 41. Preferably, the second coil assembly 30b is constituted from only the plurality of general conductors 41, and all the power conductors 50 and the neutral point conductors 60 provided in the stator 100 are provided in the first coil assembly 30a.

(Structure of Segment Conductors)

Figure 8A:
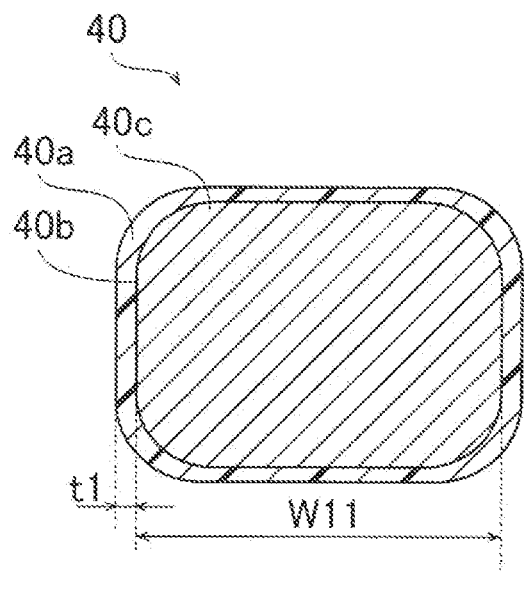
Figure 8B:
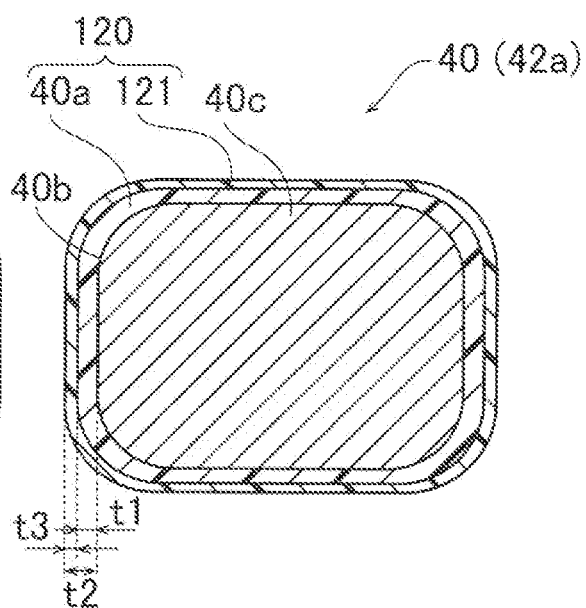

As illustrated in FIG. 8A, the segment conductor 40 is constituted as a rectangular conductive wire which has a generally rectangular cross-sectional surface. An insulating coating 40a which has a thickness t1 is provided on a conductor surface 40b of the segment conductor 40. The thickness t1 of the insulating coating 40a is set to such a level that enables securing the insulation performance between different phases (insulation between coil end portions 43), for example. Particularly, the insulating coating 40a is constituted of a coating agent such as polyimide. Meanwhile, a conductor body 40c of the segment conductor 40 is constituted of a metal material (conductive material) such as copper or aluminum, for example. While FIGS. 8A and 8B illustrate components with size relationship such as thickness thereof exaggerated for illustration, the preferred embodiment is not limited thereto.

As illustrated in FIG. 2, the segment conductor 40 includes the slot housed portions 42a and 42b to be disposed in the slots 12 and the coil end portion 43. The slot housed portions 42a and 42b mean portions to be disposed in the slots 12 from the axial position of an end surface 10a or 10b of the stator core 10. The coil end portion 43 means a portion formed to be continuous with the slot housed portions 42a and 42b and disposed on the axially outer side with respect to the end surface 10a or 10b of the stator core 10. In addition, the coil end portion 43 has an offset portion shaped to be bent in the axial direction and offset in the radial direction at the bent portion.

<Structure of General Conductors>

Figure 9:
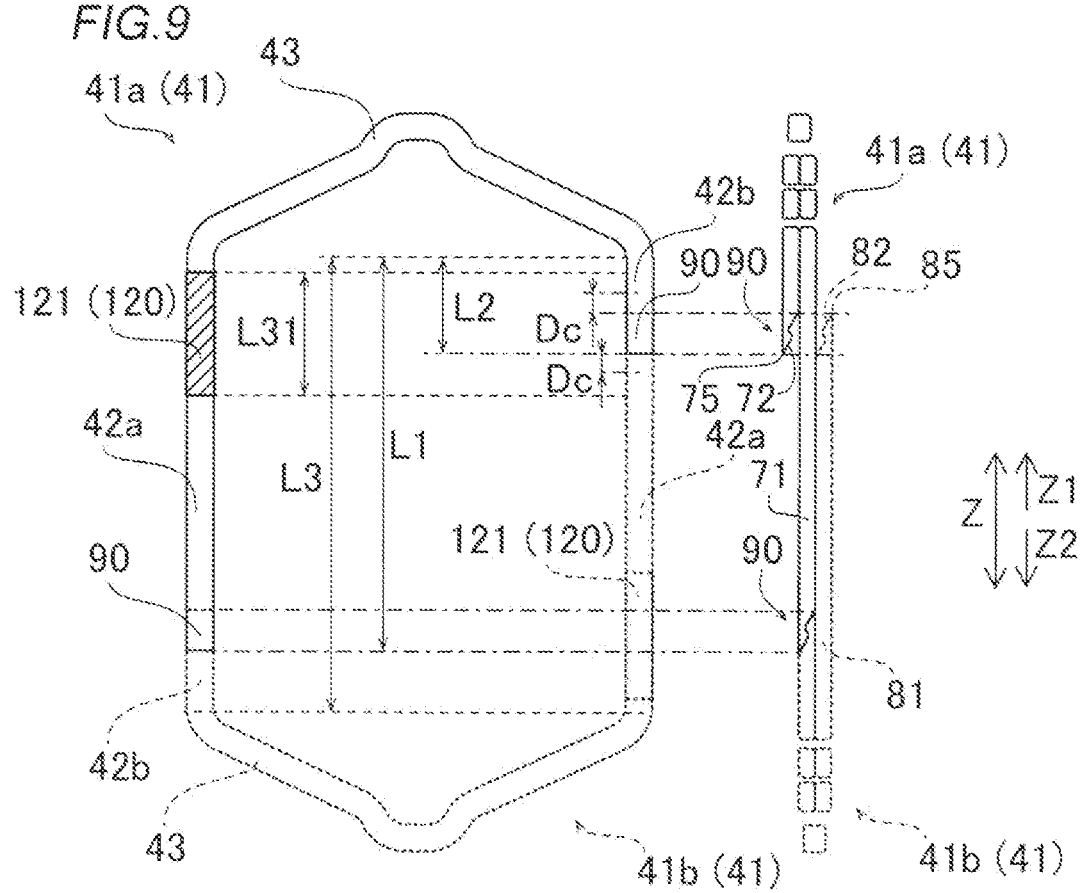
FIG. 9 illustrates the configuration of a general conductor according to the first embodiment.

As illustrated in FIG. 9, the general conductor 41 includes a pair of slot housed portions 42a and 42b to be disposed in different slots 12 (circumferential positions) and a coil end portion 43 that connects between the pair of slot housed portions 42a and 42b. Consequently, the general conductor 41 has a generally U-shape or a generally J-shape as seen from the radially inner side. The slot housed portions 42a and 42b are formed to be straight along the axial direction. The slot housed portions 42a and 42b of the power conductors 50 and the slot housed portions 42a and 42b of the neutral point conductors 60 are configured similarly to the slot housed portions 42a and 42b of the general conductors 41, and therefore are not described.

Here, the coil pitch of the general conductor 41 is six. That is, the pair of slot housed portions 42a and 42b are disposed at positions six slots 12 away from each other in the circumferential direction. That is, five slots are provided between the slot 12 in which the slot housed portion 42a of the general conductor 41 is disposed and the slot 12 in which the slot housed portion 42b is disposed.

In the first embodiment, in addition, the pair of slot housed portions 42a and 42b have different axial lengths. Specifically, an axial length L1 of the slot housed portion 42a is longer than an axial length L2 of the slot housed portion 42b. The axial length L1 (L2) of the slot housed portion 42a (42b) means the length from a distal end 75 (85) to the axial position corresponding to the axial end surface 10a (10b) of the stator core 10. In addition, the axial lengths L1 and L2 are smaller than an axial length L3 of the stator core 10. The axial length L3 of the stator core 10 means the distance (interval) between the axial end surfaces 10a and 10b. For example, the axial length L1 is longer than half the axial length L3, and the axial length L2 is shorter than half the axial length L3.

In addition, the plurality of general conductors 41 include first general conductors 41a disposed on one axial side (side in the direction of the arrow Z1) with respect to the stator core 10 and included in the first coil assembly 30a, and second general conductors 41b disposed on the other axial side (side in the direction of the arrow Z2) with respect to the stator core 10 and included in the second coil assembly 30b. The first general conductors 41a are examples of the "third segment conductor" in the claims. In addition, the second general conductors 41b are examples of the "second segment conductor" in the claims.

<Structure of Power Conductors>

In the power conductor 50, as illustrated in FIG. 6, a plurality of (e.g. four) power-side end portions Pt for the same phase are electrically connected to each other, and the plurality of power-side end portions Pt which are connected to each other and a power terminal member 51 are electrically connected to each other. The power conductors 50 have a function of introducing power from a power source portion (not illustrated) to the coil portion 30.

Particularly, as illustrated in FIG. 7, the power conductor 50 includes a radially outer power conductor 52 disposed on the axially outer side of the stator core 10 and having the power-side end portions Pt which serve as radially outer power-side end portions, and a radially inner power conductor 53 disposed on the radially inner side and having the power-side end portions Pt which serve as radially inner power-side end portions. In other words, the power conductor 50 is formed in a bifurcated shape.

Figure 10:
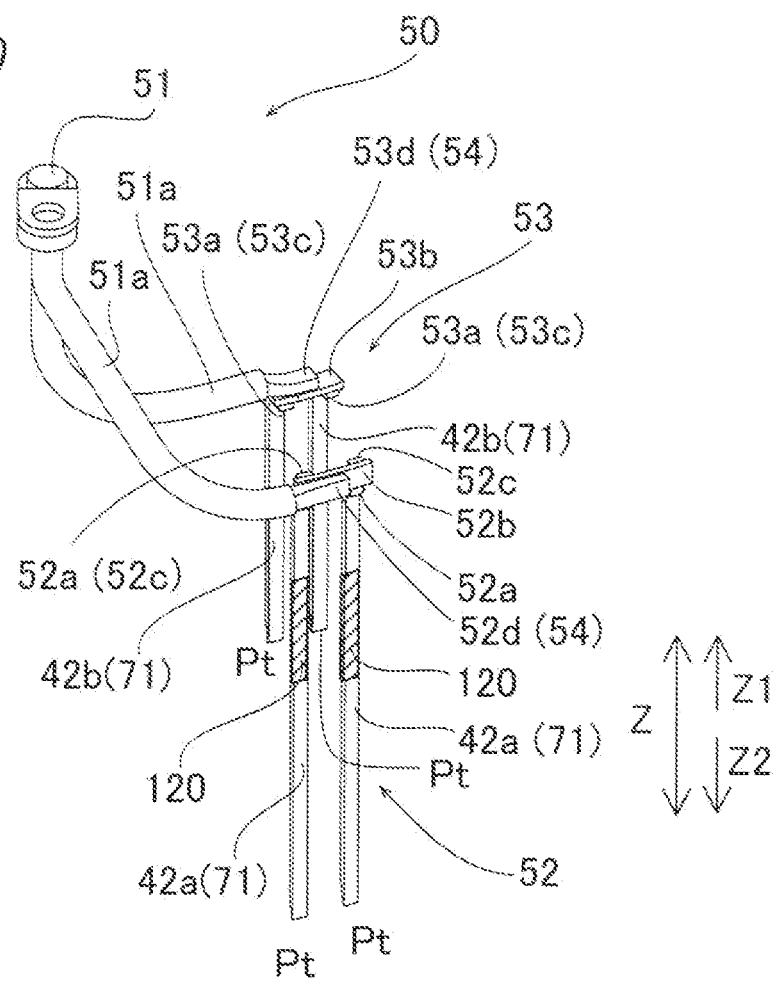
FIG. 10 illustrates the configuration of a power conductor according to the first embodiment.

Here, in the first embodiment, as illustrated in FIG. 10, the radially outer power conductor 52 and the power terminal member 51 are electrically connected to each other by a lead wire 54. In addition, the radially inner power conductor 53 and the power terminal member 51 are electrically connected to each other by a lead wire 54. The radially outer power conductor 52 and the radially inner power conductor 53 are electrically connected to each other via the power terminal member 51 and the lead wires 54. In addition, the lead wires 54 are formed from a stranded wire (conductor), for example, with an insulating tube 51a disposed at the outer periphery thereof.

The radially outer power conductor 52 includes two slot housed portions 42a, two power line coil end portions 52a that constitute two power-side end portions Pt and that are led out from the slot housed portions 42a in the axial direction, and a conductor plate 52b joined to the two power line coil end portions 52a to be electrically connected thereto. For example, the conductor plate 52b is joined to the radially outer side of the two power line coil end portions 52a, and the lead wire 54 is joined to the radially outer side of the conductor plate 52b.

The two power line coil end portions 52a and the conductor plate 52b are connected to each other by being welded at end portion joint portions (e.g. welded portions) 52c. In addition, the conductor plate 52b and the lead wire 54 are connected to each other by being brazed or welded at an end portion joint portion (e.g. welded portion) 52d. For example, the welding is implemented through any of resistance welding, arc welding, laser welding, and high-energy beam welding.

Figure 11:
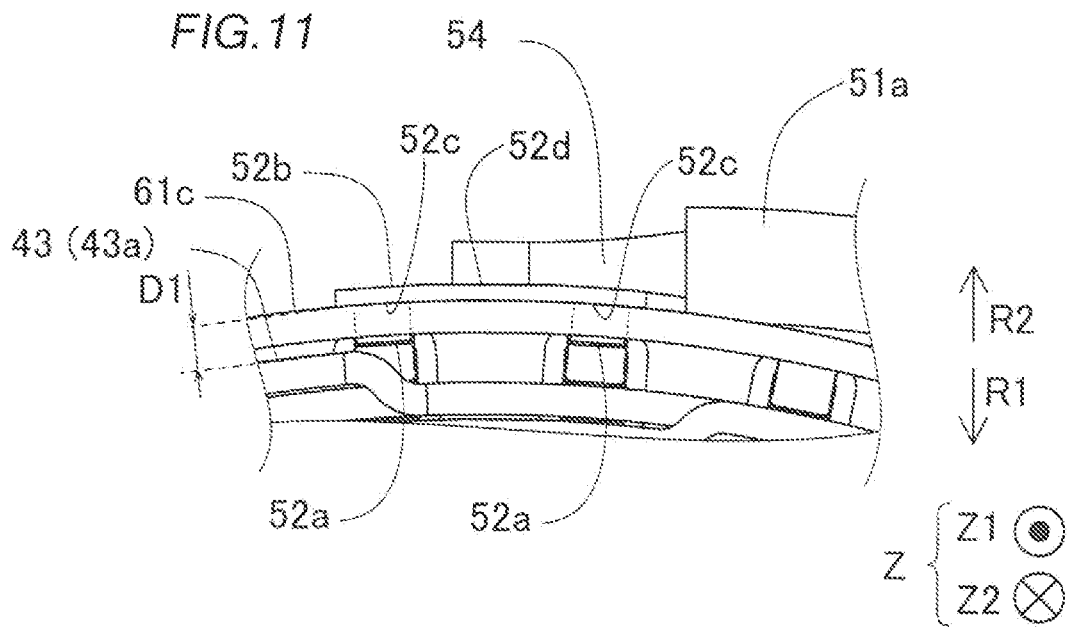
FIG. 11 is an enlarged view of a portion indicated by symbol E1 in FIG. 1.

Here, as illustrated in FIG. 11, a spacing D1 in the radial direction between the end portion joint portion 52c and the end portion joint portion 52d (conductor plate 52b) and an end surface 43a, on the radially outer side, of the coil end portion 43 of the general conductor 41 is equal to or less than twice a width W11 of the cross-sectional surface (see FIGS. 8A and 8B) of the segment conductor 40 (preferably equal to or less than the width W11). For example, no welding tool space is provided between the end portion joint portion 52c and the end portion joint portion 52d and the coil end portion 43.

As illustrated in FIG. 10, the radially inner power conductor 53 includes two slot housed portions 42b, two power line coil end portions 53a that constitute two power-side end portions Pt and that are led out from the slot housed portions 42b in the axial direction, and a conductor plate 53b joined to the two power line coil end portions 53a to be electrically connected thereto. For example, the conductor plate 53b is joined to the axially outer side (side in the direction of the arrow Z1) of the two power line coil end portions 53a, and the lead wire 54 is joined to the axially outer side (side in the direction of the arrow Z1) of the conductor plate 53b.

Figure 12:
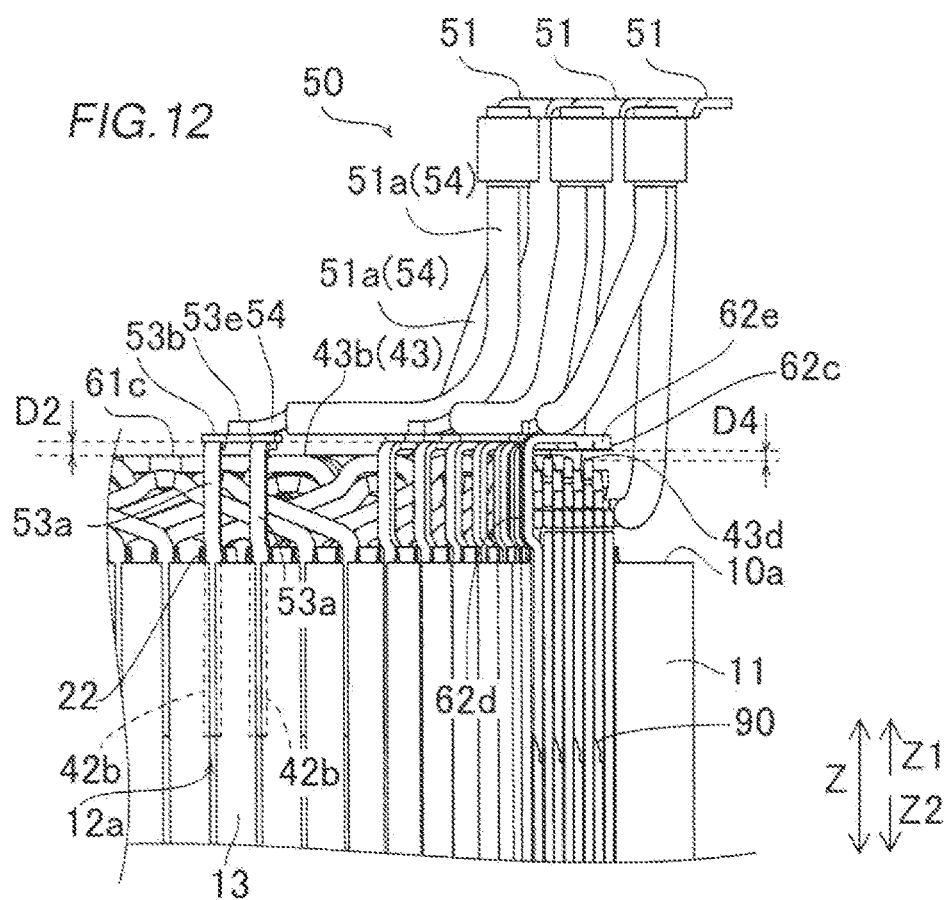
FIG. 12 is a sectional view taken along the line 1000-1000 in FIG. 1.

The two power line coil end portions 53a and the conductor plate 53b are connected to each other by being welded at end portion joint portions (e.g. welded portions) 53c. In addition, the conductor plate 53b and the lead wire 54 are connected to each other by being welded at an end portion joint portion (e.g. welded portion) 53d. Here, as illustrated in FIG. 12, a spacing D2 in the axial direction between the end portion joint portion 53c and the end portion joint portion 53d (conductor plate 53b) and an end surface 43b, on one axial side, of the coil end portion 43 of the general conductor 41 is equal to or less than twice the width W11 of the cross-sectional surface (see FIGS. 8A and 8B) of the segment conductor 40 (preferably equal to or less than the width W11). The end portion joint portions 53c and the end portion joint portion 53d are examples of the "end portion joint portion" in the claims.

The slot pitch of the radially outer power conductor 52 is one for a portion formed from the slot housed portions 42a and the conductor plate 52b, and zero if only the slot housed portions 42a are considered as the segment conductors 40. Meanwhile, the slot pitch of the radially inner power conductor 53 is one for a portion formed from the slot housed portions 42b and the conductor plate 53b, and zero if only the slot housed portions 42b are considered as the segment conductors 40. That is, the slot pitch of the power conductor 50 is different from the slot pitch (6) of the general conductor 41.

<Structure of Neutral Point Conductors>

As illustrated in FIG. 7, the neutral point conductors 60 include a radially outer neutral point conductor 61 and a radially inner neutral point conductor 62. As illustrated in FIG. 6, the radially outer neutral point conductor 61 and the radially inner neutral point conductor 62 each include a neutral point N, at which the neutral point connection end portions NtU of the U-phase coil portion 30U, the neutral point connection end portions NtV of the V-phase coil portion 30V, and the neutral point connection end portions NtW of the W-phase coil portion 30W are electrically connected to each other. The radially outer neutral point conductor 61 and the radially inner neutral point conductor 62 are examples of the "first segment conductor" in the claims.

Figure 13:
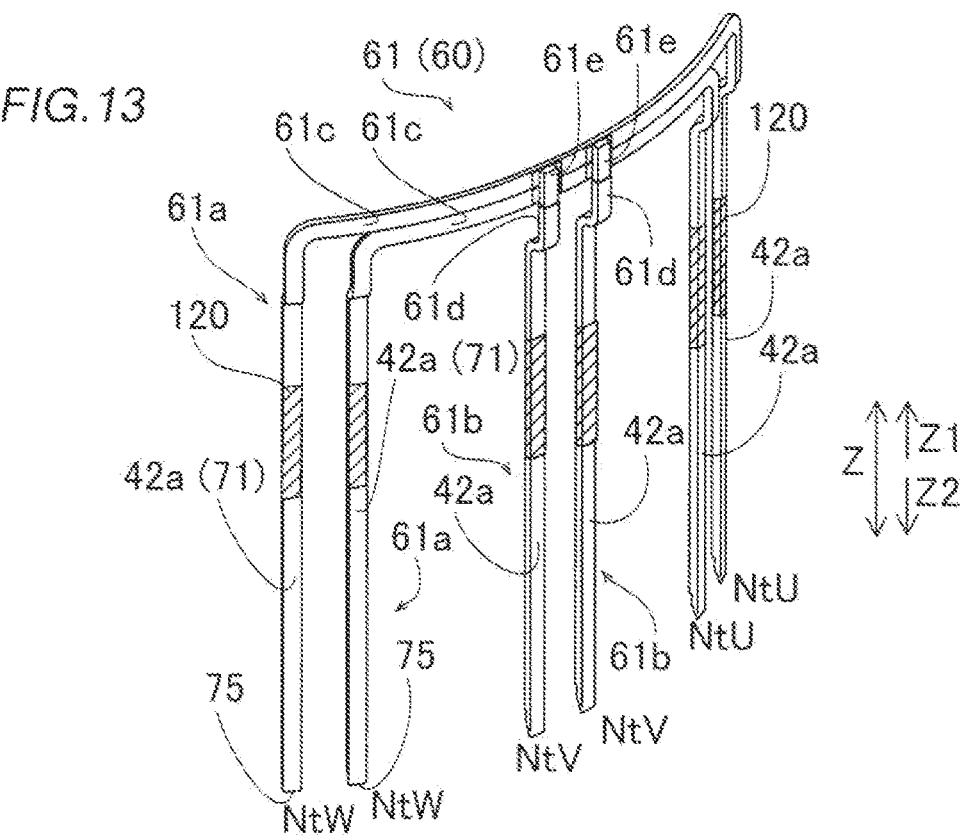
FIG. 13 is a perspective view illustrating the configuration of a radially outer neutral point conductor according to the first embodiment.

As illustrated in FIG. 13, the radially outer neutral point conductor 61 includes two U-phase/W-phase neutral point segment conductors 61a and two V-phase neutral point segment conductors 61b. The U-phase/W-phase neutral point segment conductors 61a each include a slot housed portion 42a for U-phase to be connected to the general conductor 41 for U-phase of three-phase AC, a slot housed portion 42a for W-phase to be connected to the general conductor 41 for W-phase, and two neutral point coil end portions 61c that each connect between the slot housed portion 42a for U-phase and the slot housed portion 42a for W-phase. The neutral point coil end portions 61c are each formed to be continuous with the slot housed portion 42a for U-phase, and formed to be continuous with the slot housed portion 42a for W-phase. The U-phase/W-phase neutral point segment conductors 61a are examples of the "first neutral point-connection segment conductor" in the claims. In addition, the V-phase neutral point segment conductors 61b are examples of the "second neutral point-connection segment conductor" in the claims.

The U-phase/W-phase neutral point segment conductors 61a are each formed in a generally U-shape (generally C-shape) as seen from the radially inner side. The V-phase neutral point segment conductors 61b are each formed in a generally straight shape as seen from the radially inner side.

Figure 14:
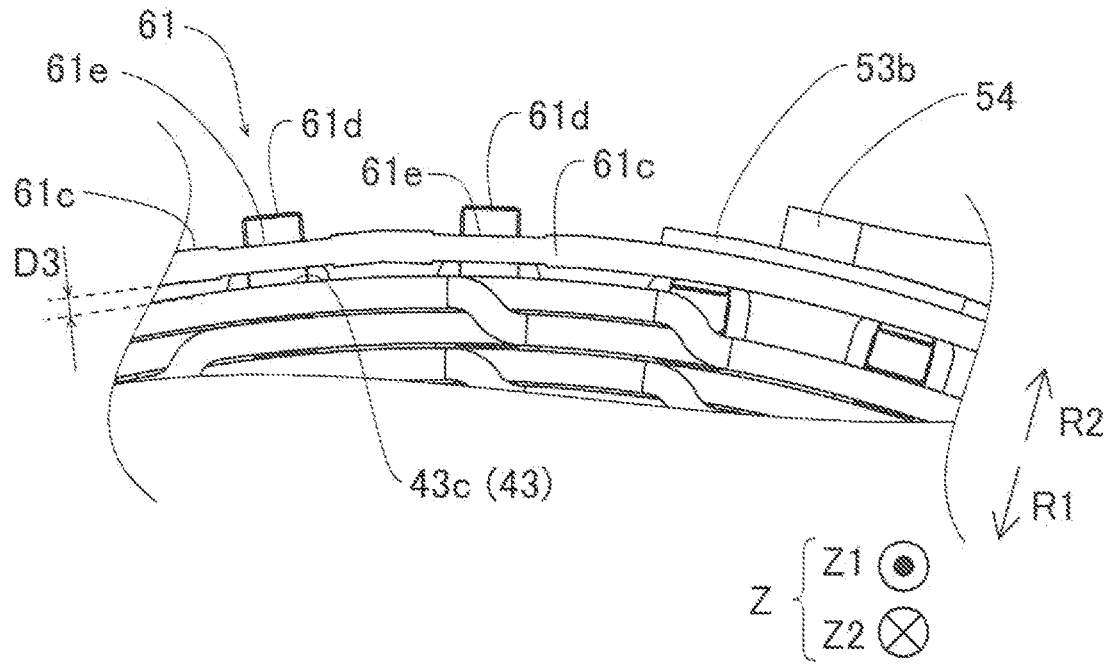
FIG. 14 is an enlarged view of a portion indicated by symbol E2 in FIG. 1.

As illustrated in FIG. 14, the neutral point coil end portions 61c are formed along the circumferential direction on the radially outer side of the coil end portion 43 of the general conductor 41. The neutral point coil end portions 61c are formed in a generally arcuate shape as seen in the direction of the arrow Z2.

In addition, the slot pitch of one of the two U-phase/W-phase neutral point segment conductors 61a is nine. Meanwhile, the slot pitch of the other of the two U-phase/W-phase neutral point segment conductors 61a is seven. That is, the U-phase/W-phase neutral point segment conductors 61a have a slot pitch that is different from the slot pitch (6) of the general conductor 41. One of the two U-phase/W-phase neutral point segment conductors 61a is disposed on the axially outer side (side in the direction of the arrow Z1) of the other.

As illustrated in FIG. 13, the V-phase neutral point segment conductors 61b each include a slot housed portion 42a for V-phase to be connected to the general conductor 41 for V-phase and a neutral point coil end portion 61d. The neutral point coil end portion 61d is formed so as to project toward the axially outer side (in the direction of the arrow Z1) from the slot housed portion 42a. Each of the two neutral point coil end portions 61d is joined to the two neutral point coil end portions 61c to be electrically joined thereto.

Specifically, as illustrated in FIG. 14, the two neutral point coil end portions 61d are welded at end portion joint portions (e.g. welded portions) 61e to the radially outer side of the two neutral point coil end portions 61c in an arcuate shape. Consequently, in the radially outer neutral point conductor 61, the neutral point connection end portions NtU of the U-phase coil portion 30U, the neutral point connection end portions NtV of the V-phase coil portion 30V, and the neutral point connection end portions NtW of the W-phase coil portion 30W are electrically connected to each other. A spacing D3 between the end portion joint portions 61e (an end surface of the neutral point coil end portions 61c on the radially inner side) and an end surface 43c, on the radially outer side, of the coil end portion 43 of the general conductor 41 is equal to or less than twice the width W11, along the radial direction, of the cross-sectional surface of the segment conductor 40 (preferably equal to or less than the width W11). The end portion joint portions 61e are examples of the "end portion joint portion" in the claims.

Figure 15:
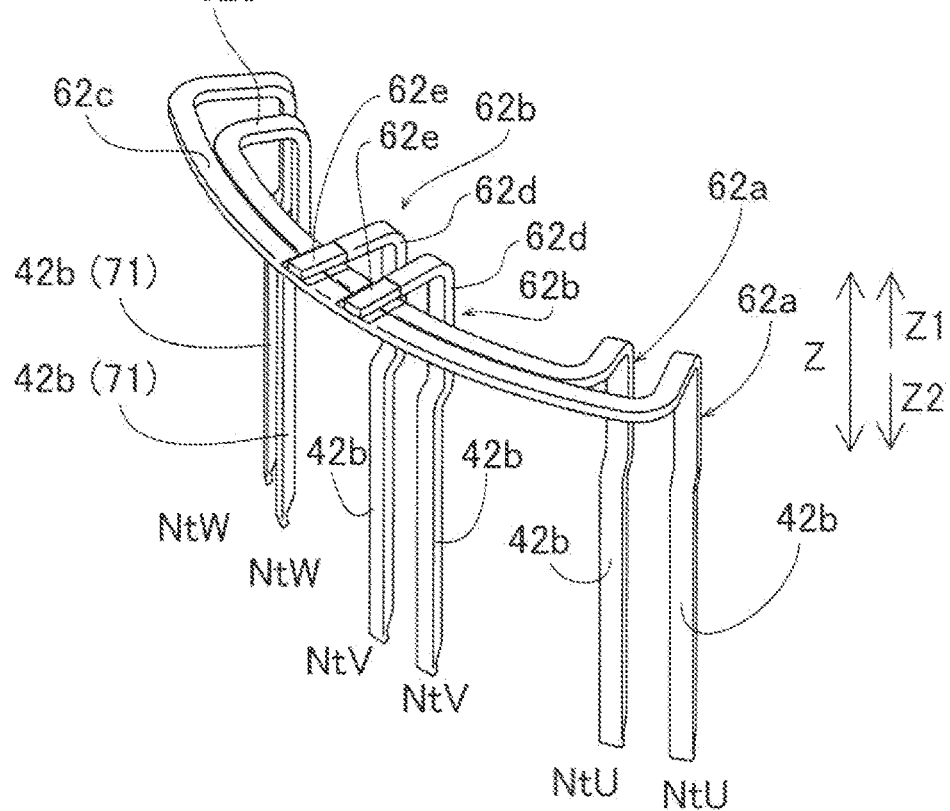
FIG. 15 is a perspective view illustrating the configuration of a radially inner neutral point conductor according to the first embodiment.

As illustrated in FIG. 15, the radially inner neutral point conductor 62 includes two U-phase/W-phase neutral point segment conductors 62a and two V-phase neutral point segment conductors 62b. The U-phase/W-phase neutral point segment conductors 62a each include a slot housed portion 42b for U-phase to be connected to the general conductor 41 for U-phase of three-phase AC, a slot housed portion 42b for W-phase to be connected to the general conductor 41 for W-phase, and a neutral point coil end portion 62c that connects between the slot housed portion 42b for U-phase and the slot housed portion 42b for W-phase. The neutral point coil end portions 62c are each formed to be continuous with the slot housed portion 42b for U-phase, and formed to be continuous with the slot housed portion 42b for W-phase. The U-phase/W-phase neutral point segment conductors 62a are examples of the "first neutral point-connection segment conductor" in the claims. In addition, the V-phase neutral point segment conductors 62b are examples of the "second neutral point-connection segment conductor" in the claims.

The U-phase/W-phase neutral point segment conductors 62a are each formed in a generally U-shape (generally C-shape) as seen from the radially inner side. The V-phase neutral point segment conductors 62b are each formed in a generally straight shape as seen from the radially inner side.

As illustrated in FIG. 7, the neutral point coil end portions 62c are formed on the radially inner side of the coil end portion 43 of the general conductor 41 to project toward the axially outer side with respect to the coil end portion 43 of the general conductor 41. The neutral point coil end portions 62c are disposed in proximity to the axially outer side of the coil end portion 43 of the general conductor 41, and formed along the circumferential direction as seen in the axial direction.

In addition, the slot pitch of one of the two U-phase/W-phase neutral point segment conductors 62a is nine. Meanwhile, the slot pitch of the other of the two U-phase/W-phase neutral point segment conductors 62a is seven. That is, the U-phase/W-phase neutral point segment conductors 62a have a slot pitch that is different from the slot pitch (6) of the general conductor 41. One of the two U-phase/W-phase neutral point segment conductors 62a is disposed on the radially outer side of the other.

The V-phase neutral point segment conductors 62b each include a slot housed portion 42b for V-phase to be connected to the general conductor 41 for V-phase and a neutral point coil end portion 62d. The neutral point coil end portion 62d is formed so as to project toward the axially outer side (in the direction of the arrow Z1) from the slot housed portion 42b. Each of the two neutral point coil end portions 62d is joined to the two neutral point coil end portions 62c to be electrically joined thereto.

Specifically, as illustrated in FIG. 15, the two neutral point coil end portions 62d are welded at end portion joint portions (e.g. welded portions) 62e to the axially outer side of the two neutral point coil end portions 62c in an arcuate shape. Consequently, in the radially inner neutral point conductor 62, the neutral point connection end portions NtU of the U-phase coil portion 30U, the neutral point connection end portions NtV of the V-phase coil portion 30V, and the neutral point connection end portions NtW of the W-phase coil portion 30W are electrically connected to each other. As illustrated in FIG. 12, a spacing D4 between the end portion joint portions 62e (an end surface of the neutral point coil end portions 62d on the axially inner side) and an end surface 43d, on the axially outer side, of the coil end portion 43 of the general conductor 41 is equal to or less than twice the width W11, along the radial direction, of the cross-sectional surface of the segment conductor 40 (preferably equal to or less than the width W11). The end portion joint portions 62e are examples of the "end portion joint portion" in the claims.

(Configuration of Joint Portions)

Figure 16:
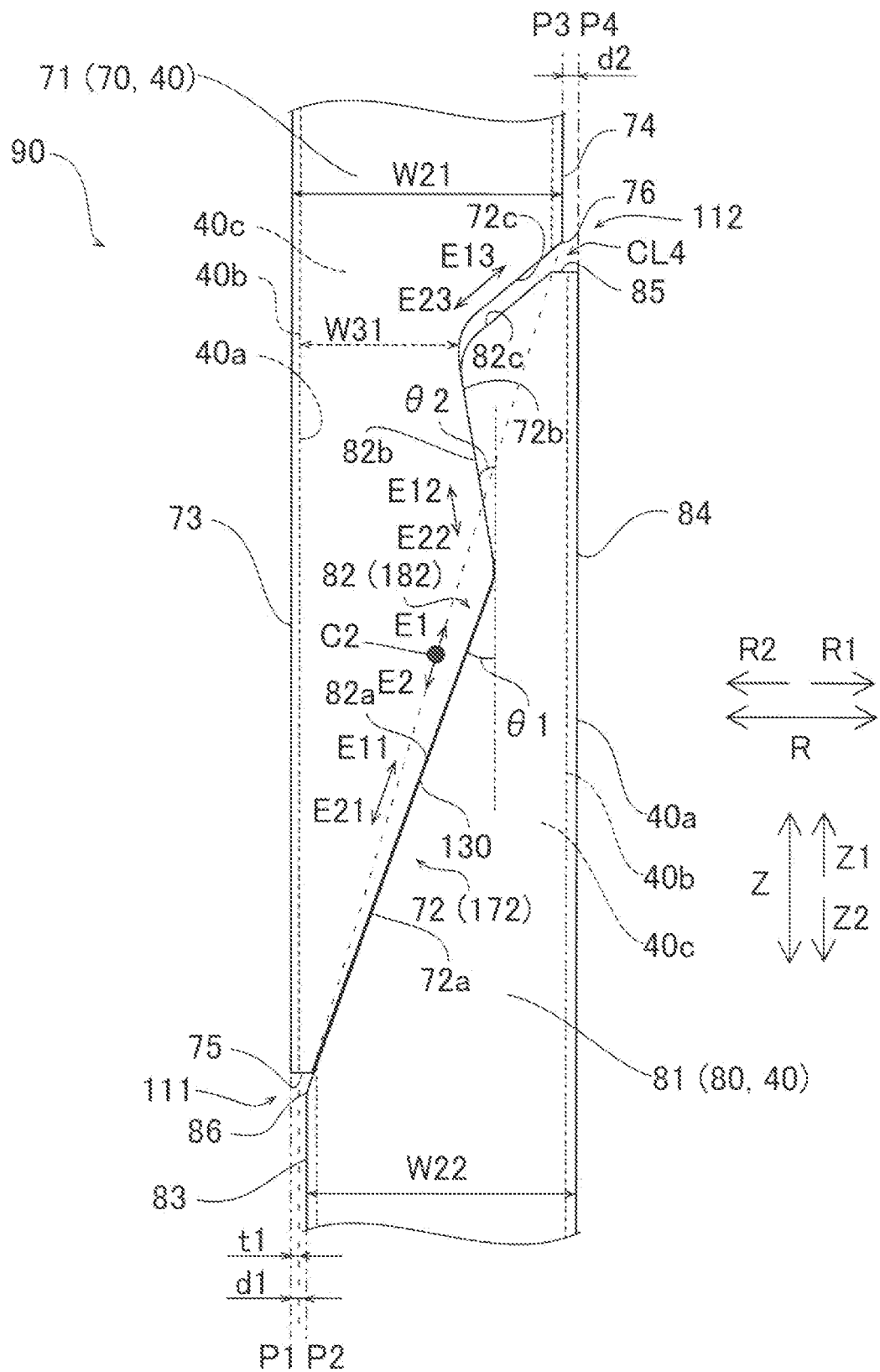
FIG. 16 is a sectional view illustrating the configuration of a first facing surface and a second facing surface according to the first embodiment.

Here, in the first embodiment, as illustrated in FIG. 16, a first slot housed portion 71 which is the slot housed portion 42a or 42b of a first segment conductor 70 which is the segment conductor 40 which constitutes the first coil assembly 30a, among the plurality of segment conductors 40, and a second slot housed portion 81 which is the slot housed portion 42a or 42b of a second segment conductor 80 which is the segment conductor 40 which constitutes the second coil assembly 30b and which faces the first segment conductor 70 in the axial direction are joined to each other at the joint portion 90 in the slot 12 of the stator core 10.

The first slot housed portion 71 includes a first facing surface 72 that directs to the radially inner side (side in the direction of the arrow R1) and that faces the second slot housed portion 81 and a first other end surface 73 that faces the radially outer side (side in the direction of the arrow R2). Meanwhile, the second slot housed portion 81 includes a second facing surface 82 that directs to the radially outer side and that faces the first facing surface 72 and a second other end surface 83 that directs to the radially outer side and that is continuous with the second facing surface 82. At least a part of the first facing surface 72 and at least a part of the second facing surface 82 are joined to each other, and the first other end surface 73 is disposed so as to project toward the radially outer side with respect to the second other end surface 83.

In addition, the first slot housed portion 71 includes a first one end surface 74 that is provided on the opposite side, in the radial direction, of the first other end surface 73 and that is continuous with the first facing surface 72. The second slot housed portion 81 includes a second one end surface 84 that is provided on the opposite side, in the radial direction, of the second other end surface 83 and that directs to the radially inner side. The second one end surface 84 is disposed so as to project toward the radially inner side with respect to the first one end surface 74.

Here, the joint portion 90 is a portion of the coil portion 30 illustrated in FIG. 16, includes the first facing surface 72 and the second facing surface 82, and includes a portion of the first slot housed portion 71 from the distal end 75 to a boundary point 76 between the first facing surface 72 and the first one end surface 74 and a portion of the second slot housed portion 81 from the distal end 85 to a boundary point 86 between the second facing surface 82 and the second other end surface 83.

In the first embodiment, a second stepped portion 111 is formed between the distal end 75 of the first slot housed portion 71 and the boundary point 86 of the second slot housed portion 81, which is the boundary portion between the first other end surface 73 and the second other end surface 83. Meanwhile, a first stepped portion 112 is formed between the boundary point 76 of the first slot housed portion 71 and the distal end 85 of the second slot housed portion 81, which is the boundary portion between the first one end surface 74 and the second one end surface 84. Specifically, in the second stepped portion 111 a step is formed to be dented inward of the segment conductor 40 from the first other end surface 73 toward the second other end surface 83. Meanwhile, in the first stepped portion 112 a step is formed to be dented inward of the segment conductor 40 from the second one end surface 84 toward the first one end surface 74.

In addition, a first deviation width d1 which is the width of the deviation between a radial position P1 of the first other end surface 73 and a radial position P2 of the second other end surface 83 is larger than the thickness t1 of the insulating coating 40a of the segment conductor 40, for example. The first deviation width d1 corresponds to the height of the step of the second stepped portion 111.

Particularly, the first deviation width d1 is set to such a level that the segment conductor 40 is not pressed in the direction of moving the first facing surface 72 and the second facing surface 82 away from each other, or to such a level that a pressing force is reduced when the first slot housed portion 71 or the second slot housed portion 81 is pressed by a pressing jig 200, to be discussed later, and the wall portion 11a, even in the case where the first slot housed portion 71 or the second slot housed portion 81 is elastically deformed.

Figure 17:
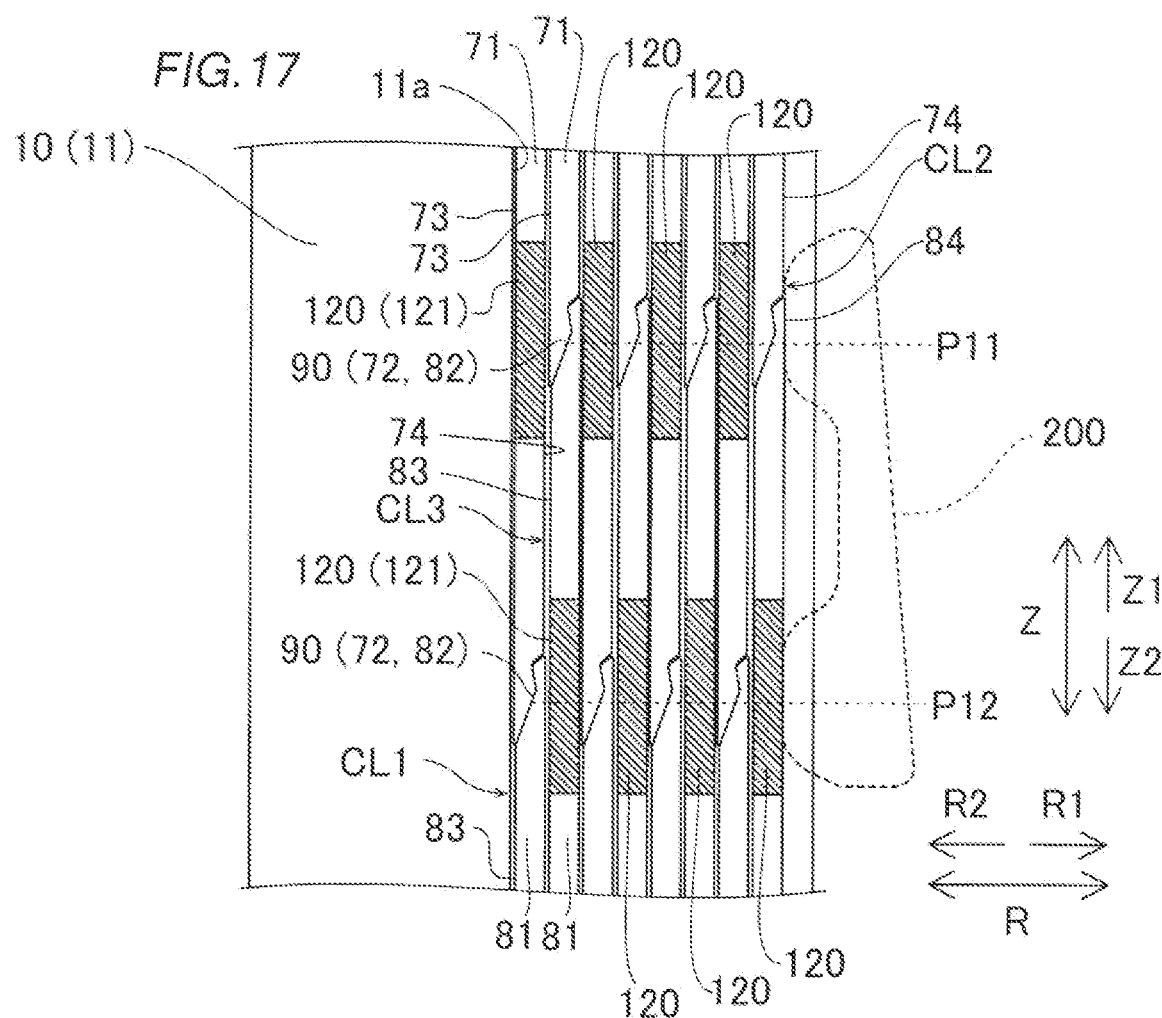
FIG. 17 is a sectional view illustrating the position of arrangement of insulating members and joint portions according to the first embodiment.

For example, as illustrated in FIG. 17, a clearance CL1 is formed in the radial direction between the wall portion 11a and the second other end surface 83 of the second slot housed portion 81 disposed on the radially outermost side. Meanwhile, a clearance CL2 is formed in the radial direction between the pressing jig 200 and the first one end surface 74 of the first slot housed portion 71 disposed on the radially innermost side during manufacture of the stator 100.

In the first embodiment, in addition, as illustrated in FIG. 16, the first deviation width d1 is equal to a second deviation width d2 which is the width of the deviation between a radial position P3 of the first one end surface 74 and a radial position P4 of the second one end surface 84 (height of the step of the first stepped portion 112). That is, a width W21, in the radial direction, of the first slot housed portion 71 is generally equal to a width W22, in the radial direction, of the second slot housed portion 81. In addition, the first slot housed portion 71 is disposed as displaced toward the radially outer side with respect to the second slot housed portion 81.

As illustrated in FIG. 17, a plurality of (e.g. eight) first slot housed portions 71 and second slot housed portions 81 are disposed adjacent to each other in the radial direction in the slot 12. That is, the plurality of first slot housed portions 71 are disposed in parallel in the radial direction, and the plurality of second slot housed portions 81 are disposed in parallel in the radial direction.

In the slot 12, the first facing surface 72 (joint portion 90) of one first slot housed portion 71, among the plurality of first slot housed portions 71, is disposed at a different position in the center axis direction from a different first facing surface 72 (joint portion 90) that is adjacent in the radial direction. In the slot 12, in addition, the second facing surface 82 of one second slot housed portion 81, among the plurality of second slot housed portions 81, is disposed at a different position in the center axis direction from a different second facing surface 82 that is adjacent in the radial direction. That is, in the first embodiment, an axial position P11 of the joint portion 90 which is constituted from the first facing surface 72 and the second facing surface 82 is different from an axial position P12 of the joint portion 90 which is constituted from a different first facing surface 72 and a different second facing surface 82 that are adjacent in the radial direction.

In other words, the first slot housed portions 71 and the second slot housed portions 81 are disposed in a staggered manner along the radial direction at the axial positions P11 and P12. The first other end surface 73 is disposed (offset) so as to project toward the radially outer side with respect to the corresponding second other end surface 83 at each of the plurality of joint portions 90. In addition, the second one end surface 84 is disposed (offset) so as to project toward the radially inner side with respect to the corresponding first one end surface 74 at each of the plurality of joint portions 90. Consequently, a clearance CL3 in the radial direction is formed between the first one end surface 74 and the second other end surface 83 in the radial direction.

<Configuration of First Facing Surface and Second Facing Surface>

Here, in the first embodiment, as illustrated in FIG. 16, the first facing surface 72 of the first slot housed portion 71 and the second facing surface 82 of the second slot housed portion 81 are formed so as to be inclined with respect to the axial direction. Specifically, the first facing surface 72 is constituted as an end surface inclined with respect to the axial direction from the distal end 75 of the first slot housed portion 71 in the direction of the arrow E1. In addition, the first facing surface 72 is not provided with the insulating coating 40a. The second facing surface 82 is constituted as an end surface inclined from the distal end 85 of the second slot housed portion 81 in the direction of the arrow E2. In addition, the second facing surface 82 is not provided with the insulating coating 40a. The direction of the arrow E1 means a direction from the distal end 75 toward the boundary point 76 between the first facing surface 72 and the first one end surface 74. The direction of the arrow E2 means a direction from the distal end 85 toward the boundary point 86 between the second facing surface 82 and the second other end surface 83.

The first facing surface 72 and the second facing surface 82 are each formed such that the sectional surface thereof taken along the radial direction has an S-shape. In other words, the first facing surface 72 is formed into a recessed and projected shape to be recessed and projected in the radial direction, and the second facing surface 82 is formed into a recessed and projected shape, corresponding to the recessed and projected shape of the first facing surface 72, to be recessed and projected in the radial direction. The first facing surface 72 which has an S-shape (recessed and projected shape) and the second facing surface 82 which has an S-shape (recessed and projected shape) are disposed in the slot 12 with the first facing surface 72 and the second facing surface 82 engaged with each other in the radial direction.

Here, in the first embodiment, a part of the first facing surface 72 and a part of the second facing surface 82 are joined to each other using a joint material 130. Particularly, the first facing surface 72 includes a first joint surface 72a to be joined to the second facing surface 82 and a first inverse inclination surface 72b formed to be continuous with the first joint surface 72a and inclined in the direction (direction of the arrow E12) which is opposite to the direction (direction of the arrow E11) in which the first joint surface 72a is inclined with respect to the axial direction (axis that is parallel to the center axis C1). In addition, the first joint surface 72a and the first inverse inclination surface 72b are each formed as a generally flat surface, and the first joint surface 72a and the first inverse inclination surface 72b form a bent shape. In addition, the second facing surface 82 includes a second joint surface 82a to be joined to the first joint surface 72a and a second inverse inclination surface 82b formed to be continuous with the second joint surface 82a and inclined in the direction (direction of the arrow E22) which is opposite to the direction (direction of the arrow E21) in which the second joint surface 82a is inclined with respect to the axial direction.

The joint material 130 is disposed between the first joint surface 72a and the second joint surface 82a, and joins the first joint surface 72a and the second joint surface 82a to be electrically connected to each other. Specifically, the joint material 130 contains a conductive material such as silver or copper. Preferably, the joint material 130 is a joint material (silver nano paste) in a paste form in which a solvent contains conductive particles which are metal particles obtained by making silver finer to the nanometer level. In addition, the joint material 130 contains a member (resin member) to be volatilized when heated, and has a function of bringing the first joint surface 72a and the second joint surface 82a closer to each other with the volume of the joint material 130 decreased when the member to be volatilized is heated.

In the first embodiment, an inclination angle θ2 of the first inverse inclination surface 72b and the second inverse inclination surface 82b with respect to the axial direction is smaller than an inclination angle θ1 of the first joint surface 72a and the second joint surface 82a with respect to the axial direction. Consequently, it is possible to prevent a minimum width W31, in the radial direction, of the first slot housed portion 71 on the root side (side in the direction of the arrow Z1) with respect to the first joint surface 72a from being small.

Figures 18A, 18B:
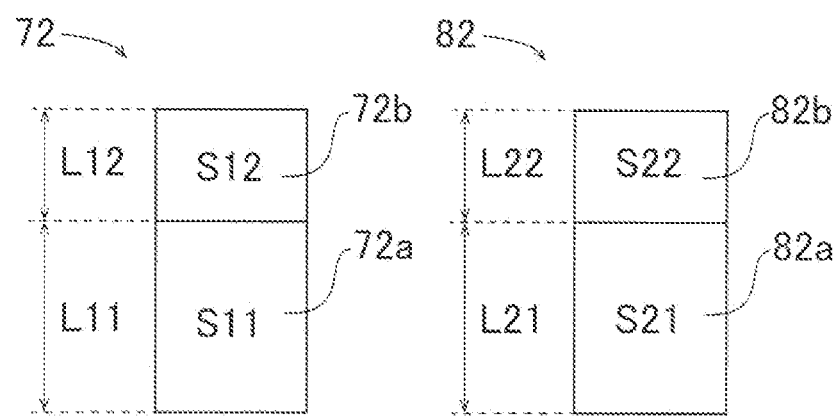
FIGS. 18A and 18B are schematic views illustrating the areas of a first joint surface and a first inverse inclination surface and the areas of a second joint surface and a second inverse inclination surface according to the first embodiment.

In addition, as illustrated in FIGS. 18A and 18B, an area S11 of the first joint surface 72a is larger than an area S12 of the first inverse inclination surface 72b, and an area S21 of the second joint surface 82a is larger than an area S22 of the second inverse inclination surface 82b. That is, a length L11 of the first joint surface 72a along the direction of the arrow E11 is longer than a length L12 of the first inverse inclination surface 72b along the direction of the arrow E12, and a length L21 of the second joint surface 82a along the direction of the arrow E21 is longer than a length L22 of the second inverse inclination surface 82b along the direction of the arrow E21.

As illustrated in FIG. 16, the first facing surface 72 includes a first spaced facing surface 72c formed to be continuous with the first inverse inclination surface 72b on the opposite side from the first joint surface 72a and disposed as spaced from the second facing surface 82. In addition, the second facing surface 82 includes a second spaced facing surface 82c formed to be continuous with the second inverse inclination surface 82b on the opposite side from the second joint surface 82a and disposed as spaced from the first facing surface 72.

Particularly, the first spaced facing surface 72c is inclined in the direction of the arrow E13 which is opposite to the first inverse inclination surface 72b with respect to the axial direction (axis that is parallel to the center axis C1). In addition, the first spaced facing surface 72c is smoothly connected to the first inverse inclination surface 72b with the connection portion formed in an arcuate shape (round shape). The second spaced facing surface 82c is disposed to face the first spaced facing surface 72c, and a clearance CL4 is provided between the first spaced facing surface 72c and the second spaced facing surface 82c.

In addition, the first facing surface 72 and the second facing surface 82 are each formed such that the sectional surface thereof taken along the radial direction has an asymmetrical shape with respect to a center point C2 of the first facing surface 72. Specifically, the first facing surface 72 and the second facing surface 82 are configured such that, in the case where the center point C2 is defined as the middle point between the distal end 75 and the boundary point 76 and the first facing surface 72 is rotated by 180 degrees about the center point C2, the shape of the first facing surface 72 which has been rotated and the shape of the second facing surface 82 do not coincide with each other. Particularly, an asymmetrical shape is achieved since the first facing surface 72 includes the first joint surface 72a, the first inverse inclination surface 72b, and the first spaced facing surface 72c which are provided in this order from the distal end 75 of the first slot housed portion 71, while the second facing surface 82 includes the second spaced facing surface 82c, the second inverse inclination surface 82b, and the second joint surface 82a which are provided in this order from the distal end 85 of the second slot housed portion 81.

In addition, the distal end 75 of the first slot housed portion 71 and the distal end 85 of the second slot housed portion 81 are each formed as a flat surface that is orthogonal to the axial direction. Particularly, the distal ends 75 and 85 are provided between the first facing surface 72 and the first other end surface 73 and between the second facing surface 82 and the second other end surface 83, respectively, to have a chamfered shape.

<Configuration of Insulating Portions>

Here, in the first embodiment, the coil portion 30 is provided with insulating portions 120. As illustrated in FIG. 17, an insulating portion 120 is provided on the conductor surface 40b (see FIG. 8B) of one segment conductor 40, among the plurality of segment conductors 40 (general conductors 41, power conductors 50, and neutral point conductors 60) which are disposed in parallel, at an axial position corresponding to the joint portion 90 of a different segment conductor 40 (hereinafter this joint portion 90 will be referred to as an "adjacent joint portion 90") disposed adjacent to the one segment conductor 40 in the radial direction. The insulating portion 120 has a thickness t2 which is larger than the thickness t1 of the insulating coating 40a of the adjacent joint portion 90 (different segment conductor 40).

Specifically, as illustrated in FIG. 8B, the insulating portion 120 includes the insulating coating 40a which is provided on the conductor surface 40b and which has the thickness t1, and an insulating member 121 that covers the insulating coating 40a and that has a function of insulating the segment conductor 40 and the adjacent joint portion 90 from each other. A thickness t3 of the insulating member 121 is smaller than the thickness t1. That is, the thickness t2 is larger than the thickness t1, and less than twice the thickness t1.

Particularly, the insulating member 121 is formed in a sheet shape. For example, the insulating member 121 contains the same material as the material contained in the insulating coating 40a. Preferably, the insulating member 121 contains an insulation material such as polyimide. The insulating member 121 in a sheet shape is wound around the outer periphery of the insulating coating 40a of the segment conductor 40 for at least one round (e.g. more than one round and less than two rounds). For example, the insulating member 121 in a sheet shape is fixed to the insulating coating 40a using an adhesive with insulation properties etc.

As illustrated in FIG. 9, the insulating portion 120 (insulating member 121) is provided on the slot housed portion 42a, of the slot housed portions 42a and 42b, the length of which along the axial direction is the longer. In addition, the insulating member 121 is provided on each of the plurality of slot housed portions 42a, while the insulating member 121 is not provided on the plurality of slot housed portions 42b.

A length L31 of the insulating portion 120 (insulating member 121) in the axial direction is equal to or more than an insulation creepage distance Dc along the center axis direction from the adjacent joint portion 90, and less than the length L3 of the slot 12 in the axial direction. Particularly, the length L31 of the insulating portion 120 (insulating member 121) is set to be at least equal to or more than the insulation creepage distance Dc with respect to the closer one of the distal end 75 of the first slot housed portion 71 and the distal end 85 of the second slot housed portion 81 which are adjacent in the radial direction. That is, as illustrated in FIG. 17, the insulation properties are secured by securing the insulation creepage distance Dc between the first facing surface 72 and the second facing surface 82, which are not provided with the insulating coating 40a, and the adjacent slot housed portion 42a.

[Method of Manufacturing Stator]

Next, a method of manufacturing the stator 100 according to the first embodiment will be described. FIG. 19 is a flowchart illustrating the method of manufacturing the stator 100.

(Step of Preparing Segment Conductors)

First, in step S1, a plurality of segment conductors 40 are prepared. Specifically, the power conductors 50 which constitute the power-side end portions Pt for the individual phases of the coil portion 30 which is connected through a Y connection, the neutral point conductors 60 which constitute the neutral point connection end portions Nt for the individual phases of the coil portion 30, and the general conductors 41 which constitute the other portions of the coil portion 30 are prepared.

For example, as illustrated in FIG. 8A, an insulating coating 40a made of an insulation material such as polyimide is formed (coated) on the conductor surface 40b in a rectangular shape which is made of a conductive material such as copper. After that, the conductor (rectangular conductive wire) on which the insulating coating 40a is formed is shaped using a shaping jig (not illustrated) to form the general conductors 41 (see FIG. 9), the radially outer power conductors 52 and the radially inner power conductors 53 (see FIG. 10) for forming the power conductors 50, two U-phase/W-phase neutral point segment conductors 61a and two V-phase neutral point segment conductors 61b for forming the radially outer neutral point conductor 61 (see FIG. 13), and two U-phase/W-phase neutral point segment conductors 62a and two V-phase neutral point segment conductors 62b for forming the radially inner neutral point conductor 62 (see FIG. 15).

<Formation of General Conductors>

Particularly, as illustrated in FIG. 9, the general conductors 41 are each formed by forming a pair of slot housed portions 42a and 42b to be disposed in different slots 12 (e.g. with a slot pitch of six) and having different axial lengths from each other and a coil end portion 43 that connects between the pair of slot housed portions 42a and 42b.

<Formation of Power Conductors>

In the first embodiment, as illustrated in FIG. 10, the power conductors 50 are each formed by electrically connecting the radially outer power conductor 52 and the radially inner power conductor 53 to each other by electrically joining (performing a power conductor joint step) the radially outer power conductor 52 and the radially inner power conductor 53 to the common power terminal member 51 via the lead wires 54. The power conductors 50 are formed for the respective phases.

Particularly, the end portion joint portions 52c are formed by welding (joining) two power line coil end portions 52a, which constitute two power-side end portions Pt and which are led out in the axial direction from two slot housed portions 42a, and the conductor plate 52b to each other, so that the radially outer power conductor 52 is formed. In addition, the end portion joint portions 53c are formed by brazing or welding (joining) two power line coil end portions 53a, which constitute two power-side end portions Pt and which are led out in the axial direction from the slot housed portions 42b, and the conductor plate 53b to each other, so that the radially inner power conductor 53 is formed. For example, the welding is implemented through any of resistance welding, arc welding, laser welding, and high-energy beam welding. Consequently, the radially outer power conductor 52 and the radially inner power conductor 53 with a slot pitch of one (in the case where the conductor plates 52b and 53b are included) or zero (in the case where the conductor plates 52b and 53b are not included) are formed.

In addition, a plurality of lead wires 54 with the insulating tube 51a attached to the outer periphery thereof and which are joined to the power terminal member 51 are prepared. The lead wire 54 is welded to the radially outer side of the conductor plate 52b of the radially outer power conductor 52 to form the end portion joint portion 52d. In addition, the lead wire 54 is welded to the axially outer side (side in the direction of the arrow Z1) of the conductor plate 53b of the radially inner power conductor 53 to form the end portion joint portion 53d. Consequently, the power conductors 50 which have a bifurcated shape in which the radially outer power conductor 52 is disposed on the radially outer side and the radially inner power conductor 53 is disposed on the radially inner side are formed.

<Formation of Neutral Point Conductors>

As illustrated in FIG. 13, the U-phase/W-phase neutral point segment conductors 61a which each include the neutral point coil end portion 61c which connects between the slot housed portion 42a for U-phase and the slot housed portion 42a for W-phase are shaped. In addition, the U-phase/W-phase neutral point segment conductors 61a are shaped such that the slot pitch of one of the two U-phase/W-phase neutral point segment conductors 61a is nine while the slot pitch of the other is seven. One of the two U-phase/W-phase neutral point segment conductors 61a is disposed on the axially outer side (side in the direction of the arrow Z1) of the other. The V-phase neutral point segment conductors 61b which each include the slot housed portion 42a for V-phase and the neutral point coil end portion 61d are shaped.

After that, the end portion joint portions 61e are formed by welding (performing a neutral point conductor joint step) the two neutral point coil end portions 61d on end surfaces of the two neutral point coil end portions 61c on the radially outer side (to each other). Consequently, the radially outer neutral point conductor 61 (neutral point conductor 60) in which the neutral point connection end portions NtU of the U-phase coil portion 30U, the neutral point connection end portions NtV of the V-phase coil portion 30V, and the neutral point connection end portions NtW of the W-phase coil portion 30W are electrically connected to each other is formed.

As illustrated in FIG. 15, the U-phase/W-phase neutral point segment conductors 62a which each include the neutral point coil end portion 62c which connects between the slot housed portion 42b for U-phase and the slot housed portion 42b for W-phase are shaped. In addition, the U-phase/W-phase neutral point segment conductors 62a are shaped such that the slot pitch of one of the two U-phase/W-phase neutral point segment conductors 62a is nine while the slot pitch of the other is seven. The V-phase neutral point segment conductors 62b which each include the slot housed portion 42b for V-phase and the neutral point coil end portion 62d are shaped.

After that, the end portion joint portions 62e are formed by welding the two neutral point coil end portions 62d on end surfaces of the two neutral point coil end portions 62c on the axially outer side (to each other). Consequently, the radially inner neutral point conductor 62 (neutral point conductor 60) in which the neutral point connection end portions NtU of the U-phase coil portion 30U, the neutral point connection end portions NtV of the V-phase coil portion 30V, and the neutral point connection end portions NtW of the W-phase coil portion 30W are electrically connected to each other is formed.

<Formation of Insulating Portion>

In the first embodiment, in step S2 (see FIG. 19), the insulating portion 120 which has the thickness t2 which is larger than the thickness t1 of the insulating coating 40a of the joint portion 90 is provided on the conductor surface 40b of a portion of the segment conductor 40 that is different from a first surface 172 and a second surface 182.

As illustrated in FIG. 9, the insulating portion 120 is formed by attaching the insulating member 121 to the slot housed portion 42a, of the pair of slot housed portions 42a and 42b, the length of which along the axial direction is the longer. Specifically, the insulating member 121 is attached to each of the slot housed portions 42a of the general conductors 41, the slot housed portions 42a of the radially outer power conductors 52, and the slot housed portions 42a of the radially outer neutral point conductor 61.

Particularly, as illustrated in FIG. 8B, the insulating member 121 in a sheet shape which has the thickness t3 which is smaller than the thickness t1 is wound around the slot housed portion 42a for one round or more (e.g. more than one round and less than two rounds) to be fixed. Consequently, in the case where the number of times of winding is one (one round), the insulating portion 120 which has the thickness t2 (=t1+t3) which is larger than the thickness t1 is formed on the slot housed portion 42a.

(Formation of First Coil Assembly and Second Coil Assembly)

In step S3, as illustrated in FIG. 3, the first coil assembly 30a and the second coil assembly 30b in a circular ring shape which are composed of a plurality of segment conductors 40 are formed.

Figure 20:
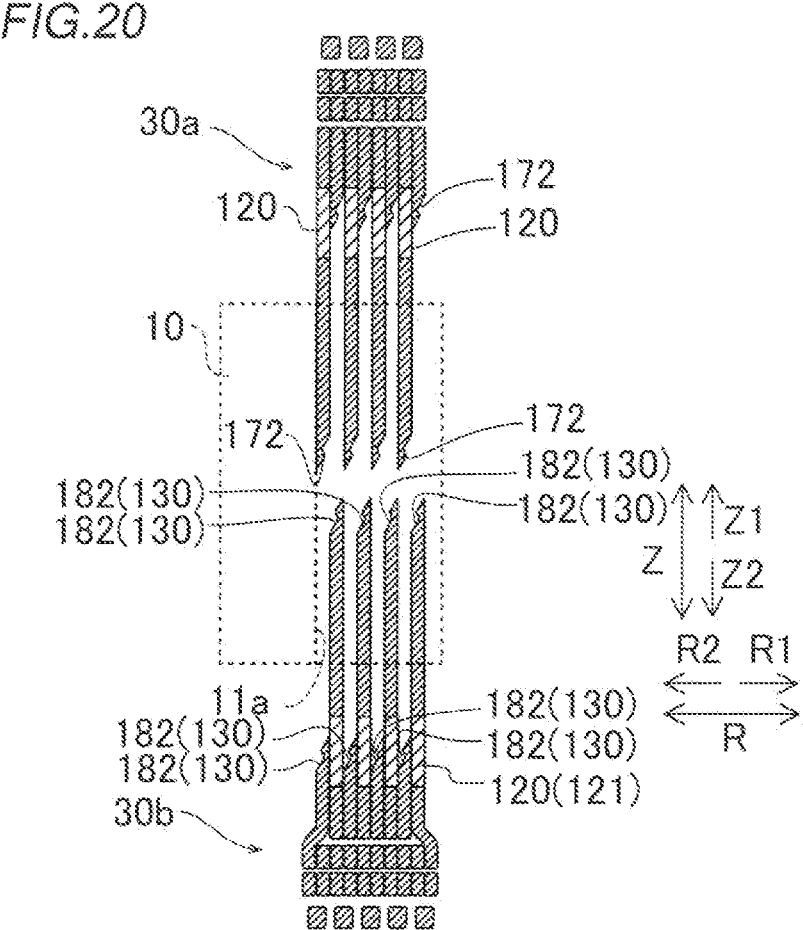
FIG. 20 illustrates a step of disposing segment conductors in a slot according to the first embodiment.

In the first embodiment, as illustrated in FIGS. 3 and 20, the first coil assembly 30a and the second coil assembly 30b in a circular ring shape which are composed of a plurality of segment conductors 40 are formed such that the insulating portion 120 of one segment conductor 40 is positioned at a position adjacent, in the radial direction, to the joint portion 90 of a different segment conductor 40 disposed adjacent to the one segment conductor 40 in the radial direction. While only some (two) of the plurality of insulating portions 120 are illustrated as hatched for illustration in FIG. 3, all the slot housed portions 42a are provided with the insulating portions 120 in the first embodiment.

Specifically, as illustrated in FIG. 3, the first coil assembly 30a in a circular ring shape is formed such that the plurality of general conductors 41, the power conductors 50 for the three phases, and the radially outer neutral point conductor 61 and the radially inner neutral point conductor 62 have an arrangement relationship that is generally similar to that of such conductors at the time when the conductors are disposed in the plurality of slots 12 (with the stator 100 in the completed state). In addition, the second coil assembly 30b in a circular ring shape is formed such that the plurality of general conductors 41 have an arrangement relationship that is generally similar to that of such conductors at the time when the conductors are disposed in the plurality of slots 12.

Particularly, as illustrated in FIG. 20, the first coil assembly 30a and the second coil assembly 30b are formed such that a plurality of (e.g. eight) segment conductors 40 are arranged in parallel in the radial direction and sets of the segment conductors 40 are arranged in parallel in the circumferential direction as many as the number of the slots 12. At this time, in the first embodiment, the first coil assembly 30a and the second coil assembly 30b are formed such that the insulating portion 120 of one segment conductor 40, among the plurality of segment conductors 40 which are disposed in parallel, is positioned at an axial position corresponding to the joint portion 90 of a different segment conductor 40 disposed adjacent to the one segment conductor 40 in the radial direction.

(Step of Disposing Slot Insulating Paper in Slots)

Figure 21:
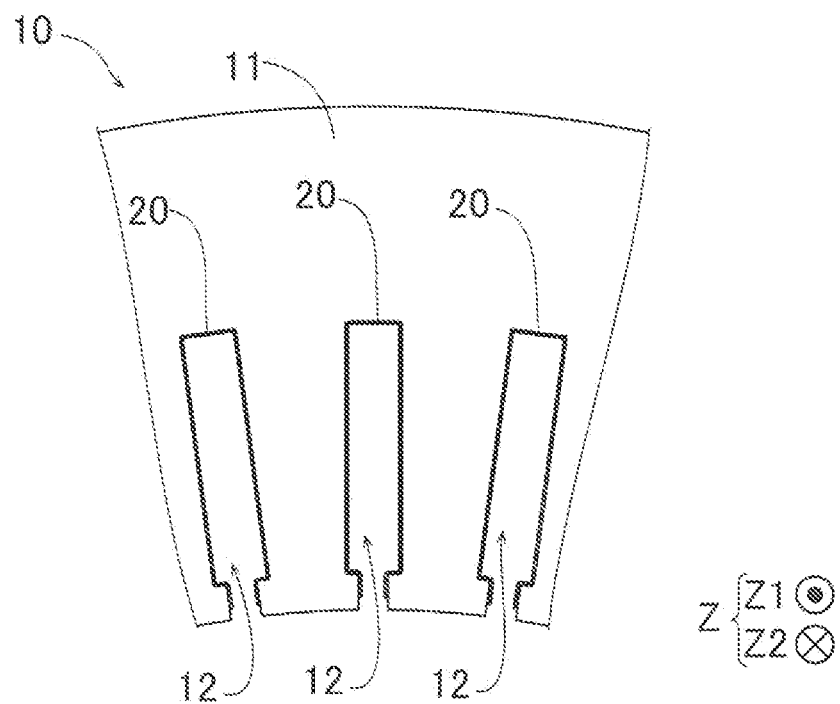
FIG. 21 is a sectional view illustrating a step of disposing slot insulating paper in slots according to the first embodiment.

In step S4 (see FIG. 19), as illustrated in FIG. 21, the slot insulating paper 20 is disposed in each of the plurality of slots 12. The slot insulating paper 20 is disposed with the radially inner side and both sides in the axial direction released or opened. In addition, as illustrated in FIG. 3, the slot insulating paper 20 which has been disposed is held in the slots 12 using the collar portions 22 on both sides in the axial direction.

(Step of Disposing Segment Conductors in Slots)

Figure 22:
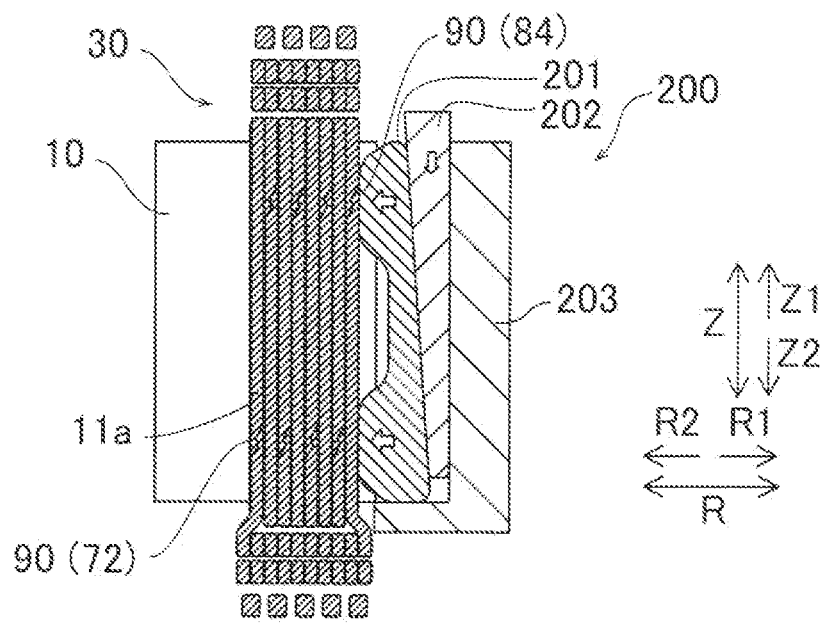
FIG. 22 is a sectional view, taken along the radial direction, illustrating a step of pressing segment conductors with a pressing jig and a wall portion according to the first embodiment.

In step S5 (see FIG. 19), as illustrated in FIGS. 20 and 22, the plurality of segment conductors 40 are disposed in the plurality of slots 12. That is, the first coil assembly 30a and the second coil assembly 30b are inserted into the plurality of slots 12.

Particularly, first, as illustrated in FIG. 3, the first coil assembly 30a is disposed on the side in the direction of the arrow Z1 with respect to (e.g. directly above) the stator core 10. In addition, the second coil assembly 30b is disposed on the side in the direction of the arrow Z2 with respect to (e.g. directly below) the stator core 10. At this time, as illustrated in FIG. 20, the joint material 130 is disposed on at least one of the first surface 172 of the first slot housed portion 71 of the first coil assembly 30a and the corresponding second surface 182 of the second slot housed portion 81 of the second coil assembly 30b which face each other in the axial direction.

As illustrated in FIG. 22, the slot housed portions 42a and 42b of the first coil assembly 30a and the second coil assembly 30b are disposed in the respective slots 12 of the plurality of slots 12 by relatively moving the first coil assembly 30a and the second coil assembly 30b in the axial direction with respect to the plurality of slots 12. For example, the slot housed portions 42a and 42b are disposed in the respective slots 12 of the plurality of slots 12 (slots 12 in which the slot insulating paper 20 is disposed) by translating (linearly moving) the first coil assembly 30a in the direction of the arrow Z2 with respect to the stator core 10 and translating (linearly moving) the second coil assembly 30b in the direction of the arrow Z1 with respect to the stator core 10.

As illustrated in FIG. 16, the plurality of segment conductors 40 are disposed in the plurality of slots 12 such that: the first surface 172 to form the first facing surface 72 of the first slot housed portion 71, which is the slot housed portion 42a or 42b of the plurality of segment conductors 40 of the first coil assembly 30a, directs to the radially inner side; the first other end surface 73 of the first slot housed portion 71 directs to the radially outer side; the second surface 182 to form the second facing surface 82 of the second slot housed portion 81, which is the slot housed portion 42a or 42b of the plurality of segment conductors 40 of the second coil assembly 30b, and the second other end surface 83 which is continuous with the second surface 182 direct to the radially outer side; and the first slot housed portion 71 and the second slot housed portion 81 face each other in the axial direction.

Particularly, at least a portion of the first facing surface 72 to form the first joint surface 72a and a portion of the second facing surface 82 to form the second joint surface 82a are proximate to (contact) each other via the joint material 130 because a recessed and projected portion of the first surface 172 as the first facing surface 72, which is recessed and projected in the radial direction, and a recessed and projected portion of the second surface 182 as the second facing surface 82, which is recessed and projected in the radial direction, are engaged with each other.

At this time, the first other end surface 73 is disposed (offset) so as to project toward the radially outer side with respect to the second other end surface 83, and the second one end surface 84 is disposed (offset) so as to project toward the radially inner side with respect to the first one end surface 74.

In addition, as illustrated in FIG. 17, the plurality of segment conductors 40 are disposed in the slots 12 such that the insulating portion 120 of one segment conductor 40, among the plurality of segment conductors 40 which are disposed in parallel in the radial direction, is positioned at an axial position corresponding to the first facing surface 72 or the second facing surface 82 (a portion to form the joint portion 90) of a different segment conductor 40 disposed adjacent to the one segment conductor 40 in the radial direction with the first coil assembly 30a and the second coil assembly 30b disposed in the slots 12.

(Step of Joining Slot Housed Portions)

In step S6 (see FIG. 19), the joint portion 90 is formed as at least a part (first joint surface 72a) of the first facing surface 72 and at least a part (second joint surface 82a) of the second facing surface 82 are joined to each other by a heating device (not illustrated) heating at least the joint material 130 while the pressing jig 200 is pressing the slot housed portions 42a and 42b (against each other).

Here, as illustrated in FIG. 22, the pressing jig 200 is provided with movable members 201, pressing members 202, and a holding member 203. The number of the movable members 201 is the same as the number of the slots 12. The holding member 203 is configured to hold the movable members 201 and the pressing members 202. In addition, the pressing members 202 are each formed in a wedge shape (tapered shape) to be tapered toward one axial side, for example, and configured to transfer a pressing force to the segment conductors 40 while moving the movable member 201 toward the radially outer side by pressing the movable member 201 toward the radially outer side when the pressing member 202 is moved in the axial direction.

Figure 23:
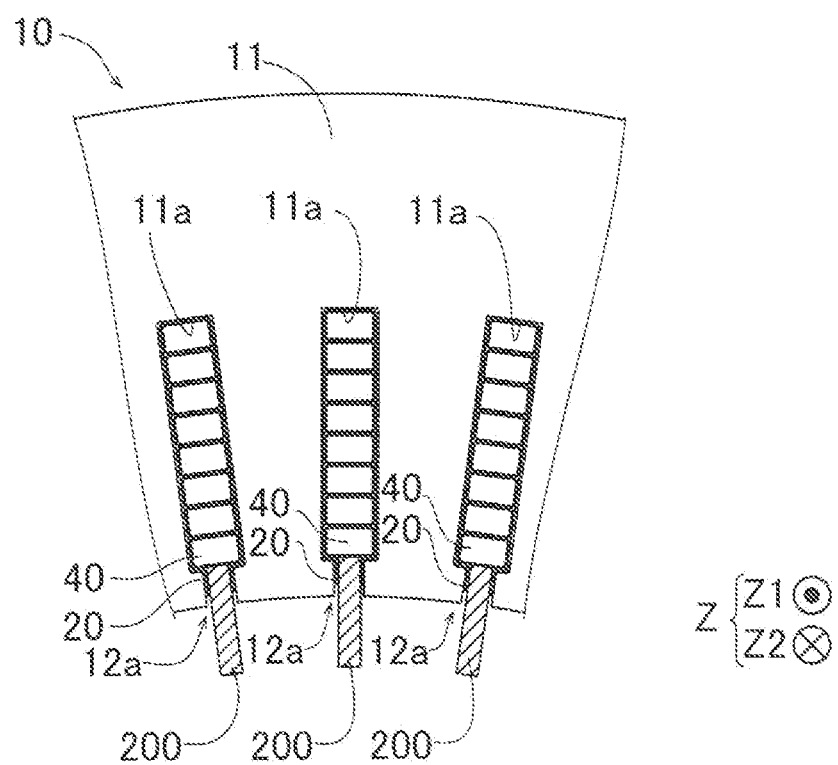
FIG. 23 is a sectional view, as seen in plan, illustrating the step of pressing the segment conductors with the pressing jig and the wall portion according to the first embodiment.

As illustrated in FIG. 23, the pressing jigs 200 (movable members 201) are disposed in the opening portions 12a of the slots 12 (on the radially inner side of the slots 12). Consequently, the plurality of slot housed portions 42a and 42b which are arranged in parallel in the radial direction are interposed between the pressing jigs 200 and the wall portions 11a of the stator core 10 on both sides in the radial direction. When the pressing jigs 200 apply a pressing force (load) to the plurality of slot housed portions 42a and 42b, which are arranged in parallel in the radial direction, toward the radially outer side, a reaction force directed from the wall portions 11a toward the radially inner side is generated, and the plurality of slot housed portions 42a and 42b which are arranged in parallel in the radial direction are pressed from both sides in the radial direction.

Here, in the first embodiment, with the first other end surface 73 disposed (offset) so as to project toward the radially outer side with respect to the second other end surface 83, the first slot housed portion 71 is pressed toward the radially inner side by the wall portion 11a of the stator core 10 as the wall portion 11a contacts the first other end surface 73 of the first slot housed portion 71 disposed on the radially outermost side, among the plurality of first slot housed portions 71. In addition, with the second one end surface 84 disposed (offset) so as to project toward the radially inner side with respect to the first one end surface 74, the second slot housed portion 81 is pressed toward the radially outer side by the pressing jig 200 as the pressing jig 200 contacts the second one end surface 84 of the second slot housed portion 81 disposed on the radially innermost side, among the plurality of second slot housed portions 81.

Consequently, the first facing surface 72 and the second facing surface 82 are pressed against each other in the direction in which the first facing surface 72 and the second facing surface 82 face each other. With a pressing force and a reaction force transferred between the slot housed portions 42a and 42b which are disposed in parallel in the radial direction, the first other end surface 73 of the first slot housed portion 71 disposed on the radially outermost side and the first other end surface 73 of the first slot housed portion 71 on the radially innermost side or the first other end surfaces 73 of the first slot housed portions 71 other than the second slot housed portions 81 are pressed toward the radially outer side, and the second one end surfaces 84 of the second slot housed portions 81 are pressed toward the radially inner side.

Particularly, the first facing surface 72 and the second facing surface 82 which face each other in the slot 12 are pressed against each other as the insulating member 121 of the first slot housed portion 71 contacts the first other end surface 73 or the second one end surface 84 which is adjacent in the radial direction.

The joint material 130 is cured with a part thereof volatilized when the joint material 130, the first slot housed portion 71, and the second slot housed portion 81 are heated by a heating device (such as a heater, hot air, etc.) while the first facing surface 72 and the second facing surface 82 are pressed against each other. The joint material 130 is heated to a curing temperature or higher. The first slot housed portion 71 and the second slot housed portion 81 are joined and electrically connected to each other using a conductive material (such as silver) contained in the joint material 130.

All the first joint surfaces 72a and the second joint surfaces 82a that face each other are joined to each other in all the slots 12.

Consequently, the first slot housed portion 71 of the power conductor 50 and the neutral point conductor 60 and the second slot housed portion 81 which is one of the slot housed portions 42a and 42b of the general conductor 41 are joined to each other in one slot 12, and the second slot housed portion 81 which is the other of the slot housed portions 42a and 42b of the general conductor 41 and the first slot housed portion 71 of the general conductor 41 are joined to each other in a different slot 12. As a result, the coil portion 30 in a wave-wound shape is formed.

As illustrated in FIG. 17, the first slot housed portion 71 and the second slot housed portion 81 are electrically joined to each other to form the joint portion 90. Consequently, the insulating portion 120 is disposed at a position (axial position) adjacent to the joint portion 90 in the radial direction. In addition, the axial position P11 of the joint portion 90 is different from the axial position P12 of the joint portion 90 of the segment conductor 40 which is adjacent in the radial direction.

(Step of Covering Joint Portions with Slot Insulating Paper)

In step S7 (see FIG. 19), as illustrated in FIG. 5, the joint portion cover portion 21 which covers at least the joint portion 90 is formed by deforming (folding) the slot insulating paper 20 such that the radially inner side of the first slot housed portion 71 and the second slot housed portion 81 disposed on the radially innermost side is covered by the slot insulating paper 20. After that, the stator 100 is completed as illustrated in FIG. 2. As illustrated in FIG. 1, the stator 100 and the rotor 101 are combined with each other to manufacture the rotary electric machine 102.

Second Embodiment

Next, the configuration of a stator 700 according to a second embodiment will be described with reference to FIGS. 24 to 28. In the second embodiment, in addition to the configuration according to the first embodiment described above, the stator 700 is further provided with an electronic part 701. Components that are the same as those according to the first embodiment described above are given the same reference numerals in the drawings to omit description thereof. The stator 700 is an example of the "armature" in the claims.

Figure 24:
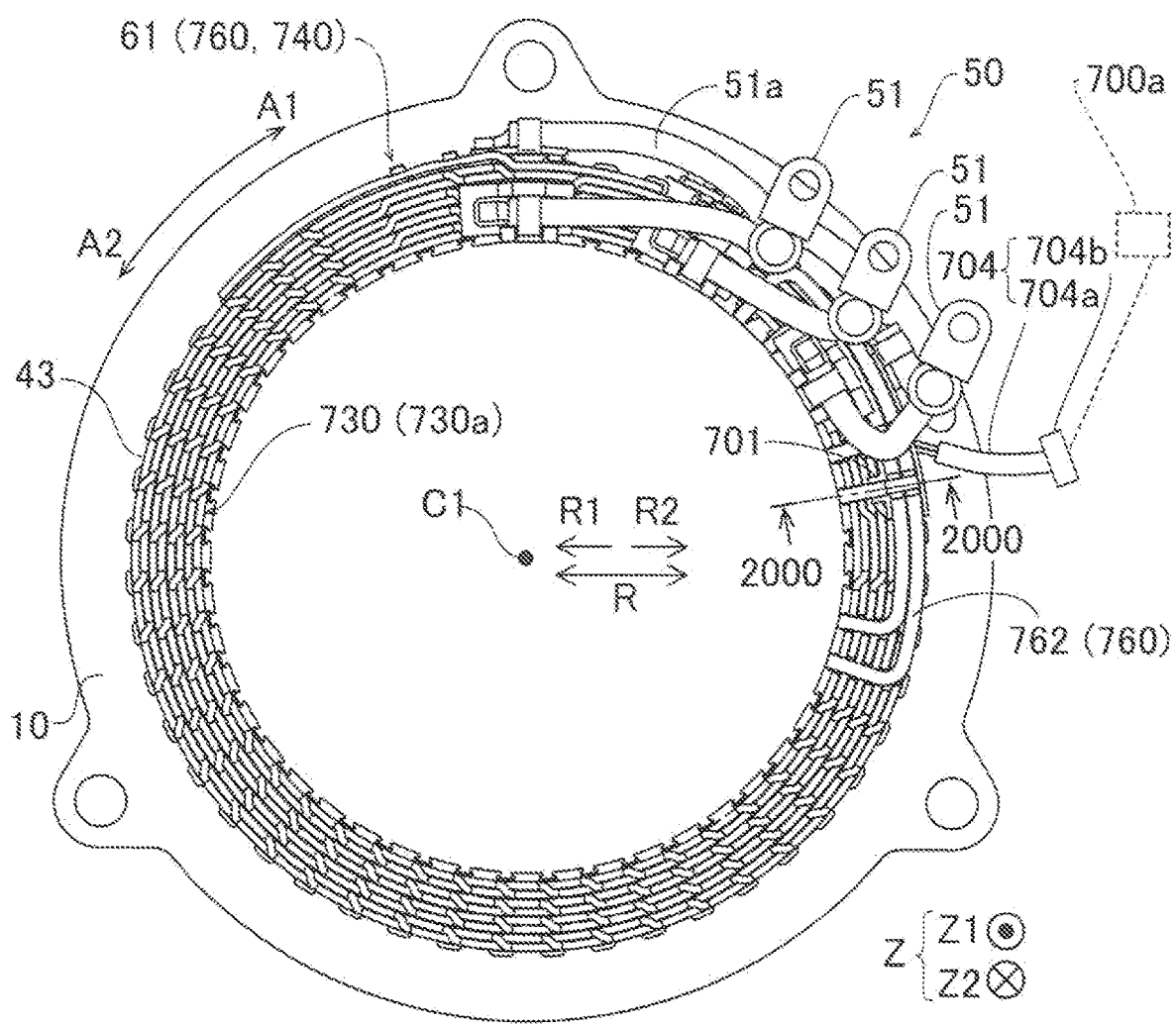
FIG. 24 is a plan view illustrating the configuration of a stator (rotary electric machine) according to a second embodiment.

In the second embodiment, as illustrated in FIG. 24, the stator 700 includes the electronic part 701, a coil portion 730, and segment conductors 740 including neutral point conductors 760. The neutral point conductors 760 include a radially outer neutral point conductor 61 and a radially inner neutral point conductor 762. The radially outer neutral point conductor 61 is configured similarly to the radially outer neutral point conductor 61 according to the first embodiment. In addition, the neutral point conductors 760 are included in a first coil assembly 730a (see FIG. 28). Here, in the second embodiment, the electronic part 701 is disposed on the radially inner neutral point conductor 762. The neutral point conductors 760 and the radially inner neutral point conductor 762 are examples of the "first segment conductor" and the "neutral point-connection segment conductor" in the claims, respectively.

Figure 25:
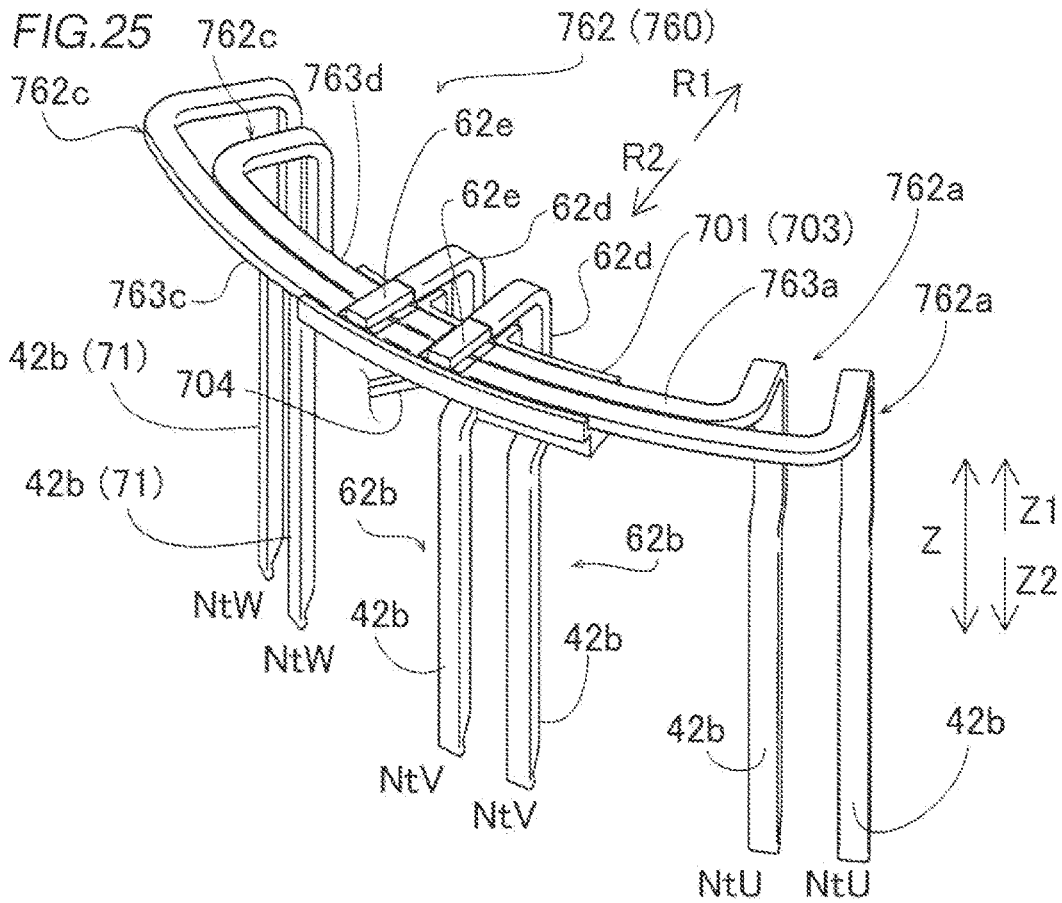
FIG. 25 is a perspective view (perspective view seen from the side in the direction of the arrow Z1) illustrating the configuration of a neutral point conductor according to the second embodiment.
Figure 26:
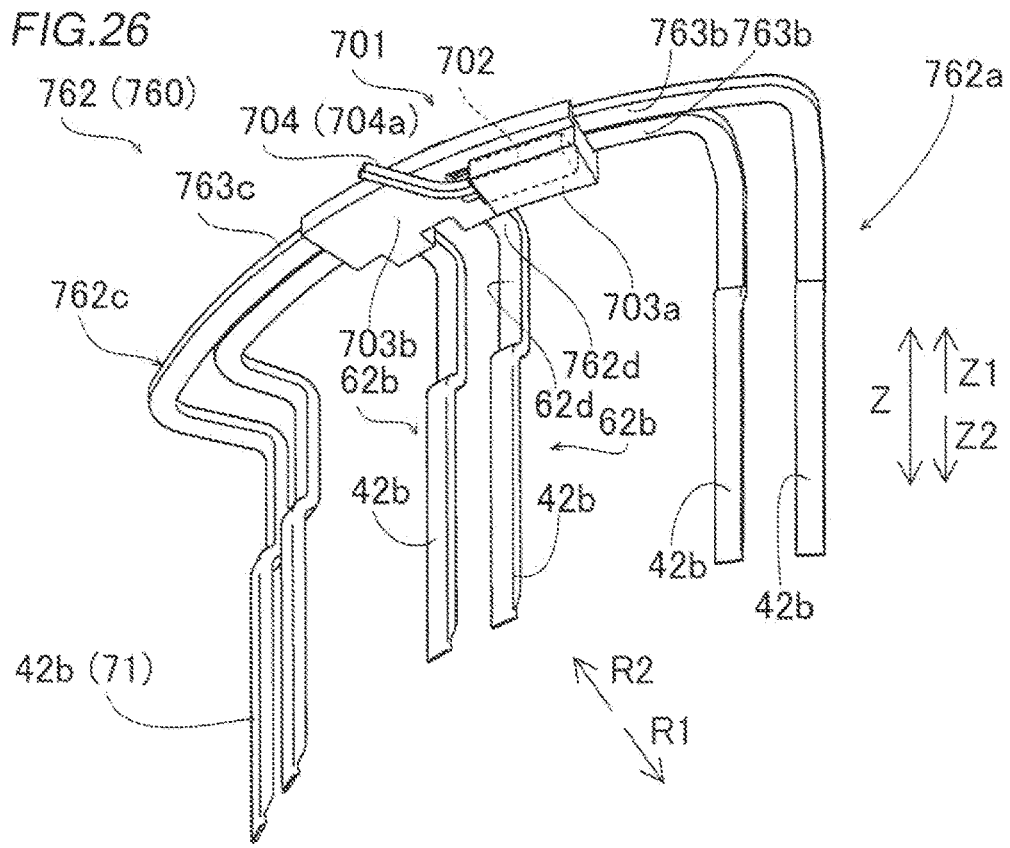
FIG. 26 is a perspective view (perspective view seen from the side in the direction of the arrow Z2) illustrating the configuration of the neutral point conductor according to the second embodiment.

As illustrated in FIGS. 25 and 26, the radially inner neutral point conductor 762 includes two U-phase/W-phase neutral point segment conductors 762a and two V-phase neutral point segment conductors 62b. The U-phase/W-phase neutral point segment conductors 762a each include a slot housed portion 42b for U-phase to be connected to the general conductor 41 for U-phase of three-phase AC, a slot housed portion 42b for W-phase to be connected to the general conductor 41 for W-phase, and a neutral point coil end portion 762c that connects between the slot housed portion 42b for U-phase and the slot housed portion 42b for W-phase. The neutral point coil end portions 762c are each formed to be continuous with the slot housed portion 42b for U-phase, and formed to be continuous with the slot housed portion 42b for W-phase.

The neutral point coil end portion 62d of the V-phase neutral point segment conductor 62b is formed so as to project toward the axially outer side (in the direction of the arrow Z1) from the slot housed portion 42b. Each of the two neutral point coil end portions 62d is joined to the two neutral point coil end portions 762c to be electrically joined thereto. Specifically, the neutral point coil end portions 62d are joined to surfaces 763a of the neutral point coil end portions 762c on the opposite side (side in the direction of the arrow Z1) from the stator core 10 by the end portion joint portions 62e.

Figure 27:
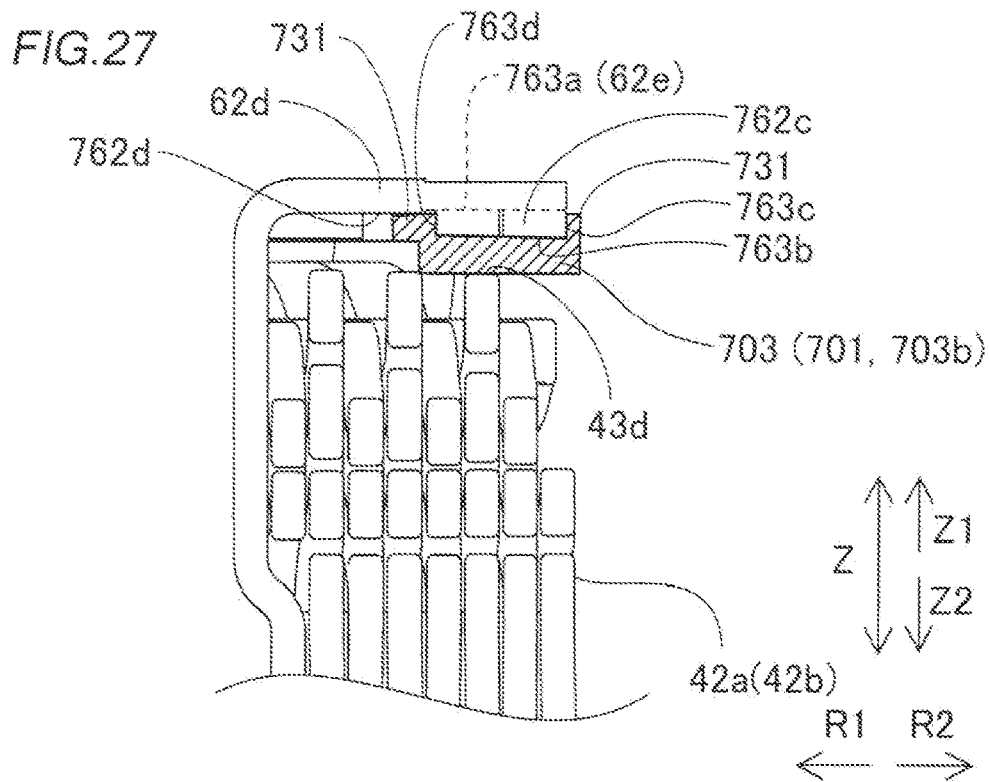
FIG. 27 is a partial sectional view taken along the line 2000-2000 in FIG. 24.

Here, in the second embodiment, the electronic part 701 is disposed on (attached to) the neutral point coil end portions 762c. Particularly, the electronic part 701 is disposed on surfaces 763b of the neutral point coil end portions 762c on the stator core 10 side. That is, as illustrated in FIG. 27, the electronic part 701 is disposed as interposed between the neutral point coil end portions 762c and the end surfaces 43d, on the axially outer side, of the coil end portions 43 of the general conductors 41. Particularly, the electronic part 701 is disposed in contact with (as bonded to) the surfaces 763b of the neutral point coil end portions 762c, a surface 763c of the neutral point coil end portion 762c on the radially outer side, a surface 763d of the neutral point coil end portion 762c on the radially inner side, and surfaces 762d of the neutral point coil end portions 62d on the side in the direction of the arrow Z2.

As illustrated in FIGS. 25 and 26, the electronic part 701 includes a temperature detection element 702, a case portion 703, and a wiring member 704. The temperature detection element 702 is a thermistor, for example, which is an element, the resistance value of which is varied in accordance with the temperature of the element.

The case portion 703 is constituted from a resin material, for example, and includes a housing portion 703a and a case body portion 703b. The housing portion 703a is configured such that the temperature detection element 702 can be housed therein. The case body portion 703b is fixed to the surfaces 763b of the neutral point coil end portions 762c by use of an adhesive, for example. Particularly, as illustrated in FIG. 27, the case body portion 703b is provided with restriction walls 731 disposed to face the surface 763c on the radially outer side and the surface 763d on the radially inner side so as to interpose the neutral point coil end portions 762c from both sides in the radial direction in order to restrict the positions of the electronic part 701 and the neutral point coil end portions 762c relative to each other.

In addition, as illustrated in FIG. 25, the case portion 703 is disposed at the middle portion, in the circumferential direction, of the neutral point coil end portions 762c. That is, the electronic part 701 is disposed at a position overlapping, in the center axis direction, the end portion joint portions 62e between the neutral point coil end portions 762c and the neutral point coil end portions 62d of the V-phase neutral point segment conductors 62b. In other words, the electric part 301 is disposed on a portion of the neutral point coil end portions 762c on the opposite side, in the center axis direction, from the end portion joint portions 62e.

Figure 28:
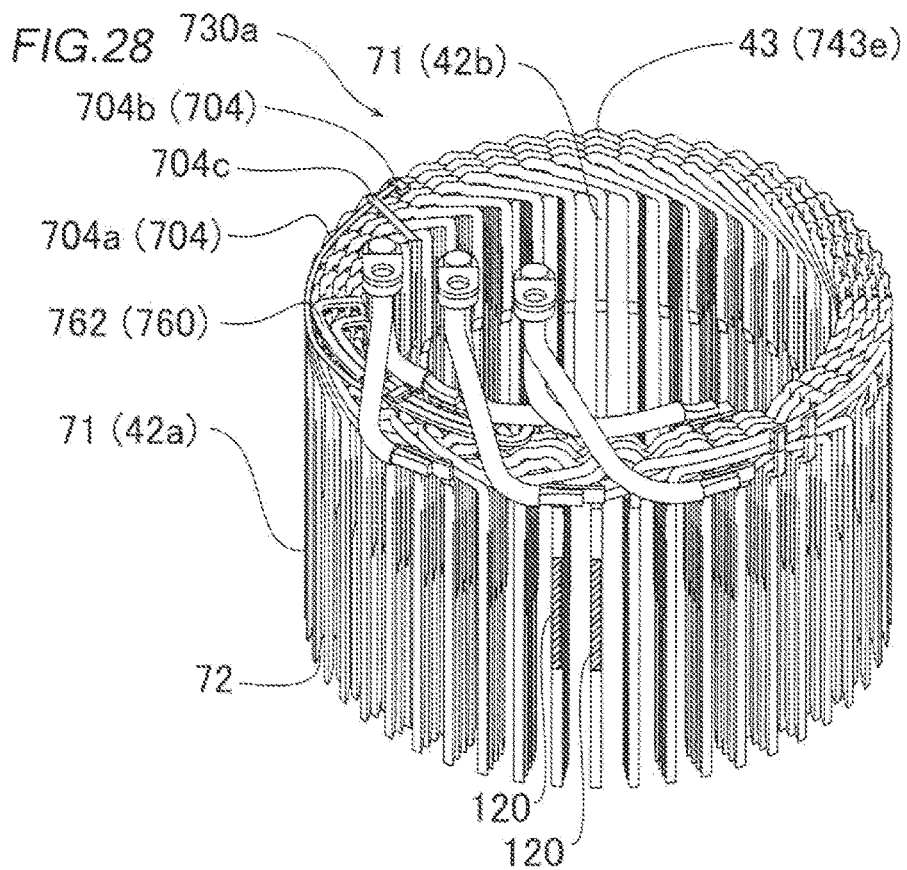
FIG. 28 is a perspective view illustrating the configuration of a first coil assembly according to the second embodiment.

As illustrated in FIGS. 25 and 28, the wiring member 704 includes a lead wire 704a connected to the temperature detection element 702, and is connected to a control circuit 700a (e.g. an external control circuit such as a control circuit for the rotary electric machine or a control circuit for a power conversion device) that is external to the stator 700. Consequently, information (a voltage value or a current value) based on the temperature detection element 702 is acquired by the external control circuit 700a and the rotary electric machine (stator 700) is controlled on the basis of the acquired information in the case where the temperature of the stator 700 (at the neutral point N of the coil portion 730 and the vicinity of the neutral point N) is varied. For example, operation of the rotary electric machine (stator 700) is stopped in the case where the temperature of the coil portion 730 is outside a predetermined temperature range. In this case, the electronic part 701 functions as a part that protects the stator 700. In addition, the wiring member 704 is provided with a connection member 704b (e.g. a connector) that connects the lead wire 704a to the external control circuit 700a. FIG. 28 illustrates the position of arrangement of the wiring member 704 during manufacture of the stator 700.

[Method of Manufacturing Stator According to Second Embodiment]

Figure 29:
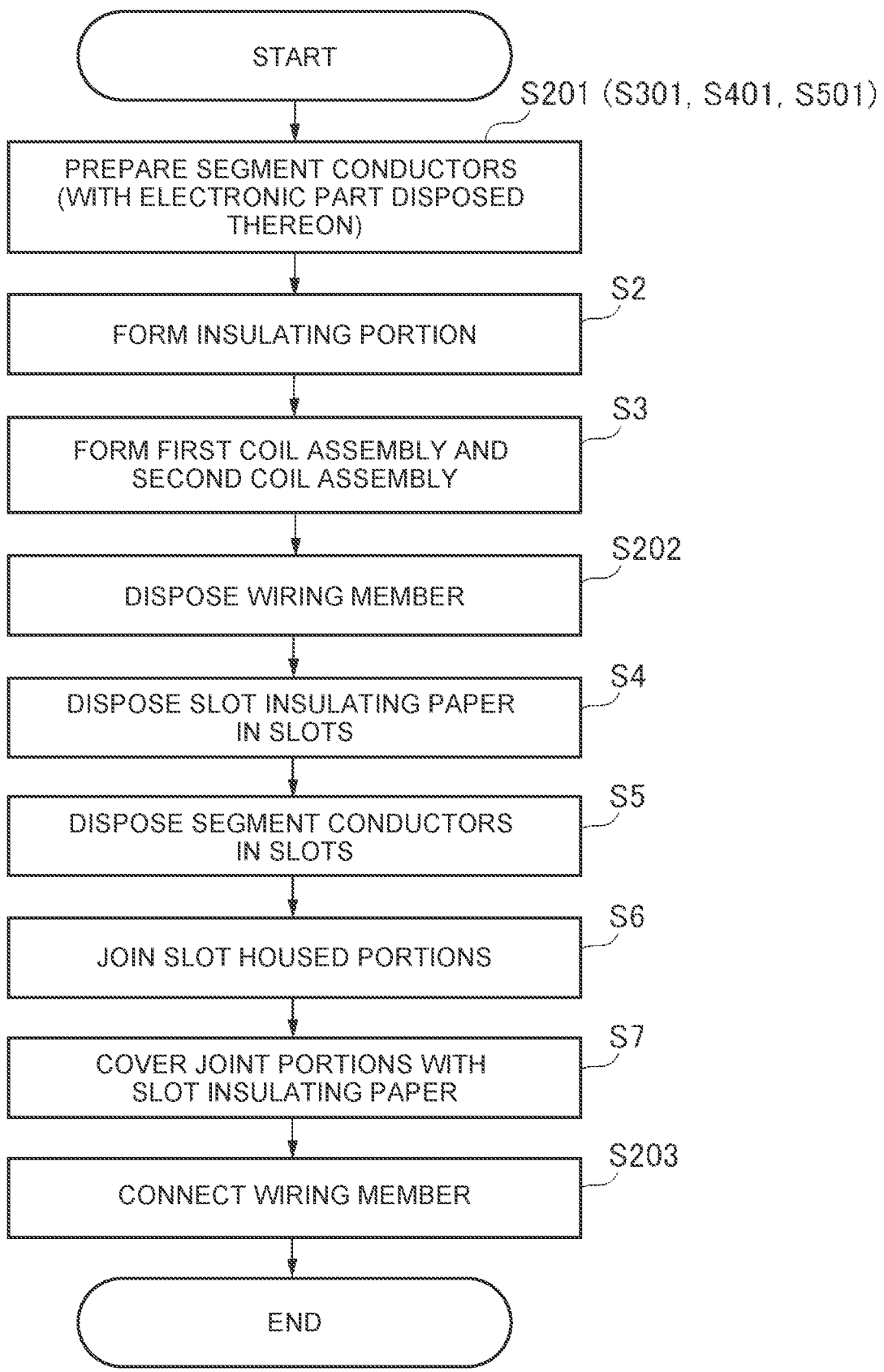
FIG. 29 is a flowchart illustrating steps of manufacturing the stator according to the second embodiment and modifications (sixth to eighth modifications).

Next, a method of manufacturing the stator 700 according to the second embodiment will be described. FIG. 29 is a flowchart illustrating the method of manufacturing the stator 700. In the second embodiment, step S201 which is different from step S1 according to the first embodiment is performed, and step S202 is performed after step S3 and before step S4. In addition, step S203 is performed after step S7. Processes that are the same as those according to the first embodiment described above are given the same step numbers in the drawings and the following description to omit description thereof.

(Step of Preparing Segment Conductors)

In step S201, a plurality of segment conductors 740 are prepared. In the second embodiment, in step S201, the power conductors 50, the general conductors 41, and the neutral point conductors 760 on which the electronic part 701 is disposed are prepared (formed).

Specifically, the radially outer neutral point conductor 61 and the radially inner neutral point conductor 762 are formed as the neutral point conductors 760. Particularly, as illustrated in FIGS. 25 and 26, the U-phase/W-phase neutral point segment conductors 762a which each include the neutral point coil end portion 762c which connects between the slot housed portion 42b for U-phase and the slot housed portion 42b for W-phase are shaped. In addition, the U-phase/W-phase neutral point segment conductors 762a are shaped such that the slot pitch of one of the two U-phase/W-phase neutral point segment conductors 762a is nine while the slot pitch of the other is seven. The V-phase neutral point segment conductors 62b which each include the slot housed portion 42b for V-phase and the neutral point coil end portion 62d are shaped.

After that, the end portion joint portions 62e are formed by joining (e.g. welding) the neutral point coil end portions 62d on the surfaces 763a of the two neutral point coil end portions 762c on the axially outer side (to each other). Consequently, the radially inner neutral point conductor 762 (neutral point conductor 760) in which the neutral point connection end portions NtU, the neutral point connection end portions NtV, and the neutral point connection end portions NtW (see FIG. 6) are electrically connected to each other are formed.

<Arrangement of Electronic Part>

Here, in the second embodiment, the neutral point conductors 760 on which the electronic part 701 is disposed are prepared by attaching the electronic part 701, which has the temperature detection element 702, to the radially inner neutral point conductor 762 of the neutral point conductors 760. Specifically, in the second embodiment, the neutral point conductors 760 on which the electronic part 701 is disposed are prepared by attaching the electronic part 701, which has the temperature detection element 702, to the surfaces 763b, on the stator core 10 side, of the neutral point coil end portions 762c, which are connected to the slot housed portions 42b, of the radially inner neutral point conductor 762.

The temperature detection element 702 is housed inside the case portion 703 by inserting the temperature detection element 702, to which the wiring member 704 is connected, into the housing portion 703a of the case portion 703. An adhesive (not illustrated) is applied to a surface of the case body portion 703b of the case portion 703 on the side in the direction of the arrow Z1 and the restriction walls 731, or at least a part of the surfaces 763b of the neutral point coil end portions 762c. The case body portion 703b is bonded using the adhesive to the surfaces 763b of the neutral point coil end portions 762c (surfaces on the opposite side, in the center axis direction, from the surfaces 763a on which the end portion joint portions 62e are provided). In this state, the restriction walls 731 are disposed on both sides, in the radial direction, of the neutral point coil end portions 762c. Consequently, the electronic part 701 is fixed to (disposed on) the neutral point conductor 760.

(Arrangement of Wiring Member)

In the second embodiment, the wiring member 704 of the electronic part 701 is disposed at a portion of the first coil assembly 730a on the opposite side from the second coil assembly 30b in the center axis direction in step S202, after step S3 in which the first coil assembly 730a and the second coil assembly 30b are formed and before step S5 in which the first coil assembly 730a and the second coil assembly 30b are inserted into the plurality of slots 12.

Specifically, as illustrated in FIG. 28, the wiring member 704 of the electronic part 701 is disposed on an end surface 743e, on the axially outer side, of the coil end portion 43 of the first coil assembly 730a. For example, the wiring member 704 (the lead wire 704a and the connection member 704b) is disposed so as to have an arcuate shape along the circumferential direction of the first coil assembly 730a in a circular ring shape. The wiring member 704 is fixed (temporarily fixed) to the first coil assembly 730a using a fixing member 704c (such as a string or an adhesive tape, for example) which is attachable to and removable from the coil end portion 43.

(Connection of Wiring Member)

In step S203 which is performed after step S7, the fixing member 704c is removed, and the connection member 704b of the wiring member 704 is connected to the external control circuit 700a, either directly or via different wiring. Consequently, the temperature detection element 702 and the external control circuit 700a are electrically connected to each other. The other configurations of the process of manufacturing the stator 700 according to the second embodiment are the same as those according to the first embodiment described above.

[Effects of Manufacturing Methods According to First and Second Embodiments]

The following effects can be obtained with the manufacturing methods according to the first and second embodiments.

In the first and second embodiments described above, the first segment conductors (50, 60, 760) in which a plurality of end portions (Pt, Nt), or an end portion (Pt, Nt) and a power terminal member (51), are electrically connected to each other are prepared, and thereafter the first segment conductors (50, 60, 760) are disposed in the armature core (10). Consequently, since the first segment conductors (50, 60, 760) are disposed in the armature core (10) with the plurality of end portions (Pt, Nt), or the end portion (Pt, Nt) and the power terminal member (51), electrically connected to each other in advance, it is not necessary to secure a tool space (e.g. a space for insertion of the distal end portion of a tool for welding) for connecting between the plurality of end portions (Pt, Nt), or between the end portion (Pt) and the power terminal member (51), around the end portion (Pt, Nt) of the coil portion (30, 730) which is disposed in the armature core (10). As a result, an increase in the size of the armature (100, 700) can be prevented since a different member (such as a different portion (43a, 43b, 43c, 43d) of the coil portion (30, 730)) can be disposed in proximity to the end portion (Pt, Nt) of the coil portion (30, 730). As a result, an increase in the size of the armature (100, 700) can be prevented also in the case where the end portion (Pt, Nt) of the coil portion (30, 730) is connected to the different member.

In the first and second embodiments described above, in addition, the step (S1, S201) of preparing the first segment conductors (50, 60, 760) is a step (S1, S201) of preparing the first segment conductors (50, 60, 760) in which a plurality of neutral point connection end portions (Nt), which are first end portions (Nt), for the individual phases, of the coil portion (30, 730) connected through a Y connection, are electrically connected to each other or power-side end portions (Pt), which are second end portions (Pt) of the coil portion (30, 730) for the individual phases, and the power terminal member (51) are electrically connected to each other by joining the plurality of neutral point connection end portions (Nt), or the power-side end portions (Pt) and the power terminal member (51), to each other. With such a configuration, the plurality of neutral point connection end portions (Nt), or the power-side end portions (Pt) and the power terminal member (51), can be joined to each other in advance before the first segment conductors (50, 60, 760) are disposed in the armature core (10), also in the case where it is necessary to join such components to each other. As a result, an increase in the size of the armature (100, 700) can be effectively prevented since it is not necessary to provide a tool space for joining with the armature (100, 700) in the completed state.

In the first and second embodiments described above, in addition, the plurality of neutral point connection end portions (Nt) are formed on a plurality of neutral point-connection segment conductors (60, 61, 62, 61a, 61b, 62a, 62b, 762a) that have the respective leg portions (42a, 42b) and respective coil end portions (61c, 62c, 762c) that are continuous with the leg portions (42a, 42b); and the step (S1, S201) of preparing the first segment conductors (50, 60, 760) is a step (S1, S201) of preparing the first segment conductors (50, 60, 760) in which the coil end portions (61c, 62c, 762c) of the plurality of neutral point-connection segment conductors (60, 61, 62, 61a, 61b, 62a, 62b, 762a) are joined to be electrically connected to each other. With such a configuration, the armature (100, 700) which includes the coil portion (30, 730) which is connected through a Y connection can be manufactured while preventing an increase in the size of the armature (100, 700).

In the first and second embodiments described above, in addition, the neutral point-connection segment conductors (60, 61, 62, 61a, 61b, 62a, 62b, 762a) include first neutral point-connection segment conductors (61a, 62a, 762a) that include first-phase (U) leg portions (42a, 42b) connected to the second segment conductors (41) for a first phase (U) of 3-phase AC, second-phase (W) leg portions (42a, 42b) connected to the second segment conductors (41, 41b) for a second phase (W) of the 3-phase AC, and coil end portions (61c, 61d, 62c, 62d, 762d) that connect between the first-phase (U) leg portions (42a, 42b) and the second-phase (W) leg portions (42a, 42b), and second neutral point-connection segment conductors (61b, 62b) that include the leg portions (42a, 42b) which are connected to the second segment conductors (41, 41b) for a third phase (V) of the 3-phase AC; and the step (S1, S201) of preparing the first segment conductors (50, 60, 760) is a step (S1, S201) of preparing the first segment conductors (50, 60, 760) in which the plurality of neutral point connection end portions (Nt) of the coil portion (30, 730) for the 3-phase AC are electrically connected to each other by joining the coil end portions (61c, 62c, 462c) of the first neutral point-connection segment conductors (61a, 62a, 762a) and the coil end portions (62c, 62d) of the second neutral point-connection segment conductors (61b, 62b) to each other. With such a configuration, the neutral point end portions (NtU) for the first phase (U), the neutral point end portions (NtW) for the second phase (W), and the neutral point end portions (NtV) for the third phase (V) can be connected to each other by joining the first neutral point-connection segment conductors (61a, 62a, 762a) and the second neutral point-connection segment conductors (61b, 62b) to each other. As a result, the number of joining steps can be reduced compared to the case where the neutral point end portions (Nt) for the first phase (U), the second phase (W), and the third phase (V) are joined to each other individually (at at least three locations).

In the first and second embodiments described above, in addition, the step (S1, S201) of preparing the first segment conductors (50, 60, 760) is a step (S1, S201) of preparing the first segment conductors (50) in which the power-side end portions (Pt) for the same phase are electrically connected to each other and in which the plurality of power-side end portions (Pt) which are connected to each other and the power terminal member (51) are electrically connected to each other. Here, in the case where a plurality of power-side end portions (Pt) are provided for each phase, it is necessary to connect between the plurality of power-side end portions (Pt). In this respect, with a configuration such as those according to the embodiments described above, even in the case where a plurality of power-side end portions (Pt) are provided for each phase, the plurality of power-side end portions (Pt) for the same phase can be electrically connected to each other before the first segment conductors (50) are disposed in the armature core (10). As a result, an increase in the size of the armature (100, 700) can be prevented, also in the case where a plurality of power-side end portions (Pt) are provided for each phase, since it is not necessary to provide a tool space for connecting between the power-side end portions (Pt).

In the first and second embodiments described above, in addition, the plurality of power-side end portions (Pt) include radially outer power-side end portions (Pt) disposed on a radially outer side of the armature core (10) and radially inner power-side end portions (Pt) disposed on a radially inner side of the armature core (10); and the step (S1, S201) of preparing the first segment conductors (50, 60, 760) is a step (S1, S201) of preparing the first segment conductors (50) in which the radially outer power-side end portions (Pt, 52) and the radially inner power-side end portions (Pt, 53) are electrically connected to each other. With such a configuration, the plurality of power-side end portions (Pt) can be electrically connected to each other before the first segment conductors (50) are disposed in the armature core (10) even in the case where the plurality of power-side end portions (Pt) are disposed away from each other on the radially outer side and the radially inner side of the armature core (10).

In the first and second embodiments described above, in addition, the second segment conductors (41, 41*b*) each include a pair of leg portions (42*a*, 42*b*) disposed at different circumferential positions and a coil end portion (43) that connects between the pair of leg portions (42*a*, 42*b*); the method further includes a step (S3) of forming a first coil assembly (30*a*, 730*a*), which includes the first segment conductors (50, 60, 760) and third segment conductors (41, 41*a*) that constitute a part of the coil portion (30, 730), and a second coil assembly (30*b*), which is composed of a plurality of segment conductors (40, 740) including the second segment conductors (41, 41*b*), after the step (S1, S201) of preparing the first segment conductors (50, 60, 760) and before a step (S5) of disposing the leg portions (42*a*, 42*b*); the step (S5) of disposing the leg portions (42*a*, 42*b*) is a step (S5) of disposing the leg portions (71) of the first segment conductors (50, 60, 760) and the leg portions (71) of the third segment conductors (41, 41*a*) in the armature core (10) by moving the first coil assembly (30*a*, 730*a*) toward one side in the center axis direction with respect to the armature core (10), and disposing the leg portions (81) of the second segment conductors (41, 41*b*) in the armature core (10) by moving the second coil assembly (30*b*) toward the other side in the center axis direction with respect to the armature core (10); and the step (S6) of joining is a step (S6) of joining the leg portions (71) of the first segment conductors (50, 60, 760) and one (81) of the pair of leg portions (81) of the second segment conductors (41, 41*b*) to each other, and joining the leg portions (71) of the third segment conductors (41, 41*a*) and the other (81) of the pair of leg portions (81) of the second segment conductors (41, 41*b*) to each other. Here, in the case where the first segment conductors (50, 60, 760), the second segment conductors (41, 41*b*), and the third segment conductors (41, 41*a*) are disposed individually in the armature core (10), it is conceivable that the segment conductors (40, 740) which are disposed in the armature core (10) earlier and the segment conductors (40, 740) which are disposed in the armature core (10) later, among the first segment conductors (50, 60, 760), the second segment conductors (41, 41*b*), and the third segment conductors (41, 41*a*), may interfere with each other during arrangement (insertion). In this respect, with a configuration such as those according to the embodiments described above, the plurality of segment conductors (40, 740) are disposed in the armature core (10) all at once with the first coil assembly (30*a*, 730*a*) and the second coil assembly (30*b*) formed by the plurality of segment conductors (40, 740), which can prevent interference between the segment conductors (40, 740) which are disposed earlier and the segment conductors (40, 740) which are disposed later.

Here, in the case where an electronic part is disposed on the coil after the coil is disposed in the stator core, a work space (tool space) is required around a portion of the coil at which the electronic part is to be disposed, in order to dispose the electronic part on the coil. For example, a space for the arrangement of a tool or an operator's finger for disposing the electronic part on the coil and a space for the arrangement of a holding jig that holds the electronic part during a period since the electronic part is disposed on the coil until an adhesive disposed between the electronic part and the coil is cured are required around a portion of the coil at which the electronic part is to be disposed. Therefore, in a method in which an electronic part is disposed on the coil after the coil is disposed in the stator core, it is necessary to dispose members around a portion at which the electronic part is to be disposed so that the members are away from the coil in consideration of a tool space (work space), in order to dispose the electronic part on the coil. In this respect, in the second embodiment described above, the step (S201) of preparing the first segment conductors (760) is a step (S2) of preparing the first segment conductors (760) in which the plurality of the end portions (Nt, Pt), or the end portions (Pt) and the power terminal member (51), are electrically connected to each other and in which an electronic part (701) is disposed on the segment conductor (740). With such a configuration, the first segment conductors (760) are disposed in the armature core (10) with the electronic part (701) disposed on the segment conductor (740) in advance, and thus it is not necessary to secure a work space for the arrangement of the electronic part (701) between a portion (763*b*) of the segment conductor (760) at which the electronic part (701) is disposed and other members. As a result, the other members (such as other portions of the coil portion (730)) can be disposed in proximity to a portion (763*b*) of the segment conductor (760) at which the electronic part (701) is disposed, and thus an increase in the size of the armature (700) can be prevented also in the case where the electronic part (701) is disposed on the coil portion (730) in which the plurality of end portions (Nt, Pt), or the end portions (Pt) and the power terminal member (51), are electrically connected to each other.

In addition, in the second embodiment described above, with a configuration such as that described above, the first segment conductors (760) are disposed in the armature core (10) after the first segment conductors (760) in which the electronic part (701) is disposed on the segment conductor (740) are prepared. Consequently, the first segment conductors (760) are disposed in the armature core (10) with the electronic part (701) disposed on the segment conductor (740) in advance, and thus it is not necessary to secure a work space for the arrangement of the electronic part (701) between a portion of the segment conductor (740) at which the electronic part (701) is disposed and other members. As a result, the other members (such as other portions of the coil portion) can be disposed in proximity to a portion of the segment conductor (740) at which the electronic part (701) is disposed, and thus an increase in the size of the armature (700) can be prevented also in the case where the electronic part (701) is disposed on the coil portion (730).

In the second embodiment described above, in addition, the step (S201) of preparing the first segment conductors (760) is a step (S201) of preparing the first segment conductors (760) on which the electronic part (701) is disposed by attaching the electronic part (701) which has a temperature detection element (702) to a neutral point-connection segment conductor (760), among the plurality of segment conductors (740). Here, there may be a case, as a failure mode of the armature, where a current does not flow through a coil portion for one phase (W-phase coil portion) while a current continuously flows through coil portions for the other phases (U-phase coil portion and V-phase coil portion), for example. In this case, while the temperature of the coil portions for the other phases is raised, the temperature of the coil portion for the one phase is not generally raised since no current flows therethrough. In the case where a temperature detection element is provided to only the coil portion for the one phase (W-phase coil portion), among the coil portions for the plurality of phases, it is difficult to detect a temperature abnormality etc. using the temperature detection element. In the case where a temperature detection element is provided to each of the coil portions for the respective phases, meanwhile, the number of parts is increased, which increases the size of the armature. In this respect, if the electronic part (701) which has the temperature detection element (702) is disposed on the neutral point-connection segment conductor (760) as in the second embodiment described above, the temperature detection element (702) which is disposed on the neutral point-connection segment conductor (760), which has a neutral point (N) through which a current inevitably flows no matter which of the phases of the coil portion (730) the current flows for, can prevent it from being difficult to detect a temperature abnormality etc. In addition, it is not necessary to provide the temperature detection element (702) for each of the phases of the coil portion (730), which can prevent an increase in the size of the armature (700) even in the case where the electronic part (701) is provided on the coil portion (730).

In the second embodiment described above, in addition, the step (S201) of preparing the first segment conductors (760) is a step (S201) of preparing the first segment conductors (760) on which the electronic part (701) is disposed by attaching the electronic part (701) which has a temperature detection element (702) to a surface (763*b*), on an armature core (10) side, of a coil end portion (762*c*) connected to the leg portions (42*b*) of the plurality of segment conductors (740). With such a configuration, the temperature detection element (702) can be disposed on the armature core (10) side in the armature (700) at a position close to the leg portions (42*b*), which serve as a heat generation source, compared to the case where the temperature detection element (702) is provided on the surface (763*a*) of the coil end portion (762*c*) on the opposite side from the armature core (10). As a result, temperature variations (e.g. a temperature abnormality) in the heat generation source can be detected immediately and more accurately by disposing the temperature detection element (702) at a position relatively close to the heat generation source.

In the second embodiment described above, in addition, the method further includes: a step (S3) of forming a first coil assembly (730*a*), which includes the first segment conductors (760) and third segment conductors (41) that constitute a part of the coil portion (730), and a second coil assembly (30*b*), which is composed of a plurality of segment conductors (740) including the second segment conductors (41), after the step (S201) of preparing the first segment conductors (760) and before a step (S5) of disposing the leg portions (42*a*, 42*b*); and a step (S203) of disposing the wiring member (704) of the electronic part (701) on a portion (743*e*) of the first coil assembly (730*a*) on the opposite side from the second coil assembly (730*b*) in the center axis direction, after the step of forming the first coil assembly (730*a*) and the second coil assembly (30*b*) and before the step (S5) of disposing the leg portions (42*a*, 42*b*). With such a configuration, the wiring member (704) of the electronic part (701) which is disposed in the first coil assembly (730*a*) can be prevented from mechanically interfering with the armature core (10) or the second coil assembly (30*b*) in the step of disposing the leg portions (42*a*, 42*b*) (step of disposing the first coil assembly (730*a*) and the second coil assembly (30*b*) in the armature core (10)).

[Effects of Structures According to First and Second Embodiments]

The following effects can be obtained with the structures according to the first and second embodiments.

Here, in the case where all the segment conductors included in the coil portion, including the first segment conductors, are constituted at the same slot pitch and all the segment conductors are disposed in the stator core (slots) after the first segment conductors are formed by electrically connecting the plurality of end portions, or the end portion and the power terminal member, to each other, it is not easy to prevent mechanical interference between the first segment conductors and the other segment conductors. Particularly, in the case where the first segment conductors and the other segment conductors are constituted at the same slot pitch, the relationship of arrangement of the segment conductors is uniform, and the spacing between portions (coil end portions) of the coil portion outside the slots is uniform. Therefore, it is necessary to dispose portions at which the plurality of end portions, or the end portion and the terminal member, are connected to each other between the coil end portions which have a uniform spacing therebetween. In this case, it is considered that the size of the armature is increased, since it is necessary to set the spacing between the coil end portions to be large, or to dispose portions in which the plurality of end portions are connected to each other or portions in which the end portion and the terminal member are connected to each other away from the coil end portions by a relatively long distance, in order to prevent mechanical interference between the connection portions and the coil end portions. In this respect, in the first and second embodiments described above, the spacing between the coil end portions (43, 61*c*, 61*d*, 62*c*, 62*d*, 762*d*) can be adjusted in accordance with the shape of the connection portions (52*b*, 53*b*, 61*e*, 62*e*) between the plurality of end portions (Pt, Nt), or the connection portions (52*b*, 53*b*) between the end portion (Pt, Nt) and the power terminal member (51), by making a first slot pitch different from a second slot pitch (slot pitch of general segment conductors (40, 740)). As a result, the distance (D1, D2, D3, D4) between the coil end portions (43) and the connection portions (52*b*, 53*b*, 61*e*, 62*e*) between the plurality of end portions (Pt, Nt), or between the end portion (Pt, Nt) and the power terminal member (51), can be set appropriately while preventing mechanical interference between the first segment conductors (50, 60, 760) and the other segment conductors (40, 740). As a result, the first segment conductors (50, 60, 760) in which a plurality of end portions (Pt, Nt), or an end portion (Pt, Nt) and a power terminal member (51), are electrically connected to each other can be disposed in the armature core (10) after preparing the first segment conductors (50, 60, 760) while preventing an increase in the size of the armature (100, 700). Consequently, an increase in the size of the armature (100, 700) can be prevented since it is not necessary to secure a tool space around the end portion (Pt, Nt) of the coil portion (30, 730) which is disposed in the armature core (10). As a result, it is possible to provide an armature (100, 700), an increase in the size of which can be prevented also in the case where the end portion (Pt, Nt) of the coil portion (30, 730) is connected to a different member.

In the first and second embodiments described above, in addition, the end portion (NtU) of the first neutral point-connection segment conductor (61*a*, 62*a*, 762*a*) which constitutes a neutral point (N) side for the first phase (U) and the end portion (NtU) thereof which constitutes a neutral point (N) side for the second phase (W) can be formed continuously. As a result, it is not necessary to secure a tool space around the end portion (NtU) which constitutes the neutral point (N) side for the first phase (U) and the end portion (NtW) which constitutes the neutral point (N) side for the second phase (W) since it is not necessary to join the end portion (NtU) which constitutes the neutral point (N) side for the first phase (U) and the end portion (NtW) which constitutes the neutral point (N) side for the second phase (W) to each other after disposing the first segment conductors (60, 760) in the armature core (10). As a result, an increase in the size of the armature (100, 700) can be prevented. As a result, it is possible to provide an armature (100, 700), an increase in the size of which can be prevented also in the case where the end portion (Nt) of the coil portion (30, 730) (the end portion (NtU) which constitutes the neutral point (N) side for the first phase (U)) is connected to the different member (the end portion (NtW) which constitutes the neutral point (N) side for the second phase (W)).

In the first and second embodiments described above, in addition, a different member (third segment conductors (41, 41a)) is disposed in proximity to the end portion joint portions (51c, 51d, 52c, 52d, 61e, 62e) so as to be away therefrom by twice the width (W11) of the cross-sectional surface of the segment conductor (40, 740) or less (D1, D2, D3, D4). Thus, an increase in the size of the armature (100, 700) can be prevented compared to the case where a tool space (with twice the width (W11) of the cross-sectional surface of the segment conductor (40, 740), for example) is provided. As a result, it is possible to provide an armature (100, 700), an increase in the size of which can be prevented also in the case where the end portion (Pt, Nt) of the coil portion (30, 730) is connected to a different member.

MODIFICATIONS

The embodiments disclosed herein should be considered as exemplary and non-limiting in all respects. The scope of the preferred embodiment is defined by the scope of the claims, rather than the description of the embodiments described above, and includes all changes (modifications) that fall within the scope of the claims and the meaning and scope of equivalence.

First Modification

Figure 30:
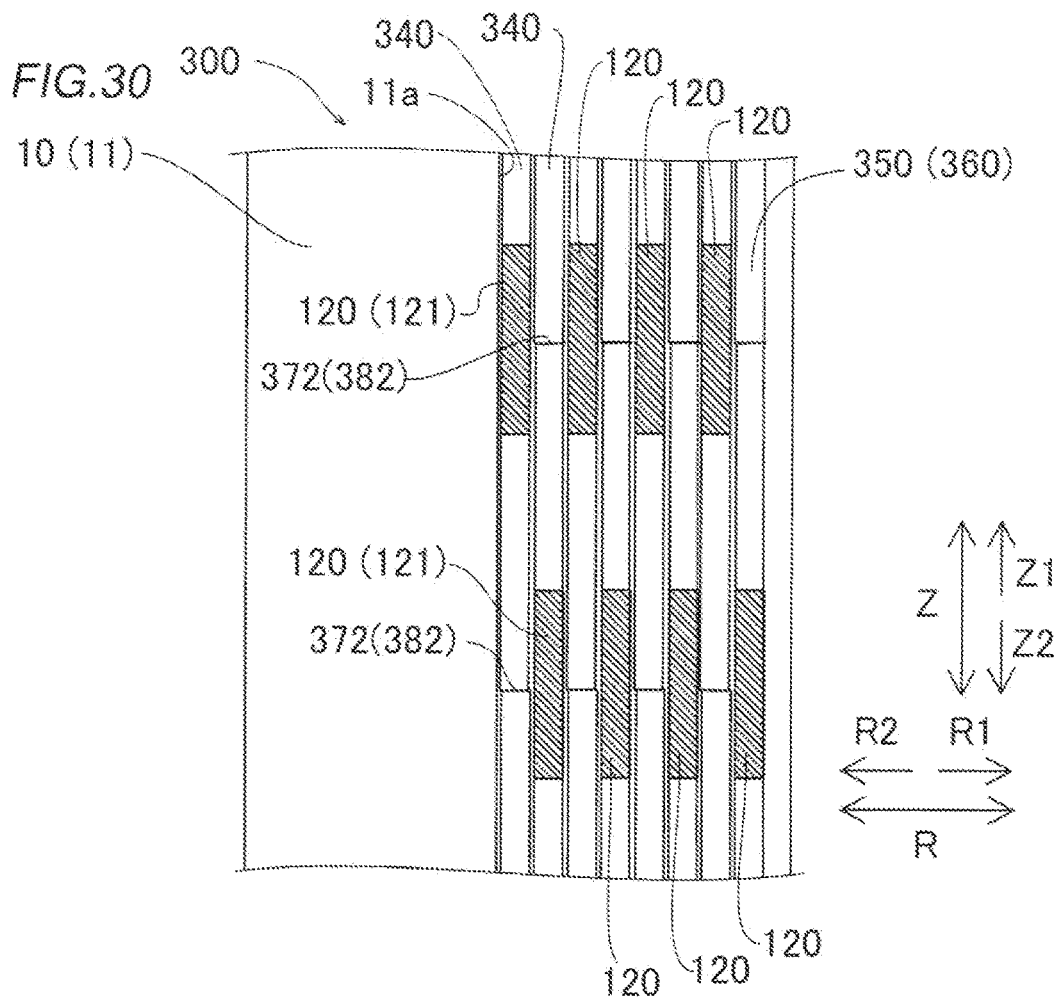
FIG. 30 illustrates the configuration of a stator according to a first modification of the first and second embodiments.

For example, in the first and second embodiments described above, the first facing surface is configured to direct to the radially inner side, and the second facing surface is configured to direct to the radially outer side. However, the preferred embodiment is not limited thereto. For example, as in a stator 300 according to a first modification illustrated in FIG. 30, a first facing surface 372 and a second facing surface 382 may each be constituted as a flat surface that is orthogonal to the axial direction. In the first modification, unlike the embodiments described above, the first facing surface 372 and the second facing surface 382 are pressed from the axially outer side of segment conductors 340, and the first facing surface 372 and the second facing surface 382 are heated and joined to each other while being pressed against each other in the axial direction. Also in the stator 300 according to the first modification, as in the embodiments described above, a step of forming (welding) power conductors 350 and neutral point conductors 360 is performed before a step of joining the first facing surface 372 and the second facing surface 382 to each other.

Second Modification

Figure 31:
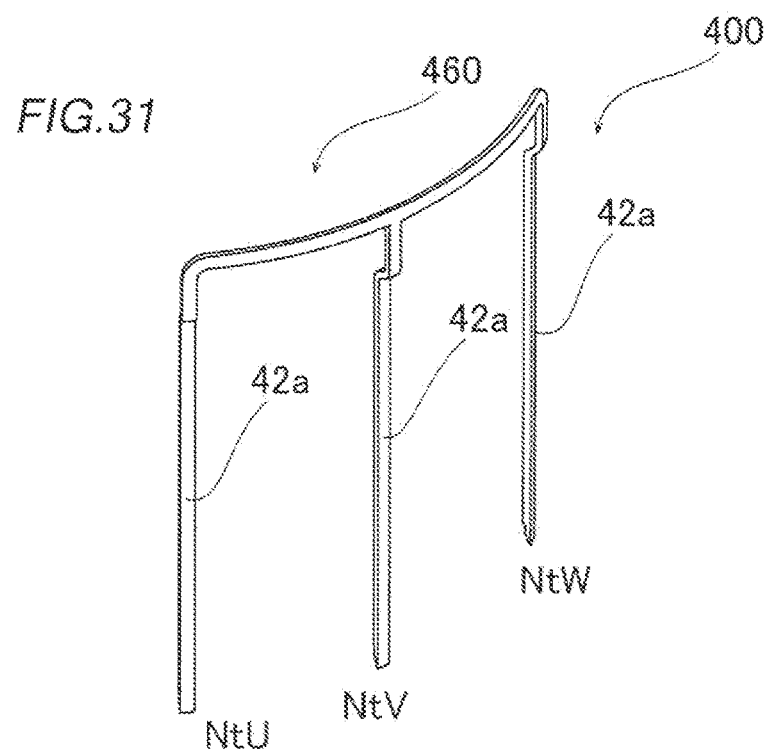
FIG. 31 illustrates the configuration of a stator according to a second modification of the first and second embodiments.

In the first and second embodiments described above, in addition, the radially inner neutral point conductor and the radially outer neutral point conductor are each configured such that the neutral point connection end portions NtU, NtV, and NtW are electrically connected to each other with a plurality of segment conductors joined to each other. However, the preferred embodiment is not limited thereto. For example, as in a stator 400 according to a second modification illustrated in FIG. 31, a neutral point conductor 460 (a radially outer neutral point conductor or a radially inner neutral point conductor) may be formed from a single conductor without being joined (welded) such that the neutral point connection end portions NtU, NtV, and NtW are electrically connected to each other. For example, three slot housed portions 42a are formed to be continuous in the neutral point conductor 460.

Third Modification

Figures 32A, 32B:
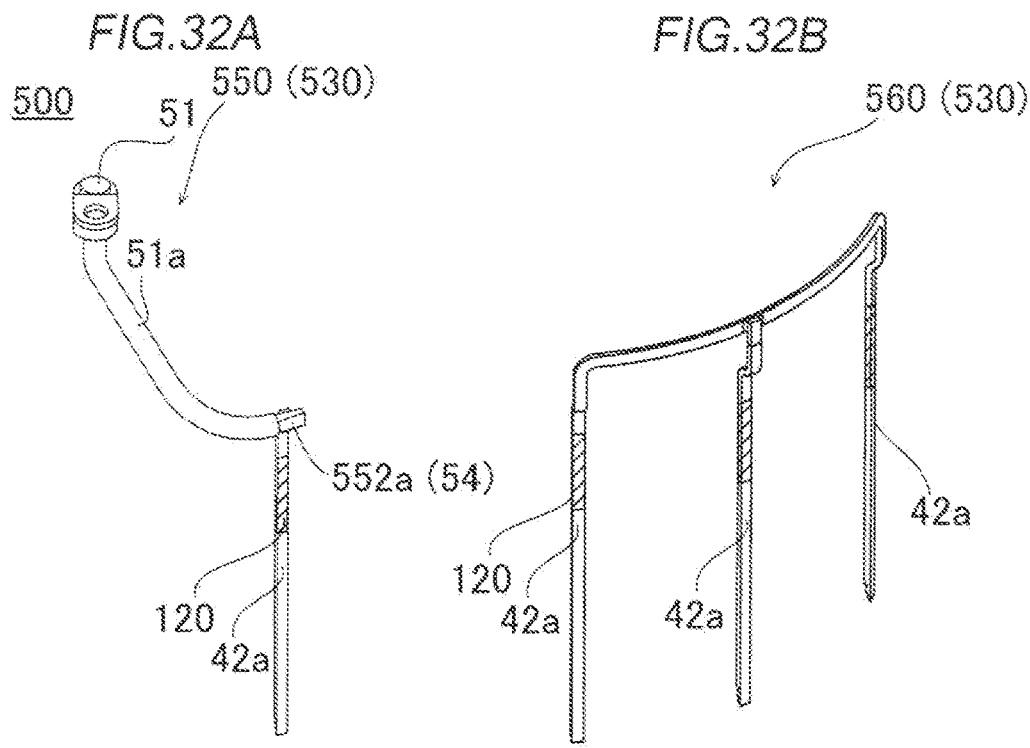
FIG. 32A illustrates a power conductor and FIG. 32B illustrates a neutral point conductor.

In the first and second embodiments described above, in addition, the coil portion is constituted (connected) through a Y connection of four parallel segment conductors (four-parallel connection). However, the preferred embodiment is not limited thereto. For example, the coil portion may be connected through a Δ connection, or may be connected through a V connection. In this case, the coil portion is not provided with neutral point conductors, and power conductors joined to a power connection member are prepared. As in a stator 500 according to a third modification illustrated in FIG. 32, meanwhile, a coil portion 530 may be connected through a single Y connection (1Y connection). For example, the coil portion 530 is provided with a power terminal member 51, a lead wire 54, a coil end portion 552d connected to the lead wire 54, and a power conductor 550 that includes a slot housed portion 42a that is continuous with the coil end portion 552a as illustrated in FIG. 32A, and the coil portion 530 is provided with a single neutral point conductor 560 as illustrated in FIG. 32B.

Fourth Modification

Figure 33:
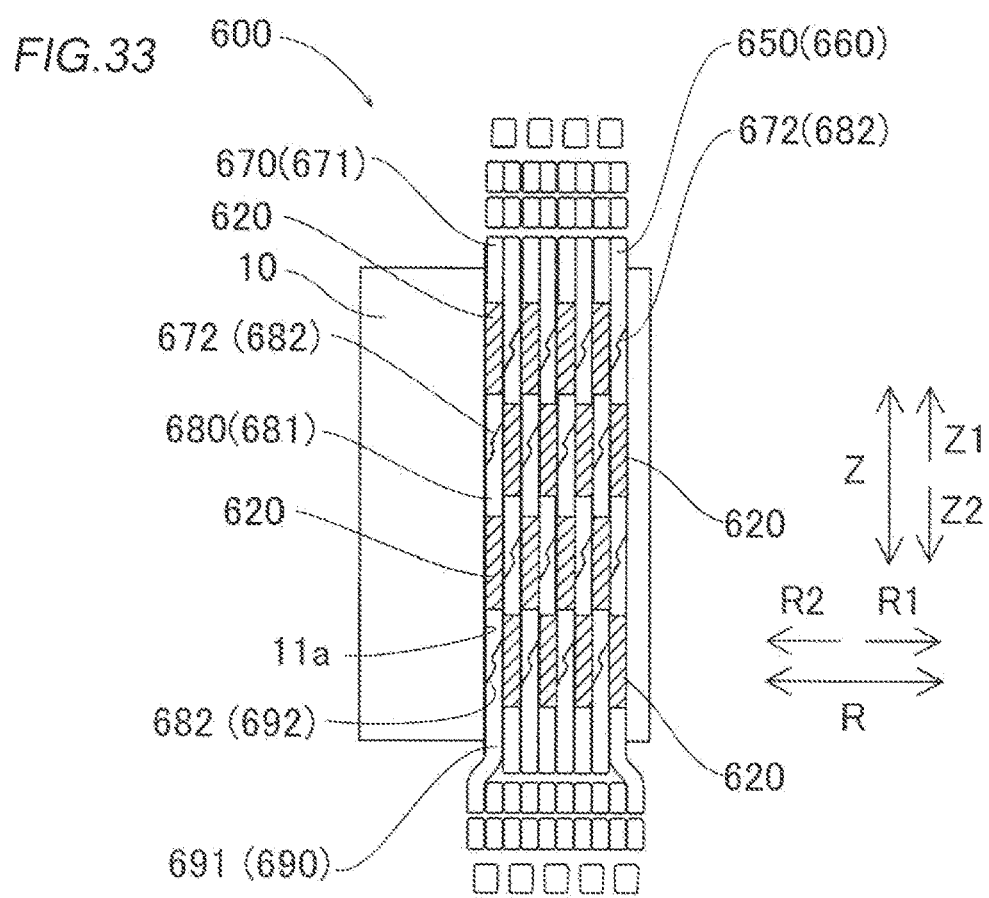
FIG. 33 illustrates the configuration of a stator according to a fourth modification of the first and second embodiments.

In the first and second embodiments described above, in addition, a segment conductor disposed on one axial side with respect to the stator core and a segment conductor disposed on the other axial side with respect to the stator core are joined to each other at one location in the slot. However, the preferred embodiment is not limited thereto. For example, as in a stator 600 according to a fourth modification illustrated in FIG. 33, a first slot housed portion 671 (first facing surface 672) of a first segment conductor 670 and a second slot housed portion 681 (second facing surface 682) of a second segment conductor 680 are joined to each other and the second slot housed portion 681 (second facing surface 682) of the second segment conductor 680 and a third slot housed portion 691 (third facing surface 692) of a third segment conductor 690 are joined to each other (at two locations) in the slot. Also in the stator 600 according to the fourth modification, as in the embodiments described above, a step of forming (welding) power conductors 650 and neutral point conductors 660 is performed before a step of joining the first facing surface 572 and the second facing surface 582 to each other and before a step of joining the second facing surface 582 and the third facing surface 592 to each other.

Fifth Modification

Figure 34:
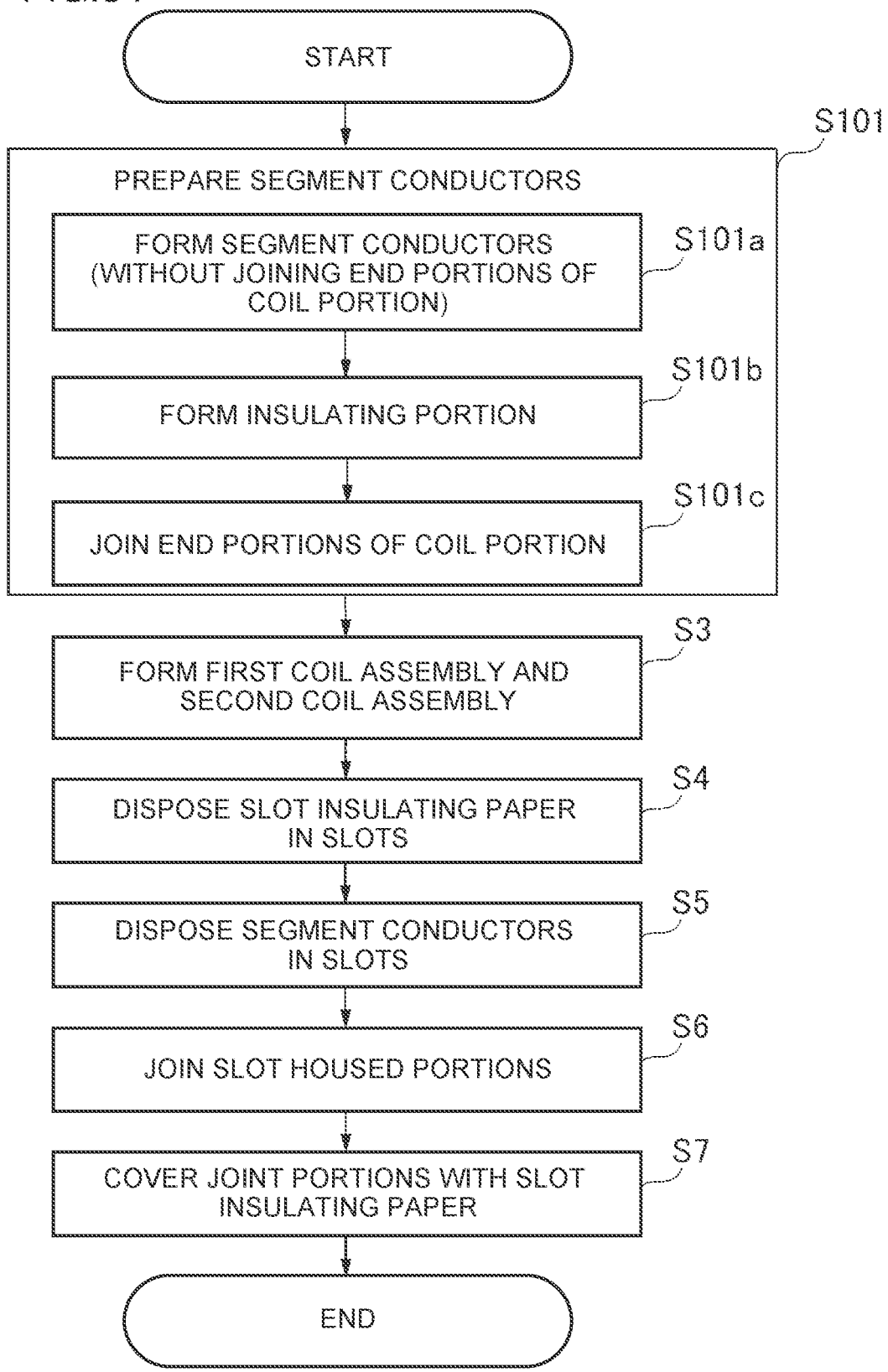
FIG. 34 is a flowchart illustrating a method of manufacturing a stator according to a fifth modification of the first and second embodiments.

In the first and second embodiments described above, in addition, as illustrated in FIGS. 19 and 29, the step (S2) of attaching the insulating member to the segment conductors is performed after the step (S1, S201) of joining the end portions of the coil portion (at the power conductors or the neutral point conductors). However, the preferred embodiment is not limited thereto. For example, as in a method of manufacturing a stator according to a fifth modification illustrated in FIG. 34, segment conductors may be formed without performing a step of joining the end portions of the coil portion in step S101*a*, an insulating portion may be formed on each of the segment conductors in step S101*b*, and thereafter a step (S101*c*) of joining the end portions of the coil portion (at the power conductors or the neutral point conductors) may be performed. In this case, steps S101*a*, S101*b*, and S101*c* constitute a step (S101) of preparing segment conductors. After that, steps S3 to S7 are performed in the same manner as in the embodiments described above.

Sixth and Seventh Modifications

Figure 35A:
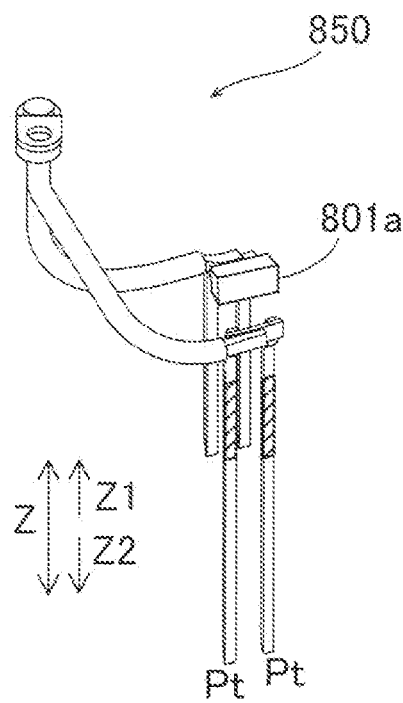
FIG. 35A illustrates a power conductor according to a sixth modification and FIG. 35B illustrates a general conductor according to a seventh modification.
Figure 35B:
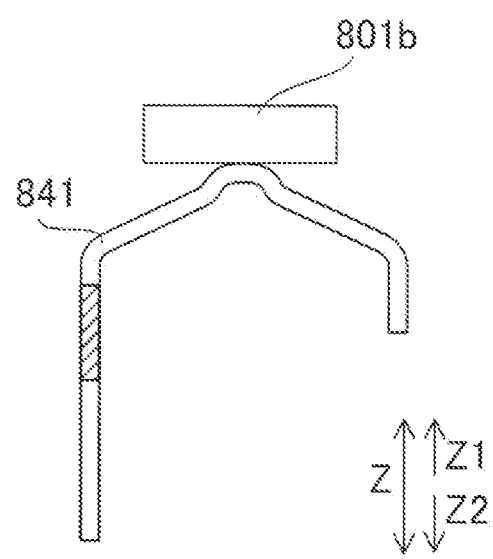

In the second embodiment described above, in addition, the electronic part is disposed on the neutral point conductor in step S201 (see FIG. 29). However, the preferred embodiment is not limited thereto. For example, an electronic part 801*a* may be disposed on a power conductor 850 (FIG. 35A) in step S301 as in a method of manufacturing a stator according to a sixth modification illustrated in FIG. 29, or an electronic part 801*b* may be disposed on a general conductor 841 (FIG. 35B) in step S401 as in a method of manufacturing a stator according to a seventh modification illustrated in FIG. 29.

Eighth Modification

Figure 36:
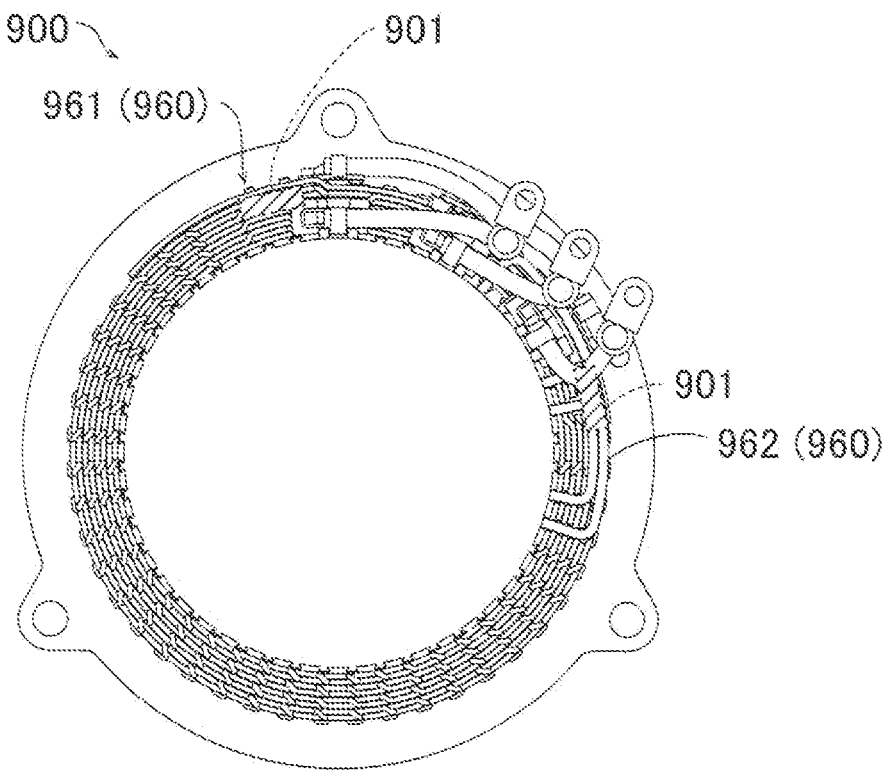
FIG. 36 is a plan view illustrating the configuration of a stator according to an eighth modification of the second embodiment.

In the second embodiment described above, in addition, one electronic part is disposed on the neutral point conductor in step S201 (see FIG. 29). However, the preferred embodiment is not limited thereto. For example, as in a method of manufacturing a stator 900 according to an eighth modification illustrated in FIG. 36, a plurality of (e.g. two) electronic parts 901 may be disposed on neutral point conductors 960 (a radially outer neutral point conductor 961 and a radially inner neutral point conductor 962) in step S501 (see FIG. 29).

Ninth Modification

In the first and second embodiments described above, in addition, the first slot housed portion and the second slot housed portion are joined to each other in the slot. However, the preferred embodiment is not limited thereto. For example, as in a stator 1000 according to a ninth modification illustrated in FIG. 37, a first leg portion 1071 of a first segment conductor 1070 and a second leg portion 1081 of a second segment conductor 1080 may be joined to each other at a joint portion 1090 on the axially outer side with respect to the slot 12. In this case, the joint portion 1090 is pressed in the state of being interposed between a first pressing jig 1001 and a second pressing jig 1002 in the radial direction to be joined.

Other Modifications

In the embodiments described above, in addition, the armature according to the preferred embodiment is constituted as a stator. However, the preferred embodiment is not limited thereto. For example, the armature according to the preferred embodiment may be constituted as a rotor that has a rotor core and a coil (segment conductors).

In the embodiments described above, in addition, the opening portions are formed on the radially inner side of the stator. However, the preferred embodiment is not limited thereto. For example, the opening portions may be formed on the radially outer side of the stator.

In the embodiments described above, in addition, the coil is formed as a wave-wound coil. However, the preferred embodiment is not limited thereto. For example, the coil may be formed as a distributed wound coil or a concentrated wound coil.

In the embodiments described above, in addition, the segment conductors are formed to have a rectangular cross-sectional shape. However, the preferred embodiment is not limited thereto. That is, the segment conductors may be formed to have a cross-sectional shape (such as a circular shape and an elliptical shape) other than the rectangular shape.

In the embodiments described above, in addition, the slots are constituted as semi-open slots (with the opening width being smaller than the slot width). However, the preferred embodiment is not limited thereto. For example, the slots may be constituted as full-open slots with the opening width being equal to the slot width if the characteristics of the stator (armature) are not affected significantly. For the characteristics of the stator, semi-open slots are more preferable than full-open slots.

In the embodiments described above, in addition, a method of pressing the first other end surface or the second one end surface and a method of heating the joint material are described. However, the preferred embodiment is not limited thereto. That is, the first other end surface or the second one end surface may be pressed and the joint material may be heated by a method other than the pressing method and the heating method according to the embodiments described above.

In the embodiments described above, in addition, the power line terminal members are disposed on one side (outer side) in the axial direction of the stator core as illustrated in FIG. 2. However, the preferred embodiment is not limited thereto. For example, the power line terminal members may be disposed on the radially outer side with respect to the stator core and the axially inner side of the stator core.

In the embodiments described above, in addition, the power conductors and the neutral point conductors are electrically connected to each other with the power-side end portions or the neutral point connection end portions joined to each other by welding. However, the preferred embodiment is not limited thereto. That is, the power conductors and the neutral point conductors may be electrically connected to each other with the power-side end portions or the neutral point connection end portions joined to each other by a method other than welding. For example, the power-side end portions or the neutral point connection end portions may be electrically connected to each other using a joint material (such as silver nano paste).

In the embodiments described above, in addition, a plurality of neutral point connection end portions are electrically connected to each other by joining the neutral point coil end portions to each other to form the radially outer neutral point conductor and the radially inner neutral point conductor. However, the preferred embodiment is not limited thereto. That is, a plurality of neutral point connection end portions may be electrically connected to each other by joining the slot housed portions to each other, or the neutral point coil end portions and the slot housed portions to each other, to form the radially outer neutral point conductor and the radially inner neutral point conductor.

In the embodiments described above, in addition, the slot pitch of the power conductors is determined as 0 or 1, the slot pitch of the neutral point conductors is determined as 7 or 9, and the slot pitch of the general conductors is determined as 6. However, the preferred embodiment is not limited thereto. That is, it is only necessary that the slot pitch of the power conductors should be different from the slot pitch of the general conductors, and that the slot pitch of the neutral point conductors should be different from the slot pitch of the general conductors, and the slot pitch of the power conductors may be 2 or more, the slot pitch of the neutral point conductors may be 6 or less, 8, or 10 or more, and the slot pitch of the general conductors may be 5 or less or 7 or more.

In the embodiments described above, in addition, the segment conductor is provided with the insulating member. However, the preferred embodiment is not limited thereto. That is, the insulating member may not be provided in the case where the insulating coating of the segment conductor has a sufficient thickness (equal to or more than the thickness t2).

In the embodiments described above, in addition, the plurality of segment conductors are disposed in the slot after the first coil assembly and the second coil assembly in a circular ring shape are formed. However, the preferred embodiment is not limited thereto. That is, the plurality of segment conductors may be individually disposed in the slots if the plurality of segment conductors can be individually disposed in the slot without forming the first coil assembly and the second coil assembly in a circular ring shape (without performing step S3 in FIG. 19).

In the embodiments described above, in addition, the first coil assembly is provided with both the power conductors and the neutral point conductors. However, the preferred embodiment is not limited thereto. That is, the first coil assembly may be provided with either the power conductors or the neutral point conductors, and the second coil assembly may be provided with the power conductors or the neutral point conductors with which the first coil assembly is not provided.

In the second embodiment described above, in addition, the electronic part which has a temperature detection element (thermistor) is disposed on the neutral point conductor. However, the preferred embodiment is not limited thereto. That is, an electronic part that does not include a temperature detection element (thermistor) may be disposed on the neutral point conductor.

In the second embodiment described above, in addition, the electronic part is disposed on a surface of the coil end portion of the neutral point conductor on the stator core side. However, the preferred embodiment is not limited thereto. That is, the electronic part may be disposed on a portion other than the surface on the stator core side.

In the second embodiment described above, in addition, the electronic part is provided with the case portion. However, the preferred embodiment is not limited thereto. That is, an element (e.g. a temperature detection element) may be directly bonded to (disposed on) the segment conductor without providing the case portion.

In the second embodiment described above, in addition, the electronic part is fixed to the neutral point conductor using an adhesive. However, the preferred embodiment is not limited thereto. That is, the electronic part may be fixed to the neutral point conductor without using an adhesive. For example, the electronic part may be fixed to the neutral point conductor using a string, a fastening member, etc.

DESCRIPTION OF THE REFERENCE NUMERALS

10 STATOR CORE (ARMATURE CORE)
12 SLOT
30, 530, 730 COIL PORTION
30a, 730a FIRST COIL ASSEMBLY
30b SECOND COIL ASSEMBLY
40, 740 SEGMENT CONDUCTOR
41, 841 GENERAL CONDUCTOR (SECOND SEGMENT CONDUCTOR, THIRD SEGMENT CONDUCTOR)
41a FIRST GENERAL CONDUCTOR (THIRD SEGMENT CONDUCTOR)
41b SECOND GENERAL CONDUCTOR (SECOND SEGMENT CONDUCTOR)
42a, 42b SLOT HOUSED PORTION (LEG PORTION)
43 COIL END PORTION
50, 550, 660, 850 POWER CONDUCTOR (FIRST SEGMENT CONDUCTOR)
51 POWER TERMINAL MEMBER
52 RADIALLY OUTER POWER CONDUCTOR (FIRST SEGMENT CONDUCTOR)
52c, 52d, 53c, 53d, 61e, 62e END PORTION JOINT PORTION
53 RADIALLY INNER POWER CONDUCTOR (FIRST SEGMENT CONDUCTOR)
60, 460, 560, 660, 760, 960 NEUTRAL POINT CONDUCTOR (FIRST SEGMENT CONDUCTOR)
61, 961 RADIALLY OUTER NEUTRAL POINT CONDUCTOR (FIRST SEGMENT CONDUCTOR)
61a, 62a, 762a U-PHASE/W-PHASE NEUTRAL POINT SEGMENT CONDUCTOR (FIRST NEUTRAL POINT-CONNECTION SEGMENT CONDUCTOR)
61b, 62b V-PHASE NEUTRAL POINT SEGMENT CONDUCTOR 61b (SECOND NEUTRAL POINT-CONNECTION SEGMENT CONDUCTOR)
61c, 61d, 62c, 62d, 762d NEUTRAL POINT COIL END PORTION 61c (COIL END PORTION)
62, 762, 962 RADIALLY INNER NEUTRAL POINT CONDUCTOR (FIRST SEGMENT CONDUCTOR)
100, 300, 400, 500, 600, 700, 900, 1000 STATOR (ARMATURE)
301, 801a, 801b, 901 ELECTRONIC COMPONENT
302 TEMPERATURE DETECTION ELEMENT
304 WIRING MEMBER
Pt, PtU, PtV, PtW POWER-SIDE END PORTION (END PORTION OF COIL PORTION)
Nt, NtU, NtV, NtW NEUTRAL POINT CONNECTION END PORTION (END PORTION OF COIL PORTION)

The invention claimed is:

1. A method of manufacturing an armature that includes an armature core provided with a plurality of slots that extend in a center axis direction and a coil portion formed by joining a plurality of segment conductors including leg portions to each other and supplied with multi-phase AC power, the method comprising:

a step of preparing first segment conductors, of the segment conductors, which constitute at least one end portion of the coil portion for each phase and in which a plurality of the end portions, or the end portion and a power terminal member, are electrically connected to each other;

a step of disposing the leg portions of the first segment conductors and the leg portions of second segment conductors, which are the segment conductors which constitute a part of the coil portion other than the first segment conductors, in the armature core so as to face each other in the center axis direction after the step of preparing the first segment conductors; and a step of joining the leg portions of the first segment conductors and the leg portions of the second segment conductors to each other after the step of disposing the leg portions, wherein the step of preparing the first segment conductors is a step of preparing the first segment conductors in which the plurality of the end portions, or the end portions and the power terminal member, are electrically connected to each other, and an electronic part is disposed on the segment conductor, and wherein the step of preparing the first segment conductors is a step of preparing the first segment conductors on which the electronic part is disposed by attaching the electronic part which has a temperature detection element to a neutral point-connection segment conductor, among the plurality of segment conductors.

2. A method of manufacturing an armature that includes an armature core provided with a plurality of slots that extend in a center axis direction and a coil portion formed by joining a plurality of segment conductors including leg portions to each other and supplied with multi-phase AC power, the method comprising:

a step of preparing first segment conductors, of the segment conductors, which constitute at least one end portion of the coil portion for each phase and in which a plurality of the end portions, or the end portion and a power terminal member, are electrically connected to each other;

a step of disposing the leg portions of the first segment conductors and the leg portions of second segment conductors, which are the segment conductors which constitute a part of the coil portion other than the first segment conductors, in the armature core so as to face each other in the center axis direction after the step of preparing the first segment conductors; and a step of joining the leg portions of the first segment conductors and the leg portions of the second segment conductors to each other after the step of disposing the leg portions, wherein the step of preparing the first segment conductors is a step of preparing the first segment conductors in which the plurality of the end portions, or the end portions and the power terminal member, are electrically connected to each other, and an electronic part is disposed on the segment conductor, and wherein the step of preparing the first segment conductors is a step of preparing the first segment conductors on which the electronic part is disposed by attaching the electronic part which has a temperature detection element to a surface, on an armature core side, of a coil end portion connected to the leg portions of the plurality of segment conductors.

* * * * *